United States Patent
Iwami et al.

(10) Patent No.: US 10,070,017 B2
(45) Date of Patent: Sep. 4, 2018

(54) CONTROLLING SYNCHRONIZATION BETWEEN DEVICES IN A NETWORK

(71) Applicant: Sony Corporation, Tokyo (JP)

(72) Inventors: Hideki Iwami, Saitama (JP); Tamotsu Munakata, Kanagawa (JP); Hiroshi Okawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/390,803

(22) PCT Filed: Apr. 4, 2013

(86) PCT No.: PCT/JP2013/060361
§ 371 (c)(1),
(2) Date: Oct. 6, 2014

(87) PCT Pub. No.: WO2013/154025
PCT Pub. Date: Oct. 17, 2013

(65) Prior Publication Data
US 2015/0085190 A1    Mar. 26, 2015

(30) Foreign Application Priority Data

Apr. 13, 2012 (JP) ................................ 2012-092512

(51) Int. Cl.
*H04N 5/067* (2006.01)
*H04N 21/41* (2011.01)
(Continued)

(52) U.S. Cl.
CPC ......... *H04N 5/067* (2013.01); *H04N 21/4126* (2013.01); *H04J 3/0685* (2013.01); *H04L 1/00* (2013.01); *H04N 19/61* (2014.11)

(58) Field of Classification Search
USPC .......................................................... 370/509
See application file for complete search history.

(56) References Cited

U.S. PATENT DOCUMENTS 6,243,369 B1 * 6/2001 Grimwood ............ H04J 3/0682
370/335
6,438,143 B1 * 8/2002 Higashida ........... H04L 49/3081
370/503
(Continued)

FOREIGN PATENT DOCUMENTS

JP    2002-152162 A    5/2002
JP    2004-194094 A    7/2004
(Continued)

*Primary Examiner* — Mohammad Anwar
*Assistant Examiner* — Angel Brockman
(74) *Attorney, Agent, or Firm* — Chip Law Group

(57) ABSTRACT

The present technique relates to an information processing apparatus, a method, and a program allowing for easily controlling video synchronization in image data transmission. The information processing apparatus according to the present technique includes a synchronization cancellation unit configured to cancel synchronization between synchronization timing of a network to which image data are transmitted and synchronization timing of the image data, on the basis of a delay time of image data transmission, an adjusting unit configured to adjust synchronization timing of the image data of which synchronization with the synchronization timing of the network is cancelled by the synchronization cancellation unit, and a synchronization connection unit configured to synchronize the synchronization timing of the image data, which is adjusted by the adjusting unit, with the synchronization timing of the network. The present technique can be applied to, for example, an information processing apparatus.

16 Claims, 31 Drawing Sheets

(51) Int. Cl.
  *H04L 1/00* (2006.01)
  *H04J 3/06* (2006.01)
  *H04N 19/61* (2014.01)

(56) References Cited

U.S. PATENT DOCUMENTS

| | | | | |
|---|---|---|---|---|
| 6,751,194 | B1* | 6/2004 | Ueno | H04J 3/247 |
| | | | | 370/235 |
| 7,133,923 | B2* | 11/2006 | MeLampy | H04L 29/06027 |
| | | | | 709/231 |
| 2005/0053131 | A1* | 3/2005 | Domke | H04N 19/436 |
| | | | | 375/240.01 |
| 2009/0147785 | A1* | 6/2009 | Yanagihara | H04L 12/1854 |
| | | | | 370/390 |
| 2012/0008646 | A1* | 1/2012 | Fourcand | H04J 3/0673 |
| | | | | 370/514 |
| 2012/0188339 | A1* | 7/2012 | Tanaka | H04N 13/0438 |
| | | | | 348/43 |

FOREIGN PATENT DOCUMENTS

| | | | |
|---|---|---|---|
| JP | 2004-304809 | A | 10/2004 |
| JP | 2004-356753 | A | 12/2004 |
| JP | 3617087 | B2 | 2/2005 |
| JP | 2007-311948 | A | 11/2007 |
| JP | 2008-028541 | A | 2/2008 |
| JP | 2009-278545 | A | 11/2009 |

* cited by examiner

| NETWORK | | Video SYNCHRONIZATION | |
|---|---|---|---|
| STA1 | STA2 | STA1 | STA2 |
| Stay | Timing Follower | Stay | Timing Follower |

| NETWORK | | Video SYNCHRONIZATION | |
|---|---|---|---|
| STA1 | STA2 | STA1 | STA2 |
| Stay | Timing Follower | Timing Follower | Stay |
| Timing Follower | Stay | Timing Follower | Stay |

CONTROLLING SYNCHRONIZATION BETWEEN DEVICES IN A NETWORK

TECHNICAL FIELD

The present technique relates to an information processing apparatus, a method, and a program, and more particularly, to an information processing apparatus, a method, and a program allowing for easily controlling video synchronization in image data transmission.

BACKGROUND ART

In the past, applications and services for transferring image data (in particular, motion picture data) via various kinds of networks such as the Internet and LAN (Local Area Network) are widely used. When image data are transmitted and received via a network, in many cases, the amount of data is reduced by encoding (compression) processing at the transmission side and the reduced data are transmitted to the network, and then the reception side performs decoding (extraction) processing on the encoded reception data to reproduce the data (for example, see Patent Document 1 to Patent Document 6).

In some cases, the transmission of motion picture data requires timeliness (so-called real-time property). For example, when an image captured and obtained by an image-capturing device at a transmission source is displayed immediately (in so-called real-time manner) on an image display apparatus at a transmission destination, displaying of a motion picture may be corrupted if there is too much delay in encoding, transmission, decoding, and the like of image data. In such case, in order to ensure displaying of motion picture, it is required to manage the delay time in transmission of image data (including processing related to transmission such as encoding and decoding).

For this, it is necessary to accurately control synchronization of network and video between apparatuses.

CITATION LIST

Patent Document

Patent Document 1: JP 2007-311948 A
Patent Document 2: JP 2009-278545 A
Patent Document 3: JP 2008-028541 A
Patent Document 4: Japanese Patent No. 3617087
Patent Document 5: JP 2002-152162 A
Patent Document 6: JP 2004-304809 A

SUMMARY OF THE INVENTION

Problems to be Solved by the Invention

However, for example, in a generally-available circuit such as Ethernet (registered trademark), NGN (Next Generation Network), and wireless network, the bandwidth may become unstable, and the delay time is greatly affected. In addition, the network configuration is considered to change depending on circumstances such as disconnection of some of the circuits, and connection of a new circuit.

Further, in a case of a communication system for connecting communication apparatuses via such generally-available circuit, the system configuration is highly flexible, so that a communication apparatus can be easily removed from the system, and a new communication apparatus can be easily added to the system.

Therefore, which apparatus should predominantly control the synchronization may change depending on the circumstances, and it may be impossible to sufficiently maintain synchronization according to a fixed control method where a certain apparatus always controls synchronization with other apparatuses. As described above, more flexible synchronization control is desired.

The present technique is made in view of such circumstances, and it is an object of the present technique to more easily control video synchronization in image data transmission.

Solutions to Problems

According to an aspect of the present technique, there is provided an information processing apparatus including a synchronization cancellation unit configured to cancel synchronization between synchronization timing of a network to which image data are transmitted and synchronization timing of the image data, on the basis of a delay time of image data transmission, an adjusting unit configured to adjust synchronization timing of the image data of which synchronization with the synchronization timing of the network is cancelled by the synchronization cancellation unit, and a synchronization connection unit configured to synchronize the synchronization timing of the image data, which is adjusted by the adjusting unit, with the synchronization timing of the network.

The adjusting unit may advance the synchronization timing of the image data by a time equivalent to the delay time.

The adjusting unit may initialize the encoding processing of the image data in the state where the synchronization between the synchronization timing of the image data and the synchronization timing of the network is cancelled by the synchronization cancellation unit.

The adjusting unit may cause the encoding processing of the image data to be continued upon reducing a blank period of a frame of the image data so that the blank period is shorter than usual in the state where the synchronization between the synchronization timing of the image data and the synchronization timing of the network is cancelled by the synchronization cancellation unit.

The information processing apparatus may further include a network synchronization acquisition unit configured to obtain the synchronization timing of the network with the other party in communication in the state where the synchronization between the synchronization timing of the image data and the synchronization timing of the network is cancelled by the synchronization cancellation unit.

The information processing apparatus may further include a measuring unit configured to measure the delay time, and the synchronization cancellation unit may cancel the synchronization between the synchronization timing of the network to which the image data are transmitted and the synchronization timing of the image data, on the basis of the delay time measured by the measuring unit.

The measuring unit may determine a transmission source in accordance with a synchronization control topology and a network setting, and may measure the delay period using image data transmitted from the transmission source.

The information processing apparatus may further include a transmission unit configured to transmit the image data in accordance with the synchronization timing of the image data synchronized with the synchronization timing of the network by the synchronization connection unit.

Further, according to an aspect of the present technique, there is provided an information processing method for an information processing apparatus, wherein the information processing apparatus cancels synchronization between synchronization timing of a network to which image data are transmitted and synchronization timing of the image data, on the basis of a delay time of image data transmission, and the information processing apparatus adjusts synchronization timing of the image data of which synchronization with the synchronization timing of the network is cancelled, and the information processing apparatus synchronizes the synchronization timing of the image data, which is adjusted, with the synchronization timing of the network.

Further, according to an aspect of the present technique, there is provided a program for causing a computer to function as a synchronization cancellation unit configured to cancel synchronization between synchronization timing of a network to which image data are transmitted and synchronization timing of the image data, on the basis of a delay time of image data transmission, an adjusting unit configured to adjust synchronization timing of the image data of which synchronization with the synchronization timing of the network is cancelled by the synchronization cancellation unit, and a synchronization connection unit configured to synchronize the synchronization timing of the image data, which is adjusted by the adjusting unit, with the synchronization timing of the network.

Further, according to an aspect of the present technique, there is provided an information processing apparatus in a system including a first video transmission sequence having a video synchronization acquisition function and a second video transmission sequence, and the information processing apparatus includes a synchronization cancellation unit configured to cancel synchronization between synchronization timing of a network to which image data are transmitted and synchronization timing of the image data, on the basis of a delay time of image data transmission according to the first video transmission sequence, an adjusting unit configured to adjust synchronization timing of the image data of which synchronization with the synchronization timing of the network is cancelled by the synchronization cancellation unit, a synchronization connection unit configured to synchronize the synchronization timing of the image data, which is adjusted by the adjusting unit, with the synchronization timing of the network, and a control unit configured to operate the second video transmission sequence different from the first video transmission sequence, using synchronization timing generated from the first video transmission sequence.

The adjusting unit may advance the synchronization timing of the image data by a time equivalent to the delay time.

The adjusting unit may initialize the encoding processing of the image data in the state where the synchronization between the synchronization timing of the image data and the synchronization timing of the network is cancelled by the synchronization cancellation unit.

The adjusting unit may cause the encoding processing of the image data to be continued upon reducing a blank period of a frame of the image data so that the blank period is shorter than usual in the state where the synchronization between the synchronization timing of the image data and the synchronization timing of the network is cancelled by the synchronization cancellation unit.

The information processing apparatus may further include a network synchronization acquisition unit configured to obtain the synchronization timing of the network with the other party in communication in the state where the synchronization between the synchronization timing of the image data and the synchronization timing of the network is cancelled by the synchronization cancellation unit.

The information processing apparatus may further include a measuring unit configured to measure the delay time, and the synchronization cancellation unit may cancel the synchronization between the synchronization timing of the network to which the image data are transmitted and the synchronization timing of the image data, on the basis of the delay time measured by the measuring unit.

The measuring unit may determine a transmission source for the first video transmission sequence in accordance with a synchronization control topology and a network setting, and may measure the delay period using image data transmitted from the transmission source.

The information processing apparatus may further include a transmission unit configured to transmit the image data in accordance with the synchronization timing of the image data synchronized with the synchronization timing of the network by the synchronization connection unit.

Further, according to another aspect of the present technique, there is provided an information processing method for an information processing apparatus in a system including a first video transmission sequence having a video synchronization acquisition function and a second video transmission sequence, wherein the information processing apparatus cancels synchronization between synchronization timing of a network to which image data are transmitted and synchronization timing of the image data, on the basis of a delay time of image data transmission according to the first video transmission sequence, and the information processing apparatus adjusts synchronization timing of the image data of which synchronization with the synchronization timing of the network is cancelled, and the information processing apparatus synchronizes the synchronization timing of the image data, which is adjusted, with the synchronization timing of the network, and the information processing apparatus operates the second video transmission sequence different from the first video transmission sequence, using synchronization timing generated from the first video transmission sequence.

Further, according to another aspect of the present technique, there is provided a program for a computer in a system including a first video transmission sequence having a video synchronization acquisition function and a second video transmission sequence, wherein the program causes the computer to function as a synchronization cancellation unit configured to cancel synchronization between synchronization timing of a network to which image data are transmitted and synchronization timing of the image data, on the basis of a delay time of image data transmission according to the first video transmission sequence, an adjusting unit configured to adjust synchronization timing of the image data of which synchronization with the synchronization timing of the network is cancelled by the synchronization cancellation unit, a synchronization connection unit configured to synchronize the synchronization timing of the image data, which is adjusted by the adjusting unit, with the synchronization timing of the network, and a control unit configured to operate the second video transmission sequence different from the first video transmission sequence, using synchronization timing generated from the first video transmission sequence.

In an aspect of the present technique, synchronization between synchronization timing of a network to which image data are transmitted and synchronization timing of the image data is cancelled on the basis of a delay time of image data transmission, and synchronization timing of the image data of which synchronization with the synchronization timing of the network is cancelled is adjusted, and the synchronization timing of the image data, which is adjusted, is synchronized with the synchronization timing of the network.

In another aspect of the present technique, in a system including a first video transmission sequence having a video synchronization acquisition function and a second video transmission sequence, synchronization between synchronization timing of a network to which image data are transmitted and synchronization timing of the image data is cancelled on the basis of a delay time of image data transmission according to the first video transmission sequence, and synchronization timing of the image data of which synchronization with the synchronization timing of the network is cancelled by the synchronization cancellation unit is adjusted, and the synchronization timing of the image data, which is adjusted, is synchronized with the synchronization timing of the network, and the second video transmission sequence different from the first video transmission sequence is caused to operate using synchronization timing generated from the first video transmission sequence.

Effects of the Invention

According to the present technique, information can be processed. In particular, video synchronization in image data transmission can be controlled more easily.

MODE FOR CARRYING OUT THE INVENTION

Embodiments for carrying out the present disclosure (hereinafter referred to as embodiments) will be hereinafter explained. The explanation will be made in the following order.

1. First embodiment (image transmission system)
2. Second embodiment (image transmission system)
3. Third embodiment (image processing system)
4. Fourth embodiment (coding unit/decoding unit)
5. Fifth embodiment (computer)

<1. First Embodiment>

[1-1 Image Transmission System]

Figure 1:
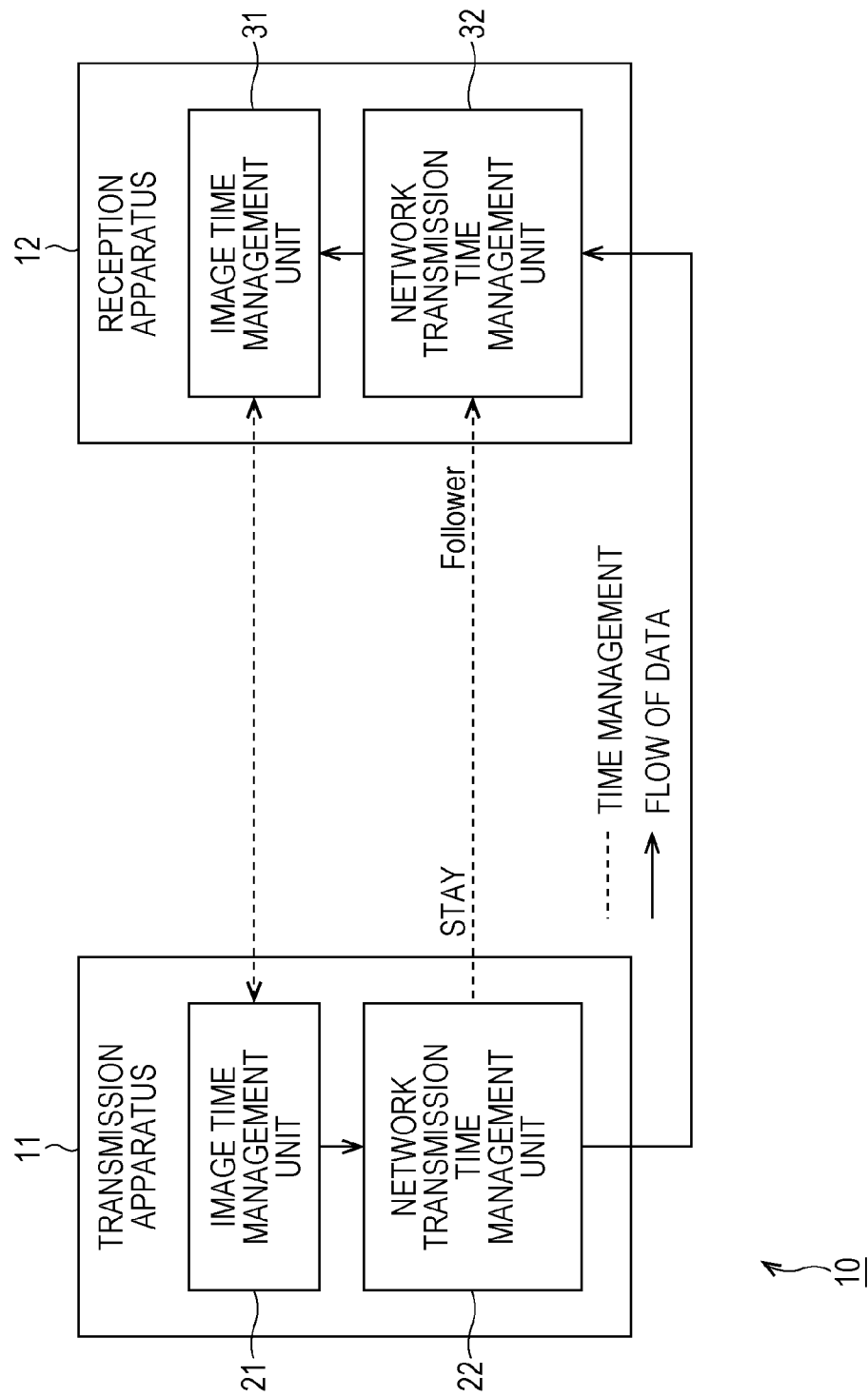
FIG. 1 is a block diagram illustrating an example of a main configuration of an image transmission system.

FIG. 1 is a block diagram illustrating an example of a main configuration of an image transmission system.

An image transmission system 10 as shown in FIG. 1 includes a transmission apparatus 11 and a reception apparatus 12, and is a system for transmitting encoded data, which are obtained by encoding image data, from the transmission apparatus 11 to the reception apparatus 12. FIG. 1 shows a configuration of synchronization of the transmission apparatus 11 and the reception apparatus 12.

As shown in FIG. 1, the transmission apparatus 11 includes an image time management unit 21 and a network transmission time management unit 22. The reception apparatus 12 includes an image time management unit 31 and a network transmission time management unit 32.

The image time management unit 21 and the image time management unit 31 manage synchronization of image display such as vertical synchronization and horizontal synchronization of image data.

The network transmission time management unit 22 and the network transmission time management unit 32 perform synchronization control of a network circuit, and synchronization control of transmission of image data. In this case, one of the network transmission time management unit 22 and the network transmission time management unit 32 becomes STAY, and the other of the network transmission time management unit 22 and the network transmission time management unit 32 becomes Follower. The unit serving as STAY predominantly performs the synchronization control. On the other hand, the Follower follows the STAY's synchronization control.

Figures 2, 3:
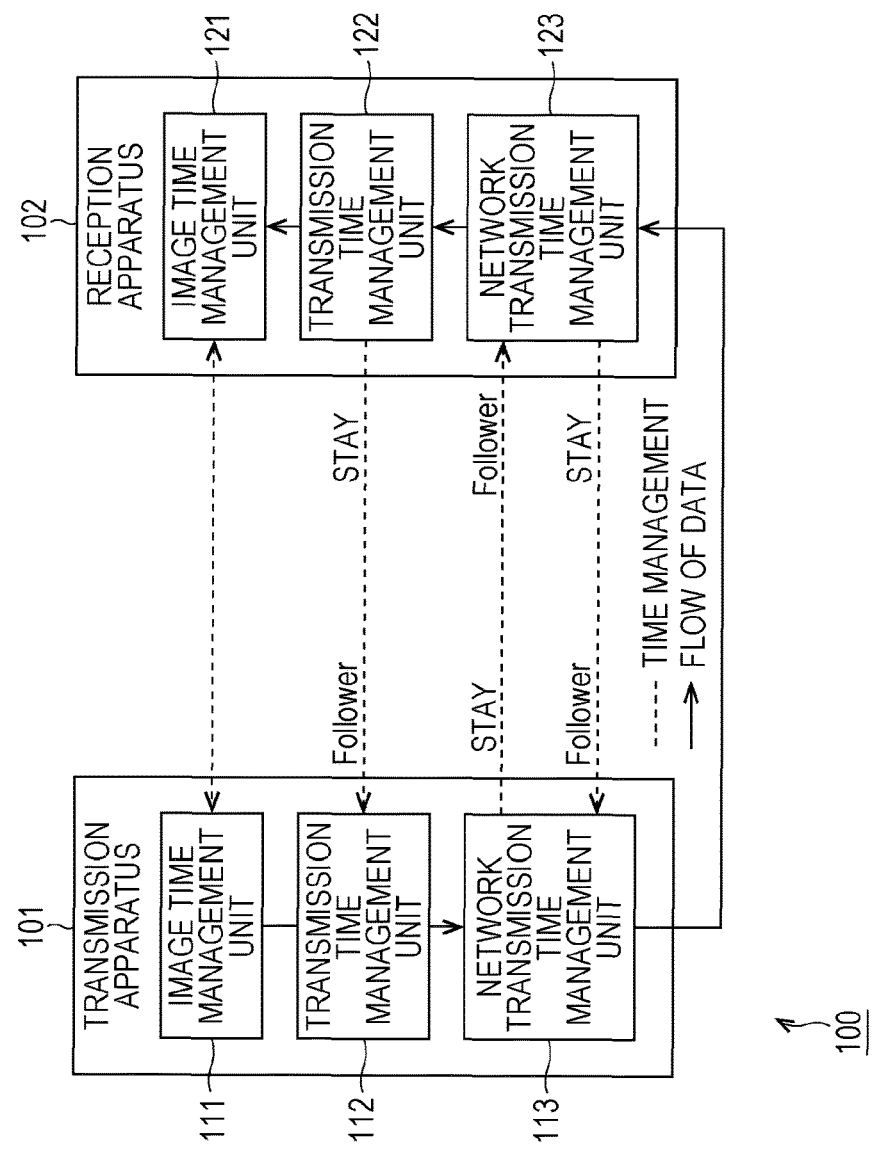
FIG. 2 is a figure illustrating an example of a system timing configuration.
FIG. 3 is a block diagram illustrating an example of a main configuration of the image transmission system.

FIG. 2 is a figure illustrating an example of a system timing configuration of the image transmission system 10 of FIG. 1. The synchronization management of the video transmission and the network circuit are done by the network transmission time management unit 22 and the network transmission time management unit 32, and therefore, the direction of control in the synchronization management of video transmission and the direction of control in the synchronization management of the network circuit are limited to the same direction as each other as shown in the example of FIG. 2.

For example, in the synchronization management of the video transmission ("Video synchronization" in the table of FIG. 2), when the transmission apparatus 11 is STAY, and the reception apparatus 12 is the Follower, then the transmission apparatus 11 is also STAY and the reception apparatus 12 is also Follower in the synchronization management of the network circuit ("network" in the table of FIG. 2).

In the case of the communication system communicating via the generally-available circuit, the environment of the data transmission such as network configuration an system configuration is likely to greatly change, and therefore, the relationship of STAY and Follower in FIG. 1 may not be always the best.

Alternatively, a method for performing the synchronization management of the video transmission completely separately from the synchronization management of the network circuit may be considered. But in such case, it has been difficult to maintain synchronization between the time management of the video transmission and the time management of the network circuit, and it may has been difficult to perform data transmission with a shorter delay.

[1-2 Image Transmission System]

Therefore, in order to allow for more flexible synchronization control, the synchronization control of the video transmission is performed separately from the synchronization management of the network circuit, and further, the synchronization control of the video transmission and the synchronization management of the network circuit can be controlled to be in cooperation (synchronization connection) or independent (synchronization cancellation).

FIG. 3 is a block diagram illustrating an example of a main configuration of an image transmission system.

The image transmission system 100 as shown in FIG. 3 is a communication system to which the present technique is applied. The image transmission system 100 includes a transmission apparatus 101 and a reception apparatus 102, and is a system for transmitting encoded data, which are obtained by encoding image data, from the transmission apparatus 101 to the reception apparatus 102. FIG. 3 shows a configuration of synchronization of the transmission apparatus 101 and the reception apparatus 102.

As shown in FIG. 3, the transmission apparatus 101 includes an image time management unit 111, a transmission time management unit 112, and a network transmission time management unit 113. The reception apparatus 102 includes an image time management unit 121, a transmission time management unit 122, and a network transmission time management unit 123.

The image time management unit 111 and the image time management unit 121 manage the synchronization timing of the image such as vertical synchronization and horizontal synchronization of image data. The transmission time management unit 112 and the transmission time management unit 122 manage synchronization timing for transmission of image data and manage synchronization timing for processing of encoding and decoding of image data (for compression). The network transmission time management unit 113 and the network transmission time management unit 123 performs the synchronization control of the network circuit.

Figures 4, 5:
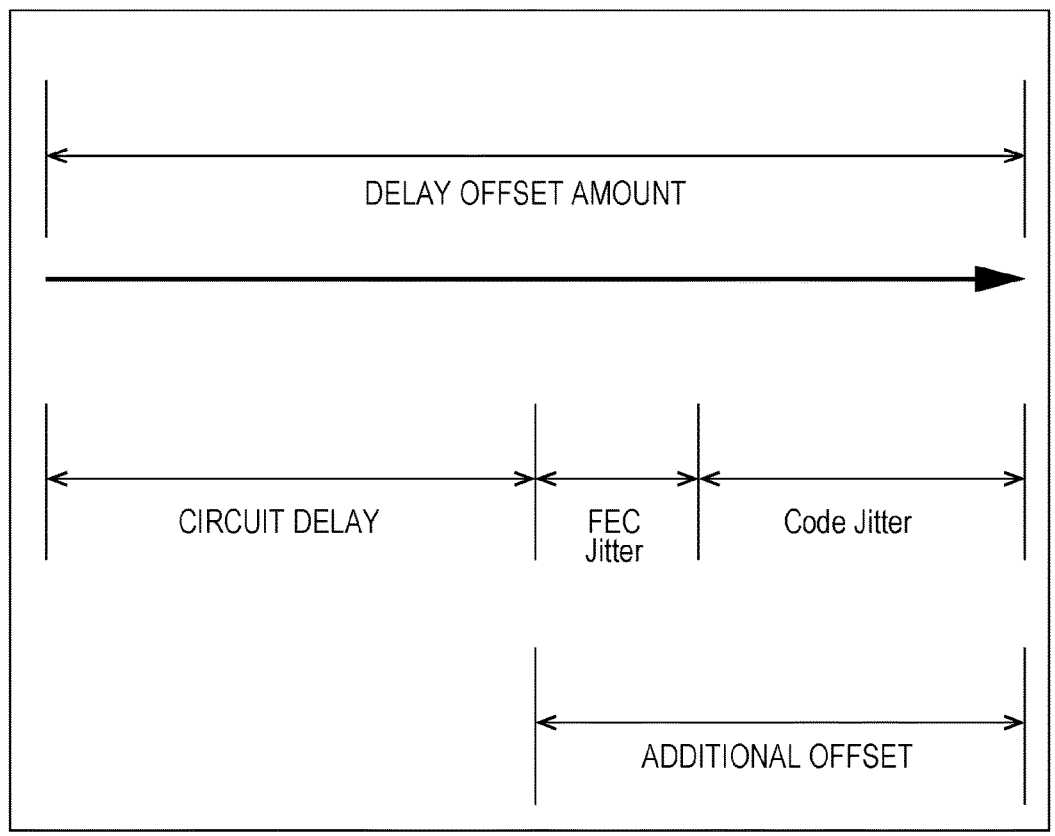
FIG. 4 is a figure illustrating an example of the system timing configuration.
FIG. 5 is a figure for illustrating the details of the system timing.

The synchronization timing for compression is controlled to perform the encoding processing and the decoding processing so as to more greatly reduce the amount of delay of the entire data transmission including various kinds of amounts of delay as shown in FIG. 5.

The management of the synchronization timing of the transmission is done on the basis of the synchronization information about the network circuit. Further, the management of the synchronization timing of the image is performed with the same accuracy of time as the management of the synchronization timing of the transmission. As described above, the management of the synchronization timing of the image and the management of the synchronization timing of the transmission are performed by processing units different from each other. However, when the synchronization timing is set, the synchronization timing continues to operate with the same phase.

The management of the synchronization timing of the transmission may be associated with the management of the synchronization timing of the network circuit, or the association thereof may be cancelled. For example, only the synchronization timing of the transmission can be changed. This change may be made slowly, or may be made instantly. It should be noted that the "transmission" of the synchronization timing of the transmission includes not only transmission of video (image data) but also transmission of sound (sound data).

When the amount of offset delay is determined by this synchronization, the transmission time management unit 112 and the transmission time management unit 122 separate the synchronization timing of the transmission and the synchronization timing of the network circuit are separated from each other, and the association therebetween is cancelled. Accordingly, the synchronization timing of the transmission runs freely. At this occasion, the synchronization timing of the image and the synchronization timing of the transmission may still be the same phase.

As soon as the amount of offset delay is set, the transmission time management unit 112 and the transmission time management unit 122 associate the synchronization timing of the transmission with the synchronization timing of the network circuit. The transmission time management unit 112 and the transmission time management unit 122 exchange the synchronization information with the network transmission time management unit 113 and the network transmission time management unit 123, and associate the synchronization timing of the transmission with the synchronization timing of the network circuit.

As described above, in the case of the synchronization management of the image transmission system 100, the synchronization timing of the network circuit and the synchronization timing of the transmission can be easily separated from each other and can be easily associated with each other. Therefore, for example, the synchronization control unit of the network circuit can operate normally regardless of whether it is at the transmission side or at the reception side.

For example, as shown in FIG. 4, when the transmission time management unit 122 (STA2) of the reception apparatus 102 is STAY (Stay) and the transmission time management unit 112 (STA1) of the transmission apparatus 101 is Follower (Timing Follower) in the video transmission synchronization (Video synchronization), then the STAY of the synchronization (network) of the network circuit may be either STA1 or STA2.

In the camera system for live broadcast in the past, a camera and a CCU (Camera Control Unit) are connected by a composite cable called an optical fiber cable, a triax cable, or a multi-cable, but when a generally-available circuit such as Ethernet (registered trademark), NGN (Next Generation Network), and wireless network is supported, the generally-available circuit is extremely cheaper than dedicated circuits and satellite links, and therefore, the live broadcast system can be structured at a low cost.

Regardless of a terminal that manages synchronization on a network, the video synchronization can be controlled, and an activation sequence can be structured with a simple configuration.

Further, GenLock of cameras can be made via an asynchronous network, and therefore, even when simultaneous live broadcast is made using multiple relay control stations and multiple cameras, high quality camera images can be transmitted with a shorter delay using the same activation sequence.

[1-3 Synchronization Control]

In data transmission, the following processing is performed: initial synchronization processing which is synchronization processing that is performed when the data transmission is started, and re-synchronization processing which is synchronization processing that is performed during the data transmission. How the processing is performed will be shown in FIGS. 6 to 9.

Figure 6:
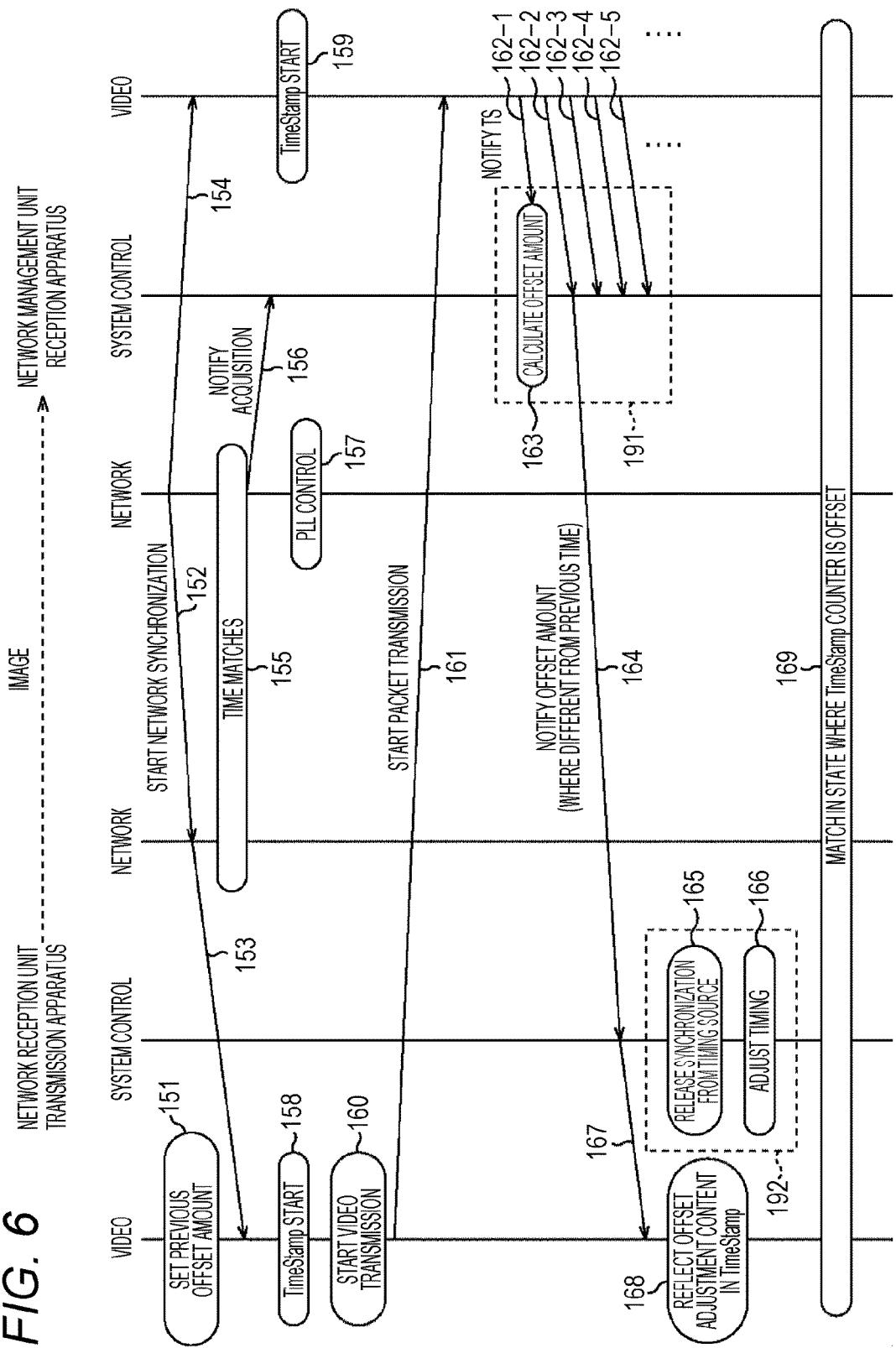
FIG. 6 is a figure for explaining an example of a flow of processing associated with image data transmission/reception.
Figure 7:
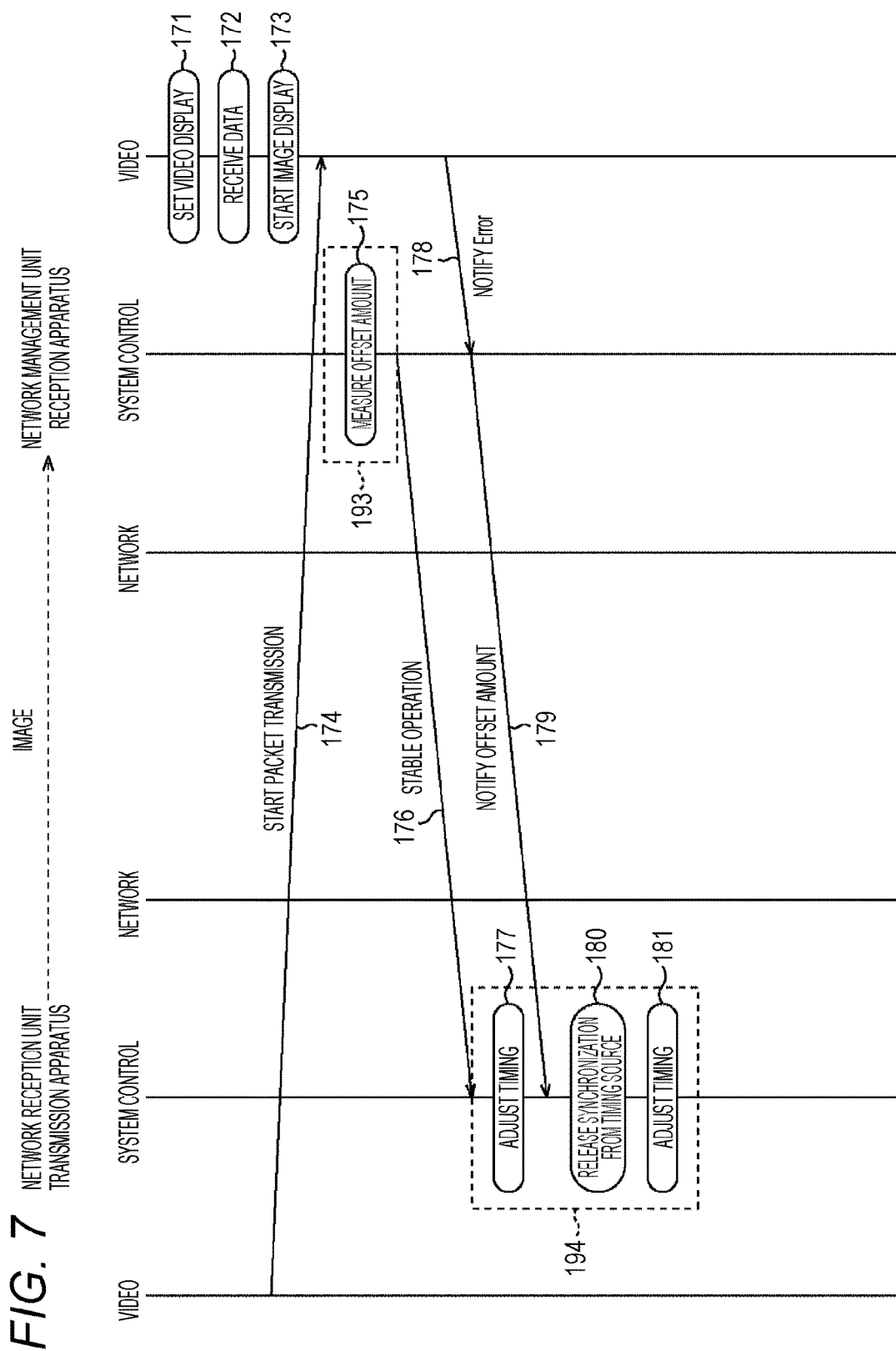
FIG. 7 is a figure continued from FIG. 6 for explaining the example of the flow of processing associated with the image data transmission/reception.

FIGS. 6 to 7 show a case where the network management unit which is STAY of the synchronization management of the network circuit is at the side of the reception apparatus, and the network reception unit which is Follower is at the side of the transmission apparatus. It should be noted that STAY of the synchronization management for the transmission is at the side of the reception apparatus which receives images, and Follower is at the side of the transmission apparatus which transmits images. More specifically, in the synchronization management of the network circuit and the synchronization management for the transmission, the directions of STAY and Follower are the same as each other. The details of FIGS. 6 and 7 will be explained later.

[1-4 Synchronization Control]

Figure 8:
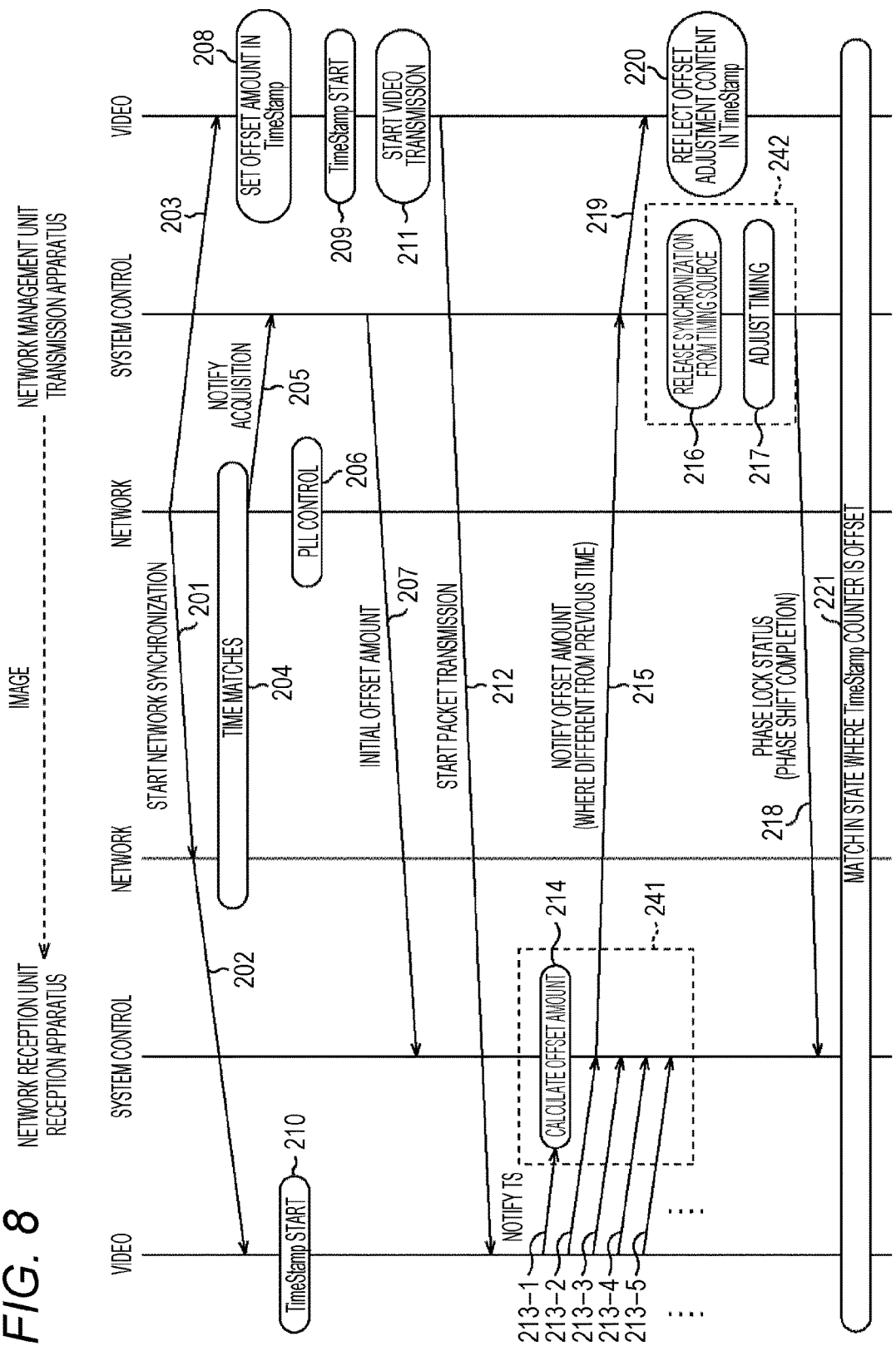
FIG. 8 is a figure for explaining another example of a flow of processing associated with the image data transmission/reception.
Figure 9:
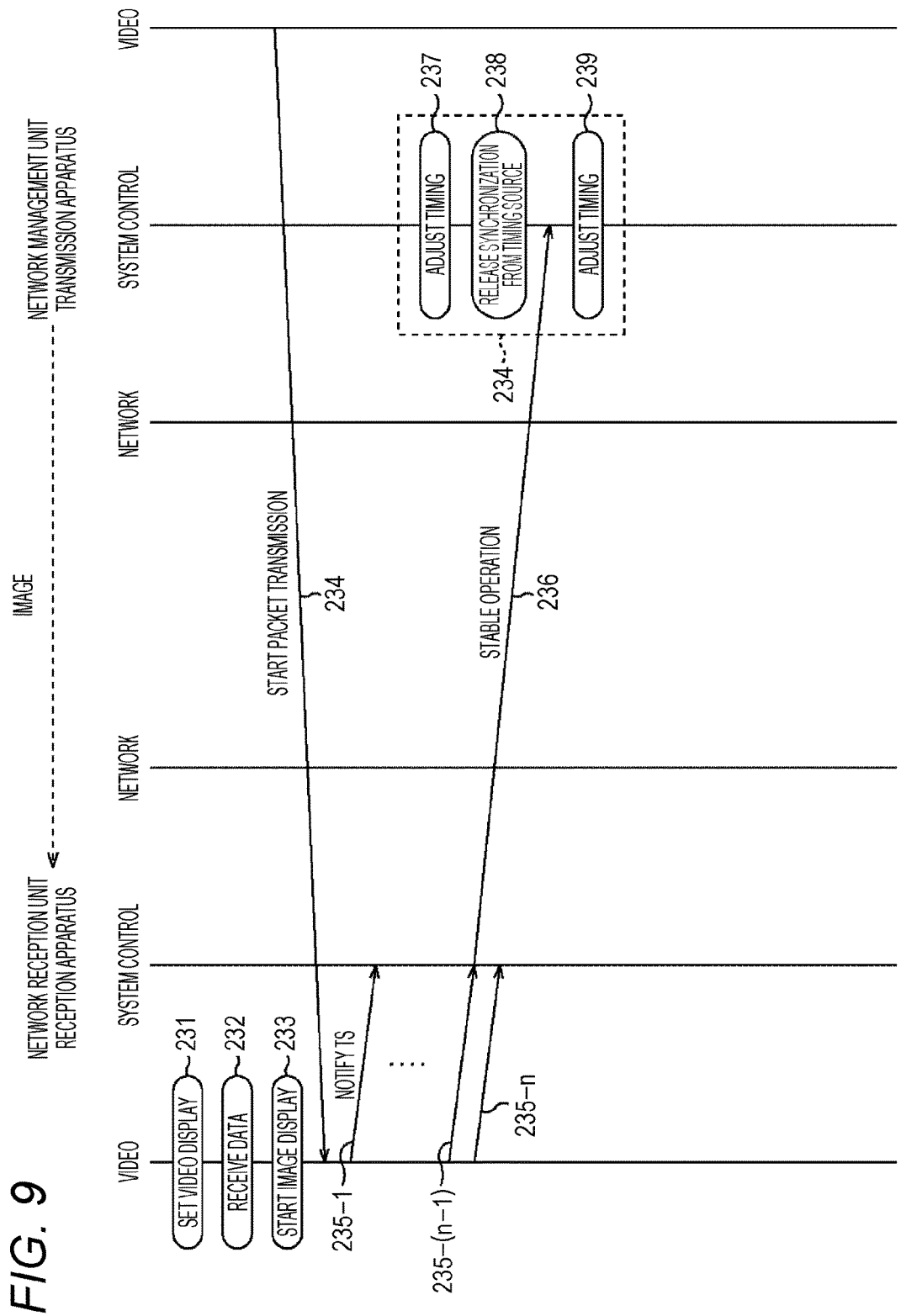
FIG. 9 is a figure continuous to FIG. 8 for explaining another example of a flow of processing associated with the image data transmission/reception.

FIGS. 8 and 9 show a case where the network management unit which is STAY of the synchronization management of the network circuit is at the side of the transmission apparatus, and the network reception unit which is Follower is at the side of the reception apparatus. It should be noted that STAY of the synchronization management for the transmission is at the side of the reception apparatus that receives images, and Follower is at the side of the transmission apparatus that transmits images. More specifically, in the synchronization management of the network circuit and the synchronization management for the transmission, the directions of STAY and Follower are opposite to each other. The details of FIGS. 8 and 9 will be explained later.

As described above, regardless of the direction of the synchronization management for the transmission, STAY of the synchronization management of the network circuit may be at the side of the transmission, or may be at the side of the reception.

The more specific flow of processing will be explained with reference to FIGS. 10 to 15.

[1-5 Flow of Initial Synchronization Processing]

First, an example of a flow of initial synchronization processing performed by the transmission apparatus 101 for synchronizing video with a shorter delay will be explained with reference to the flowchart of FIG. 10. This will be explained with reference to FIGS. 6 to 9 as necessary.

When the power is turned on by a product, Power On Reset is given to the entire system, and the system PLL starts operation. In the initial state, the circuit synchronization between the transmission and the reception is not obtained. Therefore, a block for managing time information starts operation at the rise of the power regardless of the time information between the transmission and the reception.

In step S101, the transmission apparatus 101 obtains the time synchronization of the network circuit on the basis of the management of the network transmission time management unit 113 (processing 152 to processing 158 in the case of FIG. 6, and processing 201 to processing 207, processing 209 in the case of FIG. 8). Techniques such as GPS and IEEE1588 are available in order to achieve this function.

In step S102, the transmission apparatus 101 starts image input. The timing of this processing may be any given timing. By starting the image input, the initial value which is set in step S103 is determined. In step S103, the transmission apparatus 101 initializes the image compression encoder. It should be noted that the setting value of the initialization may be determined regardless of presence/absence of this processing. In step S104, the transmission apparatus 101 starts compression of image data received.

In step S105, the transmission apparatus 101 starts video transmission on the basis of the management of the transmission time management unit 112, and transmits encoded data, which are obtained by encoding image data, to the reception apparatus 102 via a network including a generally-available circuit (processing 160 in the case of FIG. 6, and processing 211 in the case of FIG. 8).

In step S106, the transmission time management unit 112 sets a delay offset amount which is found in advance. For example, the value which has been set in advance is saved (processing 151 in the case of FIG. 6, and processing 208 in the case of FIG. 8), and the saved value is reset (processing 168 in the case of FIG. 6, and processing 220 in the case of FIG. 8). With this processing, the transmission apparatus 101 can reduce the time it takes to perform the initial synchronization. The processing in step S106 is not limited to the order of sequence as shown in FIG. 10. For example, the processing may be performed before the position of step S106 of FIG. 10.

In step S107, the transmission time management unit 112 waits until receiving the notification of the measurement result of the delay offset amount from the reception apparatus 102. When the notification is received, the processing in step S108 is subsequently performed.

In step S108, in accordance with the control of the transmission time management unit 112, the transmission apparatus 101 once stops the input video in order to change the timing of VSYNC and HSYNC which are timing signals of the video, and release synchronization between the video synchronization and the network synchronization (processing 165 in the case of FIG. 6, and processing 216 in the case of FIG. 8).

Under normal circumstances, when the timing of VSYNC and HSYNC is changed, the video compression encoder may not receive video data known in advance, and therefore, the video compression encoder may not temporarily operate normally. For this reason, a function may be provided to allow for timing of VSYNC and HSYNC with a frequency shift as much as what the video compression encoder can tolerate.

In step S109, the transmission time management unit 112 for changing the synchronization acquisition position (SYNC position) (processing 166 in the case of FIG. 6, and processing 217 in the case of FIG. 8). When the synchronization acquisition position is changed by the processing in step S109, the transmission time management unit 112 resets the video input timing by the transmission time management unit 112 on the basis of the amount of offset delay notified by the reception apparatus 102 in step S110 (processing 192 in the case of FIG. 6, and processing 242 in the case of FIG. 8). It should be noted that the network synchronization is maintained during this period.

In step S111, the transmission apparatus 101 resumes the video input with the amount of delay based on the measurement result, and synchronizes the video synchronization and the network synchronization. The transmission apparatus 101 terminates the correction processing of the video synchronization, and indicates the state in which the environment for starting the video transmission is ready. However, when a function is provided to be capable of handling disrupted video data or change in the interval of VSYNC, HSYNC, then, it is not necessary to reset.

In step S112, the transmission apparatus 101 starts the video transmission (processing 174 in the case of FIG. 7, and processing 234 in the case of FIG. 9).

In step S113, the transmission apparatus 101 controlled by the transmission time management unit 112 corrects the amount of offset delay by a very small level, and copes with the change in the very small level. More specifically, in this processing, the transmission apparatus 101 performs operation for correcting the offset amount so as to satisfy the specification of standard specification video input/output interfaces such as HD-SDI, 3D-SDI, HDMI (registered trademark), and Display Port (processing 177, processing 180, and processing 181 (which is processing 194) in the case of FIG. 7, and processing 237 to processing 239 (which is processing 243) in the case of FIG. 9).

In step S114, the transmission apparatus 101 checks whether or not the transmission apparatus 101 receives a command of the amount of offset delay from the reception apparatus 102. When the transmission apparatus 101 receives the command, then the processing in step S113 is performed again, and processing subsequent thereto is repeated. When the transmission apparatus 101 does not receive the command, the initial operation processing is terminated.

As described above, the transmission apparatus 101 slightly corrects the transmission time management according to the command given by the reception apparatus 102 in order to correct a very small deviation of synchronization between the transmission and the reception even during the video transmission.

[1-6 Flow of Re-Synchronization Processing]

Subsequently, an example of a flow of re-synchronization processing performed by the transmission apparatus 101 will be explained with reference to the flowchart of FIGS. 11 and 12. For example, when network circuit topology is changed, this re-synchronization processing is executed.

When the synchronization acquisition processing is needed at a point in time different from the synchronization of the video transmission which has been provided until then, this re-synchronization processing is started.

In step S131, the transmission apparatus 101 obtains a re-synchronization request from the reception apparatus 102. Suppose that the synchronization of the network circuit has been finished.

In step S132, the transmission apparatus 101 determines whether the current synchronization relationship is different from synchronization relationship after the network circuit topology is changed, and it is necessary to re-synchronize the video transmission or not. When the re-synchronization is not necessary, the re-synchronization processing is terminated.

When the re-synchronization is necessary, the processing in step S133 is subsequently performed.

In step S133, the transmission apparatus 101 controlled by the transmission time management unit 112 re-synchronizes the video transmission to solve the state in which the current synchronization of the video transmission is not correct (Error state).

In step S134, the transmission apparatus 101 determines whether to initialize the entire system. When the transmission apparatus 101 determines that the transmission apparatus 101 needs not only the re-synchronization of the video transmission but also the re-synchronization of the entire system, the processing in step S141 of FIG. 12 is subsequently performed.

When the transmission apparatus 101 determines that the transmission apparatus 101 needs the re-synchronization of the video transmission but does not need the initialization processing of the entire system in step S134, the processing in step S135 is subsequently performed.

In step S135, the transmission apparatus 101 controlled by the network transmission time management unit 113 determines whether to re-activate the network circuit or not. When the transmission apparatus 101 determines that the transmission apparatus 101 needs to re-activate the physical layer, the processing in step S136 is subsequently performed.

In step S136, the transmission apparatus 101 controlled by the network transmission time management unit 113 initializes the synchronization information about the network circuit. When the processing in step S136 is finished, the processing in step S142 of FIG. 12 is subsequently performed.

When the transmission apparatus 101 determines that the transmission apparatus 101 does not need to re-activate the physical layer in step S135, the processing in step S137 is subsequently performed.

In step S137, the transmission apparatus 101 controlled by the transmission time management unit 112 initializes the synchronization timing of the video transmission. More specifically, the encoding processing of the image data is initialized. When the processing in step S137 is finished, the processing in step S143 of FIG. 12 is subsequently performed. Instead of initializing the encoding processing of the image data, the blank period of a frame of image data may be configured to be shorter than the normal, and the encoding processing of the image data may be continued.

Figure 10:
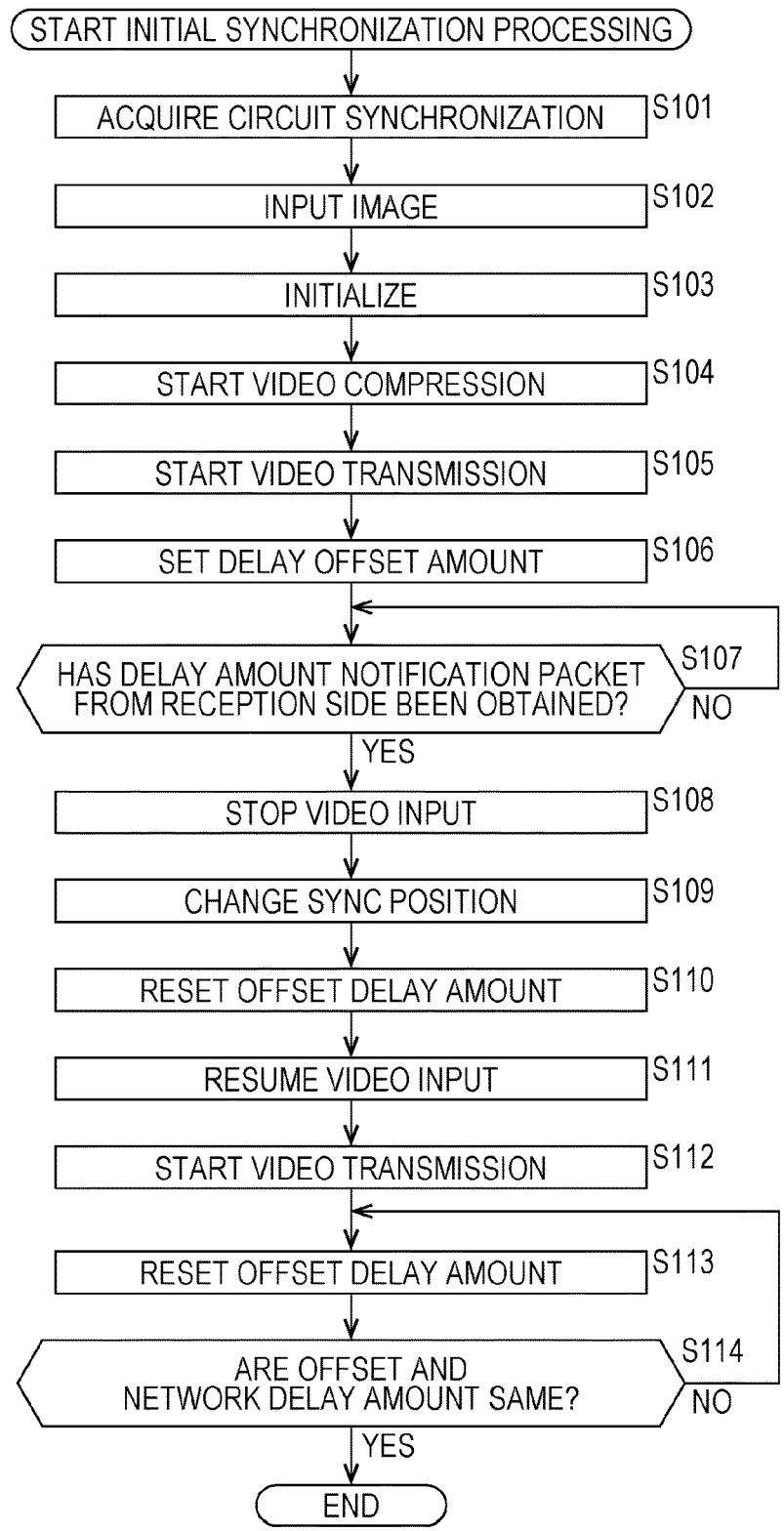
FIG. 10 is a flowchart for explaining an example of flow of initial synchronization processing.
Figure 12:
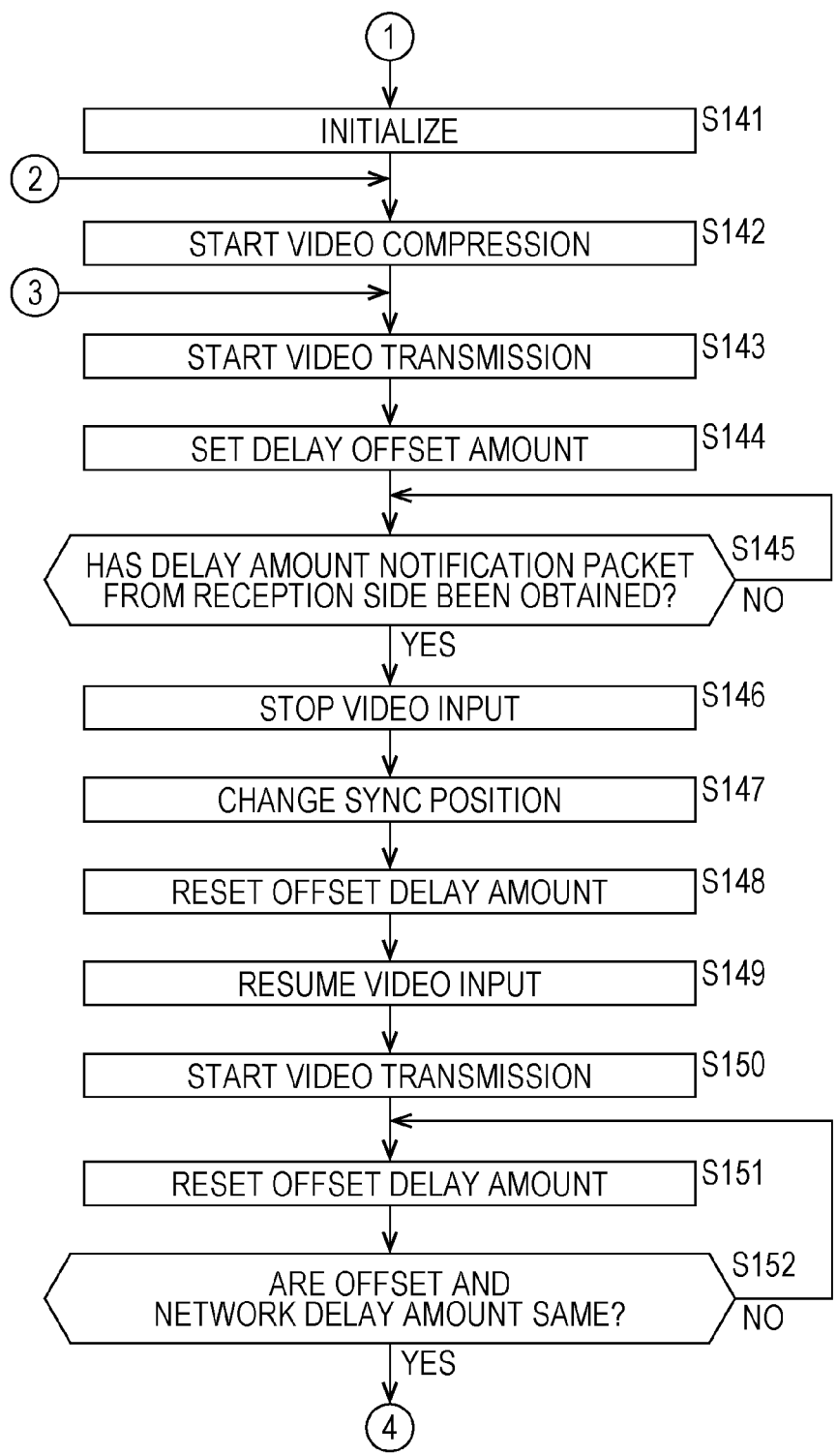
FIG. 12 is a flowchart continued from FIG. 11 for explaining an example of a flow of re-synchronization processing.

Each processing in step S141 to step S152 of FIG. 12 is executed in the same manner as each processing in step S103 to step S114 of FIG. 10.

In step S152, the offset and the amount of network delay are determined to be the same, the processing in FIG. 11 is performed again, and the re-synchronization processing is terminated.

As described above, the transmission apparatus 101 achieves each processing in FIG. 6 to FIG. 9.

[1-7 Flow of Initial Synchronization Processing]

Subsequently, various kinds of processing executed by the reception apparatus 102 will be explained with reference to the flowchart of FIG. 13. An example of a flow of initial synchronization processing for synchronizing video with a shorter delay which is performed by the reception apparatus 102 will be explained. This will be explained with reference to FIGS. 6 to 9 as necessary.

The reception apparatus 102 performs each processing in step S201 to step S203 in the same manner as each processing in step S101 to step S103 of FIG. 10. The network circuit acquires synchronization as the result of the processing in step S201, so that the time management controlling the network circuit notifies the same temporal timing as the transmission with regard to the transmission time management unit 112 (processing 162 in the case of FIG. 6, and processing 213 in the case of FIG. 8). As a result of this processing the time management at the transmission side is advance by the amount of offset delay which is set by the transmission side.

In step S204, the reception apparatus 102 receives a packet transmitted from the transmission apparatus 101, and starts processing for correcting the network circuit error. In this step, the amount of delay of the network circuit between the transmission and the reception is still being measured, and therefore, in order to avoid video disruption, video decoding is not started. Ina system of a short delay, the amount of delay of each processing is reduced as much as possible, and therefore, if the video is displayed even though there is an uncertain factor such as the amount of delay of the network circuit, the video is likely to be disrupted.

In step S205, the reception apparatus 102 starts reception of video data at a time determined by the processing in step S204. However, in this state, the video is still not displayed.

In step S206, the reception apparatus 102 compares the difference between the time stamp value added to a packet of video data received and the time stamp value possessed by the reception apparatus 102. The time stamp value is such that the time stamp is operated at a time level obtained temporarily in step S204, and immediately before the video data are transmitted as packets, the time stamp is added.

Step S207 is a step for causing the reception apparatus 102 to perform statistics processing of the difference information, and by calculating the amount of delay between the transmission and the reception, how much amount the transmission side is offset is obtained (processing 163 (processing 191) in the case of FIG. 6, and processing 214 (processing 241) in the case of FIG. 8).

In step S208, the reception apparatus 102 determines whether the offset amount is problematic as the entire system. When the offset amount is not problematic, the processing in step S209 is subsequently performed.

In step S209, the reception apparatus 102 writes the amount of offset delay, which is calculated for subsequent activation, to the nonvolatile memory. When the processing in step S209 is finished, the processing in step S205 is performed again.

In step S208, when the amount of offset delay is determined not to be problematic, the processing in step S210 is subsequently performed. In step S210, the reception apparatus 102 obtains the synchronization for the video transmission (processing 172 in the case of FIG. 7, and processing 232 in the case of FIG. 9).

In step S211, the reception apparatus 102 has such system setting that the video is not disrupted even when it is displayed, and therefore, the display of the video is turned on (processing 173 in the case of FIG. 7, and processing 233 in the case of FIG. 9).

In step S212, the reception apparatus 102 starts the video reception (processing 174 in the case of FIG. 7, and processing 234 in the case of FIG. 9).

When the processing in step S212 is finished, the initial synchronization processing is terminated.

[1-8 Flow of Re-Synchronization Processing]

Figure 14:
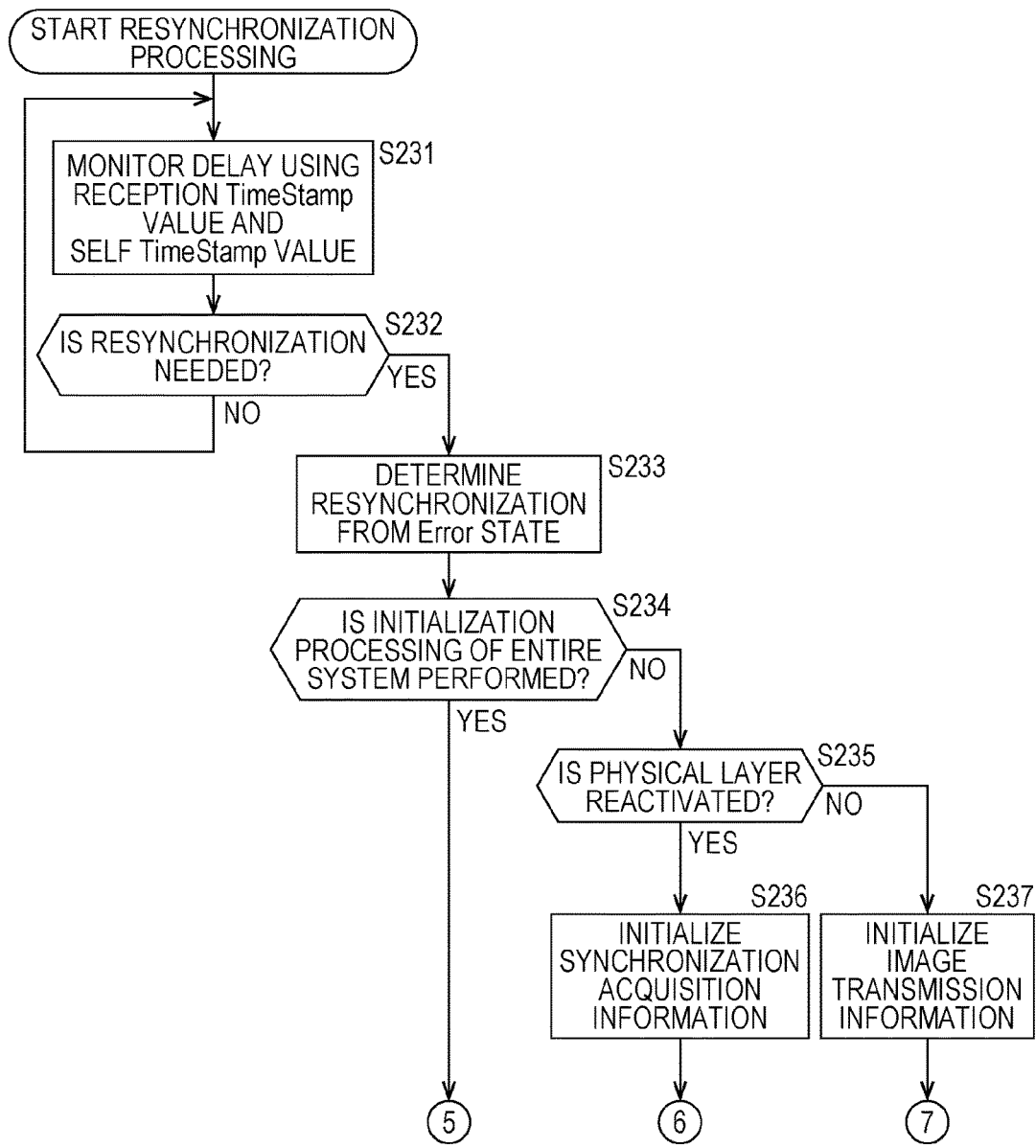
FIG. 14 is a flowchart for explaining another example of a flow of re-synchronization processing.

Subsequently, another example of flow of re-synchronization processing will be explained with reference to the flowchart of FIGS. 14 and 15.

Figure 13:
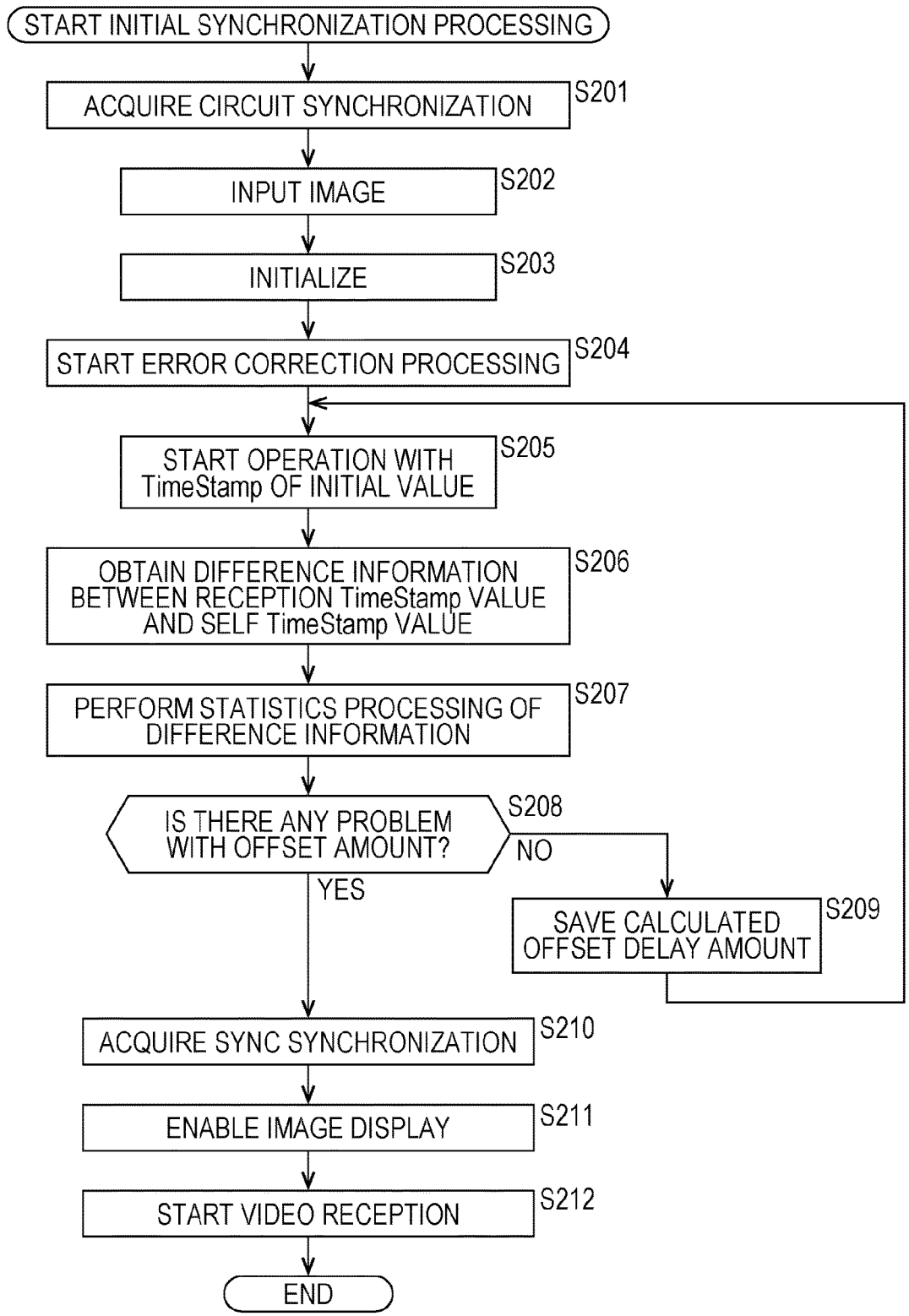
FIG. 13 is a flowchart for explaining another example of a flow of initial synchronization processing.

When the re-synchronization processing is started, the reception apparatus 102 performs the same processing as step S206 of FIG. 13 in step S231, and monitors to determine whether the synchronization timing is the same as that of the initial synchronization.

In step S232, the reception apparatus 102 determines whether the re-synchronization is necessary or not. When the reception apparatus 102 determines that the reception apparatus 102 does not need to perform the re-synchronization, the processing in step S231 is performed again.

In step S232, when the reception apparatus 102 determines that the reception apparatus 102 needs to perform the re-synchronization, the processing in step S233 is subsequently performed.

Figure 11:
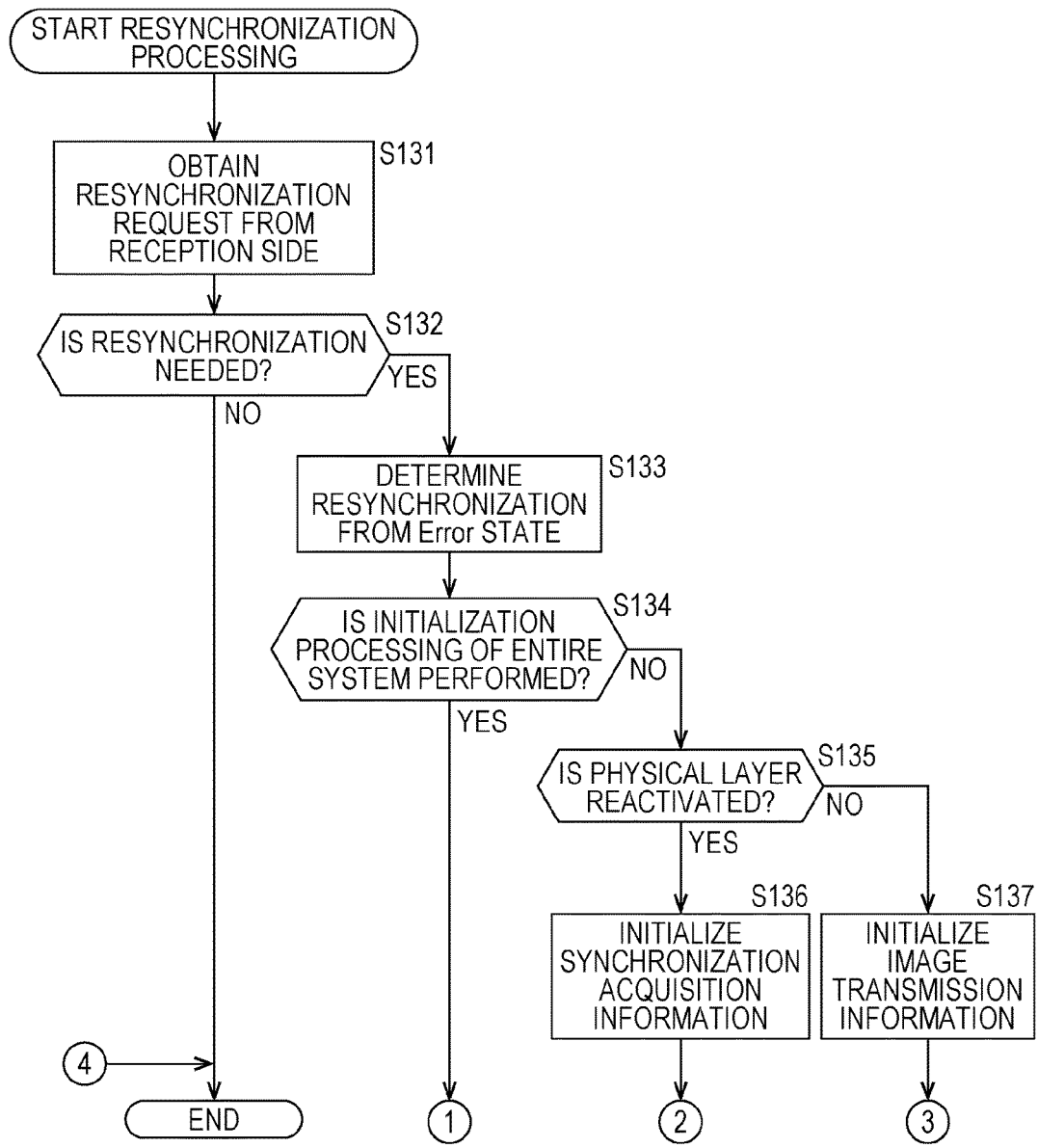
FIG. 11 is a flowchart for explaining an example of flow of re-synchronization processing.

Each processing in step S233 to step S237 is executed in the same manner as each processing in step S133 to step S137 of FIG. 11. However, when it is determined that the initialization processing of the entire system is determined to be performed in step S234, the processing in step S241 of FIG. 15 is subsequently performed. When the processing in step S236 of FIG. 14 is finished, the processing in step S242 of FIG. 15 is subsequently performed. Further, when the processing in step S237 of FIG. 14 is finished, the processing in step S243 of FIG. 15 is subsequently performed.

Figure 15:
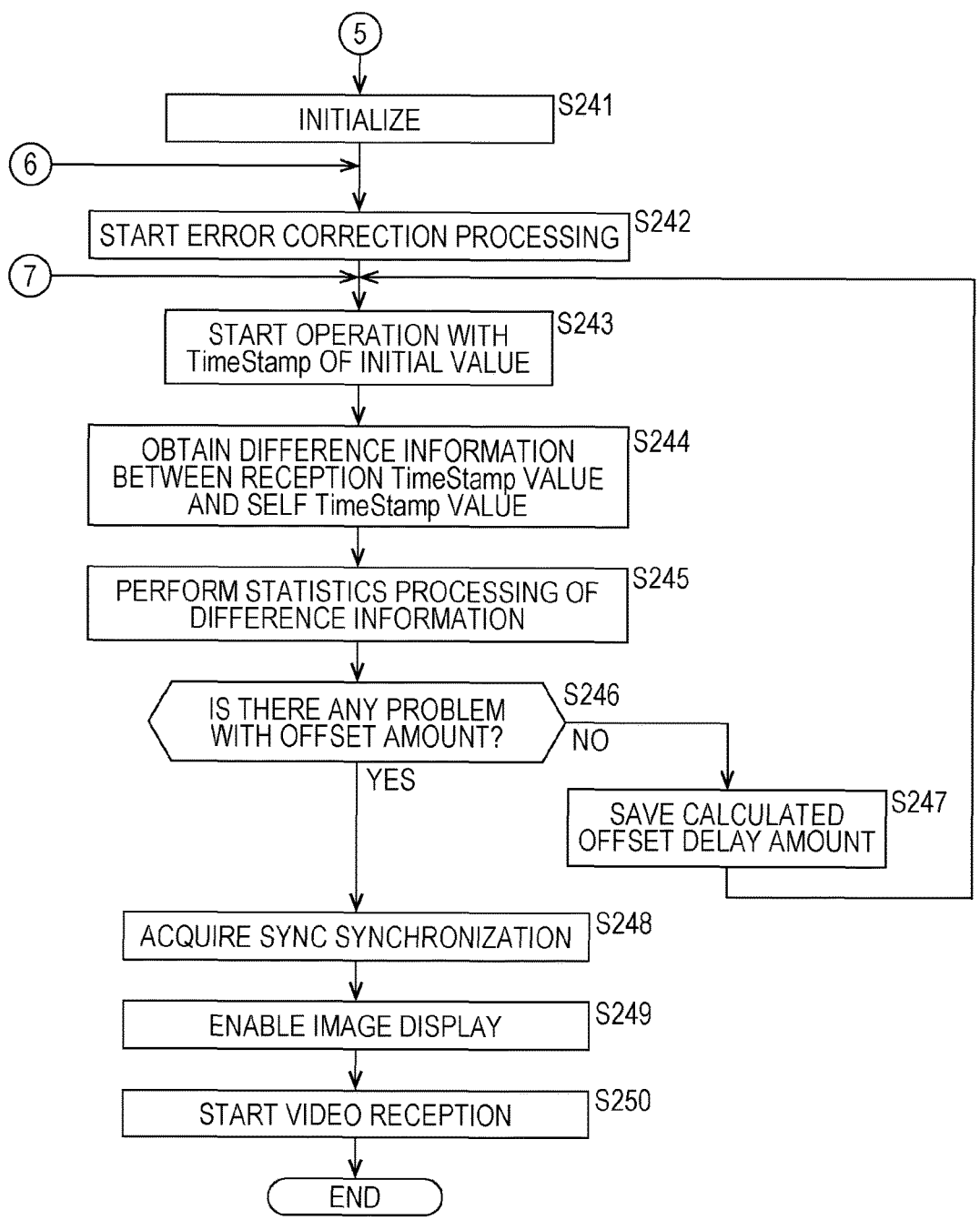
FIG. 15 is a flowchart continued from FIG. 14 for explaining another example of a flow of re-synchronization processing.

Each processing in step S241 to step S250 of FIG. 15 is performed in the same manner as each processing in step S203 to step S212 of FIG. 13.

As described above, the reception apparatus 102 achieves each processing in FIGS. 6 to 9.

More specifically, the transmission apparatus 101 and the reception apparatus 102 can easily perform the synchronization control in the same manner regardless of whether STAY of the synchronization management of the network circuit and STAY of the synchronization management for the transmission are the same or are different.

[1-9 System Configuration Change]

Figure 16:
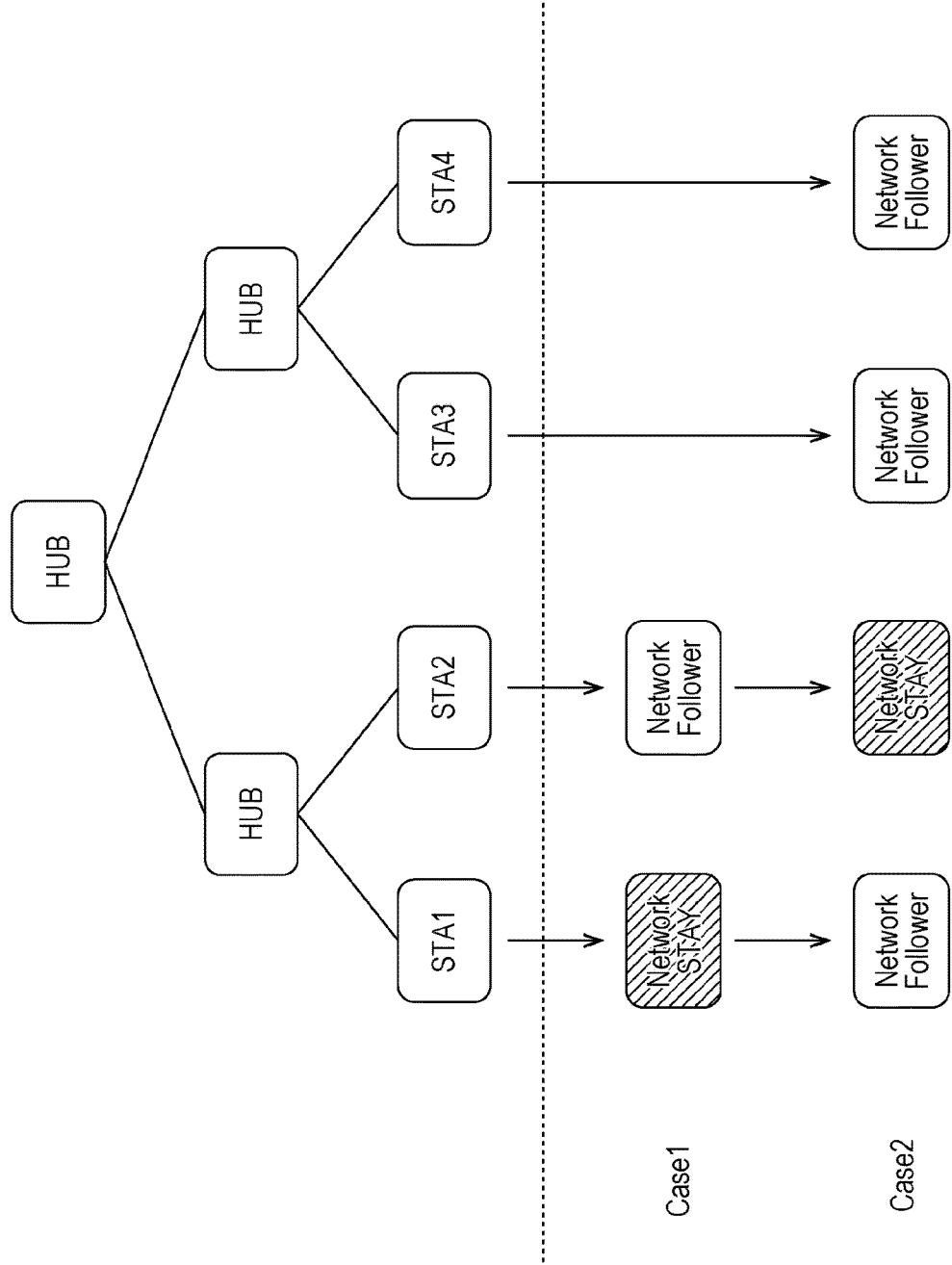
FIG. 16 is a figure for explaining an example of system configuration change.

When the flexible synchronization control explained above is realized, the system configuration can be easily changed. FIG. 16 is a figure for explaining an example of system configuration change.

For example, in a star-type network environment as shown in FIG. 16, a system for transmitting video from a communication apparatus STA1 to a communication apparatus STA2.

When the service starts, images are transmitted between the communication apparatus STA1 and the communication apparatus STA2, and suppose that, during the image transfer, a new communication apparatus STA3 and a new communication apparatus STA4 are connected to the system.

In the example of FIG. 16, the network management unit (STA) is the communication apparatus STA1 when the service starts in the star-type topology (Case1). In this case, exchange of image transmission procedure between STA1 and STA2 is as shown in FIGS. 8 and 9.

Thereafter, suppose that, when the communication apparatus STA3 and the communication apparatus STA4 are connected, the topology is corrected, and the network management unit (STA) is changed from the communication apparatus STA1 to the communication apparatus STA2. In this case, the exchange of image transmission procedure between STA1 and STA2 is as shown in FIGS. 6 and 7.

As described above, even during the service, the transmission apparatus 101 and the reception apparatus 102 of the image transmission system 100 find the change of the topology, and can easily change the transfer processing procedure in accordance with the network management unit to be changed.

The network management unit is not limited to the present embodiment. The network management unit of each link may be changed in response to not only the change of the topology but also network load, topology, and network traffic that changes every moment.

FIGS. 17A to 17C are figures for explaining another example of a system configuration change. In the mesh-type network environment as shown in FIG. 17A, a system for transmitting video from STA1 to STA2 will be considered. In this example, in each link, STA1 is selected as the network management unit (STA) between STA1 and STA3, STA1 is selected as the network management unit (STA) between STA1 and STA4, STA3 is selected as the network management unit (STA) between STA3 and STA4, STA3 is selected as the network management unit (STA) between STA3 and STA2, and STA4 is selected as the network management unit (STA) between STA4 and STA2.

Figure 17:
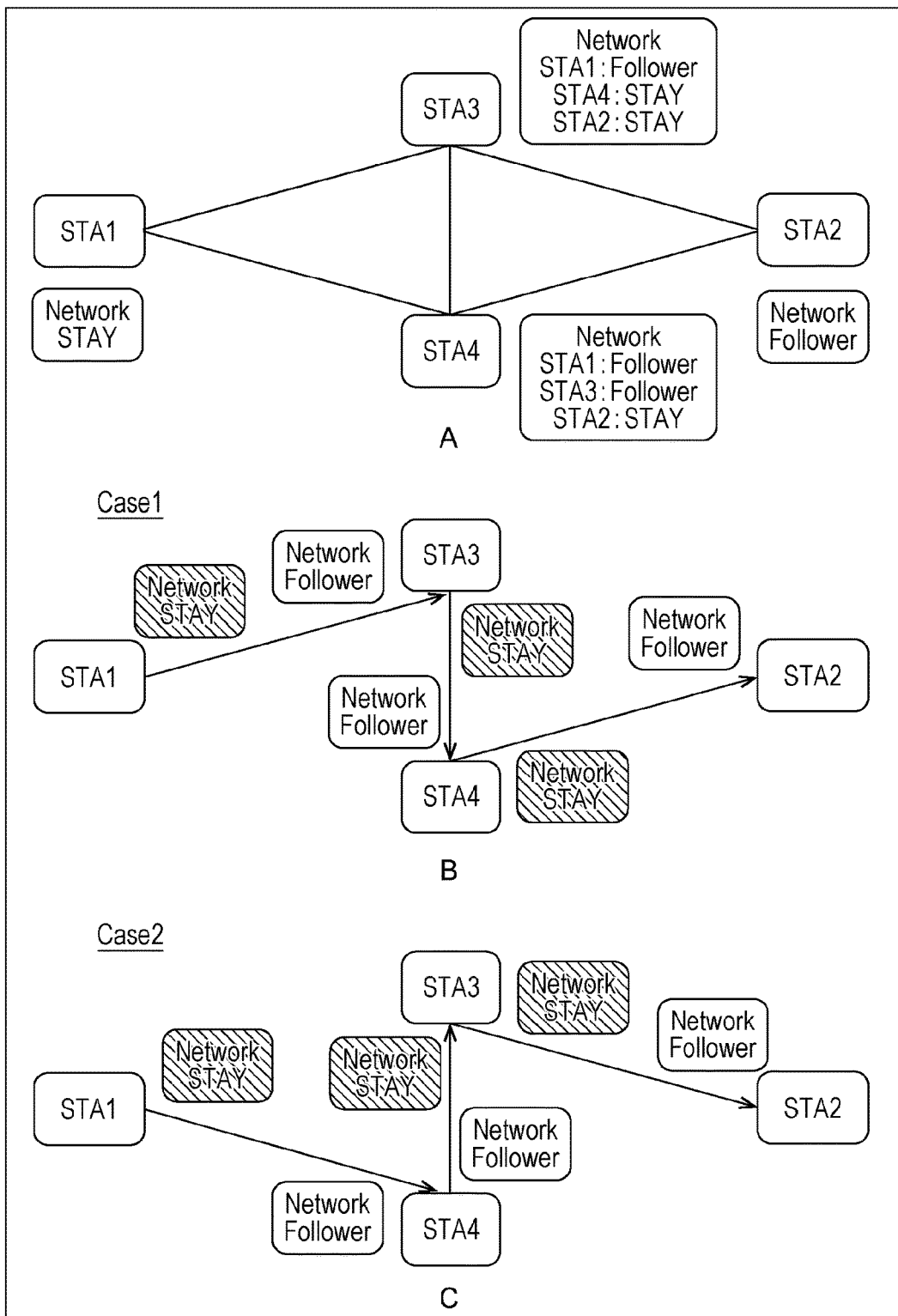
FIGS. 17A to 17C are figures for explaining another example of a system configuration change.
Figure 32:
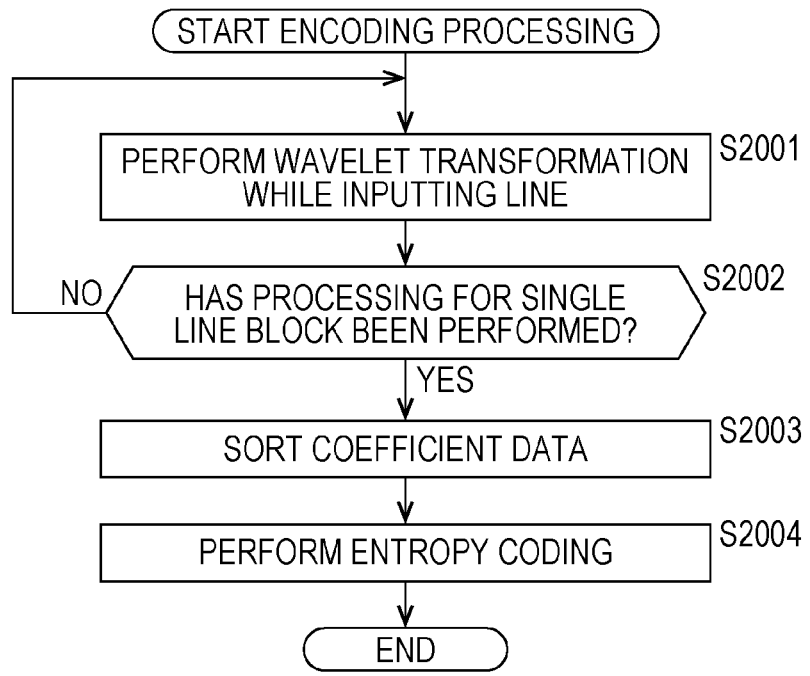
FIG. 32 is a flowchart for explaining an example of a flow of encoding processing.

In this environment, video data are transmitted from STA1 to STA2. As shown in FIG. 32, the transmission path from STA1 to STA2 may be Case1 or Case2. Network path selection method includes Proactive method and Reactive method, but in the present embodiment, using the Proactive method, first, the path selection is set as Case1. It should be noted that the path selection and the time management of the network management unit are considered to be different from each other. In the state where the transmission path is selected as Case1, the exchange of the image transmission procedure between STA3 and STA4 is as shown in FIGS. 8 and 9. During this operation, or when the service is finished, the path selection is done according to the Proactive method, and this time, suppose that Case2 is selected. In Case2, the image transfer procedure according to FIG. 17 is performed.

As described above, according to the present technique, the transfer processing procedure can be changed according to the selected transmission path even in the same topology.

The network management unit is not limited to the present embodiment. The network management unit of each link may be changed in response to not only the change of the topology but also network load, topology, and network traffic that changes every moment.

The Proactive method has been explained as an example of network path selection method. Alternatively, the network path selection method may be Reactive method. Still alternatively, both of them may be used.

Further, in the Proactive method, attempt to select the optimum path is always performed, and in some cases, the path may be abruptly changed to Case2.

[1-10 Flow of Determination Processing]

Alternatively, change in environments such as network configuration are detected as described above, and in accordance with the change, a determination as to the synchronization control of the network circuit may be made as to whether the unit in question is configured to be STAY or Follower.

Figure 18:
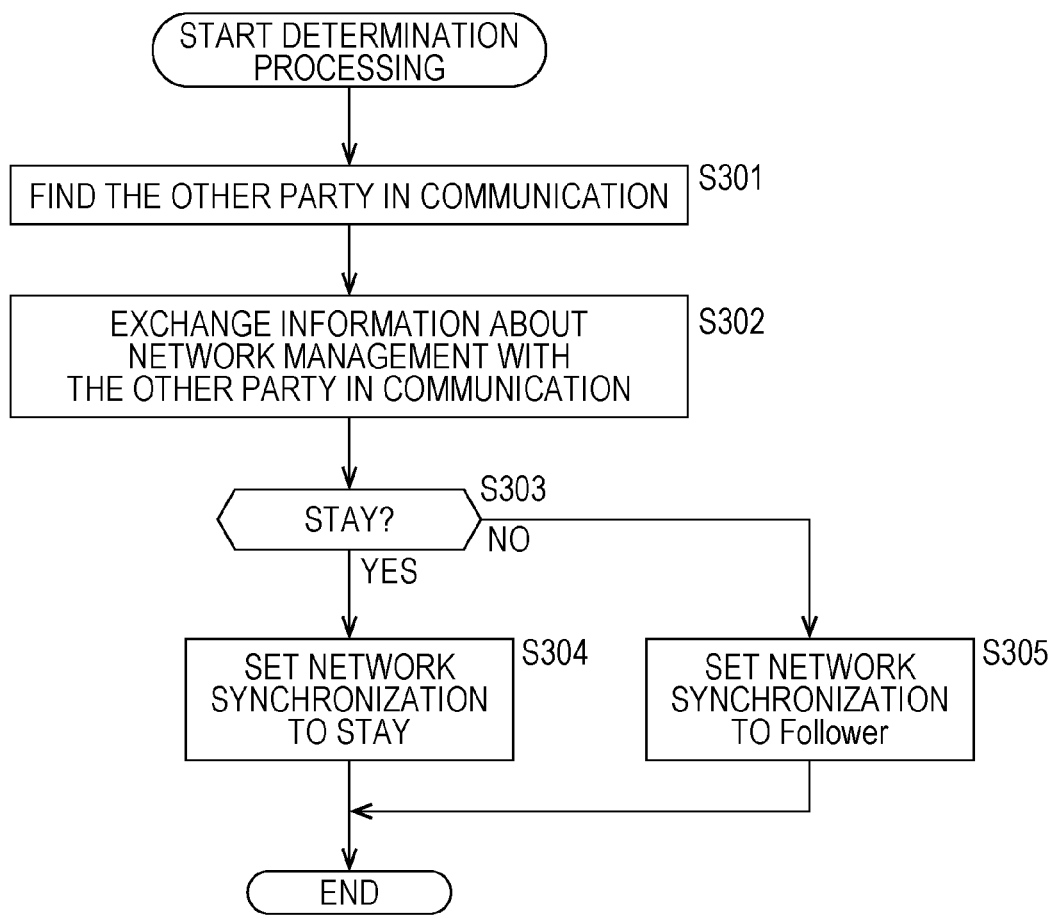
FIG. 18 is a flowchart for explaining an example of flow of determination processing.

An example of a flow of determination processing will be explained with reference to the flowchart of FIG. 18. A case where the processing is executed by the transmission apparatus 101 will be hereinafter explained.

When the determination processing is started, the transmission apparatus 101 finds the other party in communication, which is connected to the network in step S301. In step S302, the transmission apparatus 101 exchanges information about the network management with the other party in communication.

On the basis of the information, the transmission apparatus 101 determines whether the transmission apparatus 101 is to be STAY or not in the synchronization of the network circuit in step S303. When the transmission apparatus 101 determines that the transmission apparatus 101 is to be STAY, the processing in step S304 is subsequently performed.

In step S304, the transmission apparatus 101 sets the network synchronization to STAY. When the processing in step S304 is finished, the determination processing is terminated.

In step S303, when the transmission apparatus 101 determines that the transmission apparatus 101 is not to be STAY, the processing in step S305 is subsequently performed.

In step S305, the transmission apparatus 101 sets the network synchronization to Follower. When the processing in step S305 is finished, the determination processing is terminated.

By performing the determination processing as described above, the transmission apparatus 101 can flexibly configure the setting of STAY (Follower) in accordance with the change of the system configuration. When the processing is executed by the reception apparatus 102, basically the same processing as the processing performed where the transmission apparatus 101 executes the processing. More specifically, like the transmission apparatus 101, the reception apparatus 102 can also flexibly configure the setting of STAY (Follower) in accordance with the change of the system configuration.

The synchronization control explained above may be applied to any system as long as it is a system for transmitting image data. For example, this can also be applied to a system for performing delay control of FEC processing so as to more greatly reduce the amount of delay as explained below.

<2. Second Embodiment>

[2-1. Delay Ratio Example]

In the past, applications and services for transferring image data (in particular, motion picture data) via various kinds of networks such as the Internet and LAN (Local Area Network) are widely used.

When image data are transmitted and received via a network, in many cases, the amount of data is reduced by encoding (compression) processing at the transmission side and the reduced data are transmitted to the network, and then the reception side performs decoding (extraction) processing on the encoded reception data to reproduce the data.

For example, the most well known method for image compression processing is a compression technique called MPEG (Moving Pictures Experts Group). When MPEG compression technique is used, an MPEG stream generated according to the MPEG compression technique is stored into an IP packet according to IP (Internet Protocol), and is distributed via a network. Then, the MPEG stream is received using a communication terminal such as a PC (Personal Computer), a PDA (Personal Digital Assistants), and a cellular phone, and the MPEG stream is displayed on the screen of each terminal.

Under such circumstances, applications such as video-on-demand, distribution of live video, or video conference and video phone which are mainly for the purpose of distribution of image data may be used in an environment in which all the data from the transmission side do not reach the reception side due to jitter of the network and an environment in which image data are received by terminals of which performances are different from each other, and it is necessary to take such environments into consideration.

For example, image data transmitted from a single transmission source may be received and displayed by a reception terminal having a low-resolution display and having a low-performance CPU (Central Processing Unit) such as a cellular phone. At the same time, the image data may also be received and displayed by a reception terminal having a high-resolution monitor and having a high-performance processor such as a desk top PC.

As described above, when the packet reception situation is considered to differ according to the network connection environment, for example, a technique called hierarchical encoding is used to execute encoding transmitted/received data in a hierarchical manner. For example, the hierarchically encoded image data selectively holds encoded data for a reception terminal having a high-resolution display and encoded data for a reception terminal having a low resolution display, and in the hierarchically encoded image data, the image size and the image quality can be changed as necessary by the reception side.

Examples of compression/extraction methods capable of hierarchical encoding include video stream based on MPEG 4 and JPEG (Joint Photographic Experts Group) 2000. FGS (Fine Granularity Scalability) technique is planned to be incorporated into the MPEG 4 and into a profile. This hierarchical encoding technique is said to enable distribution to be done ranging from a low bit rate to a high bit rate in a scalable manner.

In the JPEG 2000 based on the wavelet (Wavelet) transformation, a packet can be generated on the basis of spatial resolution by making use of wavelet transformation, or a packet can be generated in a hierarchical manner on the basis of an image quality. In the JPEG 2000, a hierarchical data can be saved in file format based on Motion JPEG 2000 (Part3) specification capable of handling not only still pictures but also motion pictures.

Further, one of specific ideas for data communication using hierarchical encoding is based on discrete cosine transform (DCT). This is a method including applying DCT processing on, e.g., image data which are to be communicated, making hierarchy by distinguishing a high region and a low region by the DCT processing, generating a packet which is divided into hierarchy including the high region and the low region, and thus executing data communication.

When such hierarchical encoded image data are distributed, in general, it is required to have timeliness (real-time property), but under the current situation, display on a larger screen and a higher image quality tend to have greater priority over the real-time property.

In order to ensure the real-time property in image data distribution, usually UDP (User Datagram Protocol) is used as an IP-based communication protocol. Further, RTP (Real-time Transport Protocol) is used in a layer above the UDP. The data format stored in an RTP packet is in accordance with each format defined for application, which is, more specifically, encoding method.

The communication network uses communication methods such as wireless LAN or wired LAN, optical fiber communication, xDSL, power line communication, or coaxial line. The speeds of these communication methods are increasing year by year, but the image contents transmitted over the communication methods are also becoming higher image quality.

For example, coding delay (encoding delay+decoding delay) of a typical system according to MPEG method or JPEG 2000 method which is mainly used today is two pictures or more, and in this case, sufficient timeliness (real-time property) is hardly ensured in the image data distribution.

Therefore, recently, an image compression method for dividing a single picture into sets each including N lines (N is one or more), and encoding the image in each divided set (hereinafter referred to as line block) to reduce the delay time (hereinafter referred to as line-based codec) has been suggested.

The advantage of the line-based codec is not only a shorter delay but also ability to achieve high speed processing and reduction of hardware scale because less information is treated in a unit of image compression.

For example, Patent Document 1 describes a communication apparatus that performs complementing processing of missing data appropriately for each line block of communication data based on line-based codec.

Patent Document 2 describes an information processing apparatus for reducing delay and improving the efficiency of processing when line-based codec is used.

Further, Patent Document 3 describes a transmission apparatus that suppresses degradation of the image quality by transmitting a low frequency component of image data that have been subjected to line-based wavelet transformation.

Since the use of the line-based codec enables transmission with high image quality and shorter delay, it is expected to be applied to a camera system for live broadcast in the future.

However, the image data include a large amount of data. Therefore, when the image data are transmitted via a generally-available circuit such as Ethernet (registered trademark), NGN (Next Generation Network), or wireless network, the increase in the amount of delay may spoil the timeliness (real-time property) of the image data transmission.

In particular, for example, a camera system that performs live broadcast and the like is required to have timeliness of the data transmission. However, since high quality motion picture data are transmitted, the amount of data is high. Therefore, in the data transmission via the generally-available circuit, the timeliness may be corrupted with a still higher degree of possibility.

Further, it is necessary to establish a system configuration where a certain level of errors on the circuit is expected in order to cope with a generally-available circuit. In the case of dedicated line, the bandwidth can be controlled locally, but in the case of generally-available circuit, the stability of the circuit is not guaranteed, and therefore, this error handling is almost indispensable. However, such addition of a function may result in occurrence of further delay.

Figure 19:
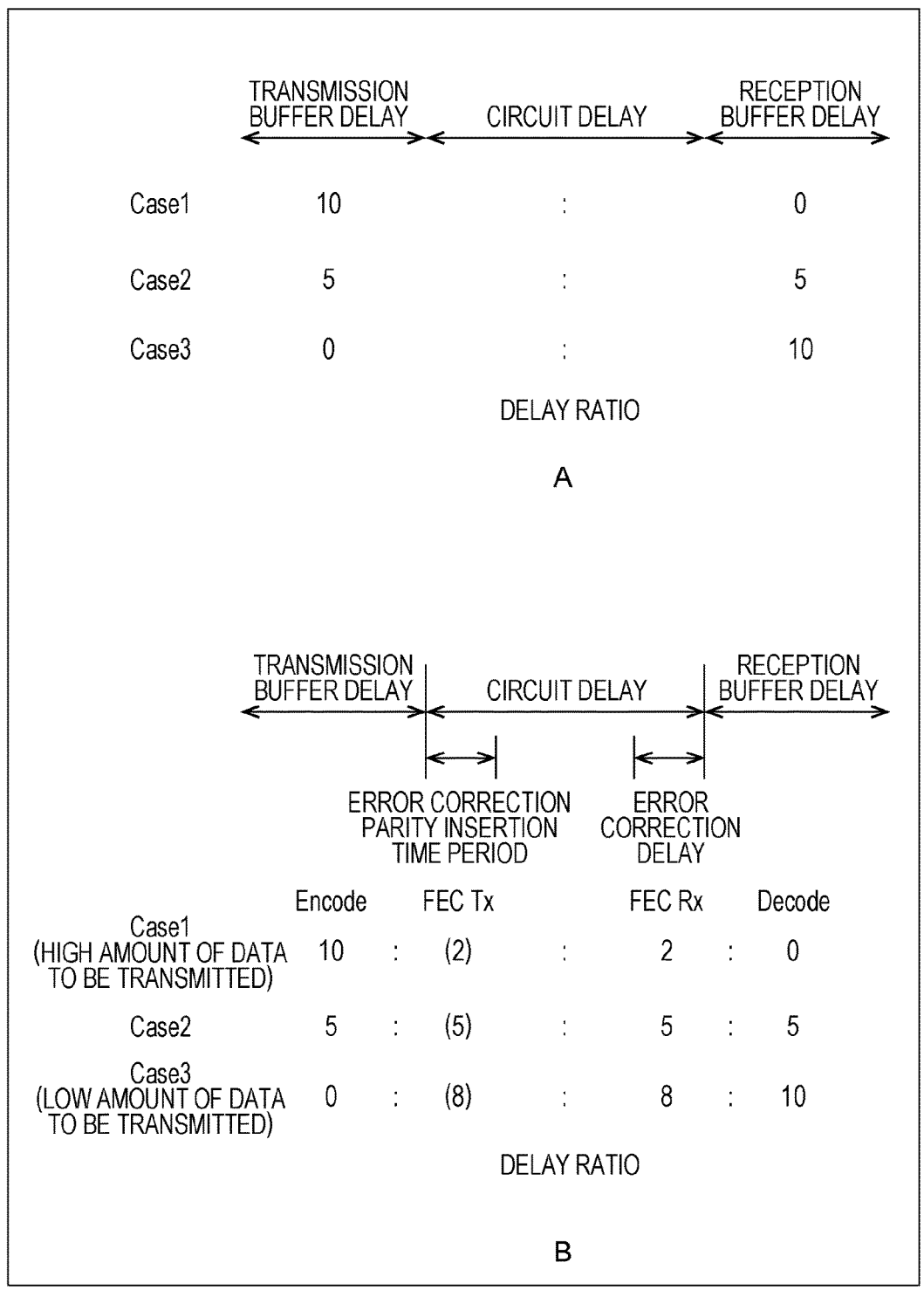
FIGS. 19A and 19B are figures illustrating an example of a delay ratio in data transmission.

FIGS. 19A and 19B illustrate a delay ratio of data transmission in a system described in the Patent Document 2. In this system, in order to achieve a shorter delay, the amount of buffer delay is shared by the transmission side and the reception side. The line-based codec allows for greatly less time that can be used for calculation as compared with the picture-based codec. Therefore, the transmission buffer waiting time+the reception buffer waiting time are configured to be constant, and difficult image data are encoded, the ratio of the waiting time of the transmission/reception buffer is changed, and the control is performed so that the buffer waiting time used for the transmission is increased, and the waiting time of the reception buffer is reduced by the amount corresponding to the amount of increase. When the transmission buffer waiting time is increased, a large amount of data temporarily generated by a difficult image can be absorbed in terms of system delay. Case1 to Case3 show an example of delay ratio in a case where classification is done in accordance with the amount of memory accumulation of video data. Case1 shows a delay ratio in a case where the amount of memory accumulation (the amount of transmission data) is the highest. Case3 shows a delay ratio in a case where the amount of memory accumulation (the amount of transmission data) is the lowest.

However, there is a limitation in achieving a short delay using codec alone, and in a short delay environment as shown in the drawing, it is necessary to have a know-how to achieve a short delay with various functions in the entire system. For example, in the circuit delay in FIG. 19A, an environment for implementing a packet loss recovery function is considered as a function for recovering some circuit errors.

In general, the packet correction function includes two kinds which are an inner code for performing bit error correction and an outer code used for block correction and loss recovery function. In order to make the explanation easy to understand in this specification, the outer code is used in the explanation. With the outer code, processing is often performed in units of packets or in units of certain blocks. The outer code includes, for example, Reed-Solomon code, LDPC (Low Density Parity Check) code, hamming code, BCH (Bose-Chaudhuri-Hocquenghem) code, Raptor code, and LT (Luby Transform) code (trademark), and the like. In FIG. 19A, a method for performing processing of packet loss recovery function only for a period when the delay is short will be considered. It is to be understood that the method of the block code may be any give method.

First, the amount of delay and the amount of data possessed by the codec will be considered. When the amount of transmission data is high, the transmission side transmits the encoded data with a delay of a predetermined period of time within a range of very short amount of delay. In contrast, when the amount of transmission data is low, the encoded data are transmitted substantially without any delay. More specifically, at the transmission side, the encoded data which are to be transmitted are held in the buffer for a time based on the amount of transmission data (transmission buffer waiting time).

The reception side needs to have sufficient data when the data are decoded. For this reason, to be prepared for a high amount of data in a subsequent precinct is high, the decoding start time is controlled so that the transmission buffer waiting time+the reception buffer waiting time becomes constant. More specifically, at the reception side, the received encoded data are stored in a buffer for a time based on the transmission buffer waiting time (reception buffer waiting time).

In FIG. 19B, operation in a case where FEC (Forward Error Correction) which is a block code is adapted is described as an embodiment. With the block code, processing is performed on every number of blocks determined in advance, and therefore, it is common for the reception side to wait until the reception side receives the data for that block.

The reception side receives encoded data for certain blocks (or packets), and thereafter, Error Correction processing is performed upon receiving the parities. Therefore, necessarily, the reception side needs to wait for the same period of time as the error correction parity insertion time period at the transmission side.

In the system that performs the encoding processing, the transmission buffer waiting time occurs as described above. More specifically, the higher the amount of transmission data is, the more likely the data for the required blocks are obtained. For this reason, at the transmission side, the FEC processing time decreases, the lower the amount of transmission data is, the longer the FEC processing time tends to be. For example, in FIG. 19B, the FEC processing waiting time of Case1 is likely to be shorter than the processing time of Case3.

More specifically, when the circuit delay excluding the FEC processing is the same in each of the Cases, the total system delay is as follows: the total system delay in Case1 is 12, the total system delay in Case2 is 15, and the total system delay in Case3 is 18. More specifically, when the amount of transmission data decreases, the amount of delay in the entire system may increase.

[2-2 Image Transmission System]

Therefore, the FEC processing waiting time is appropriately controlled at the transmission side, thus suppressing the increase in the delay time as described above.

Figure 20:
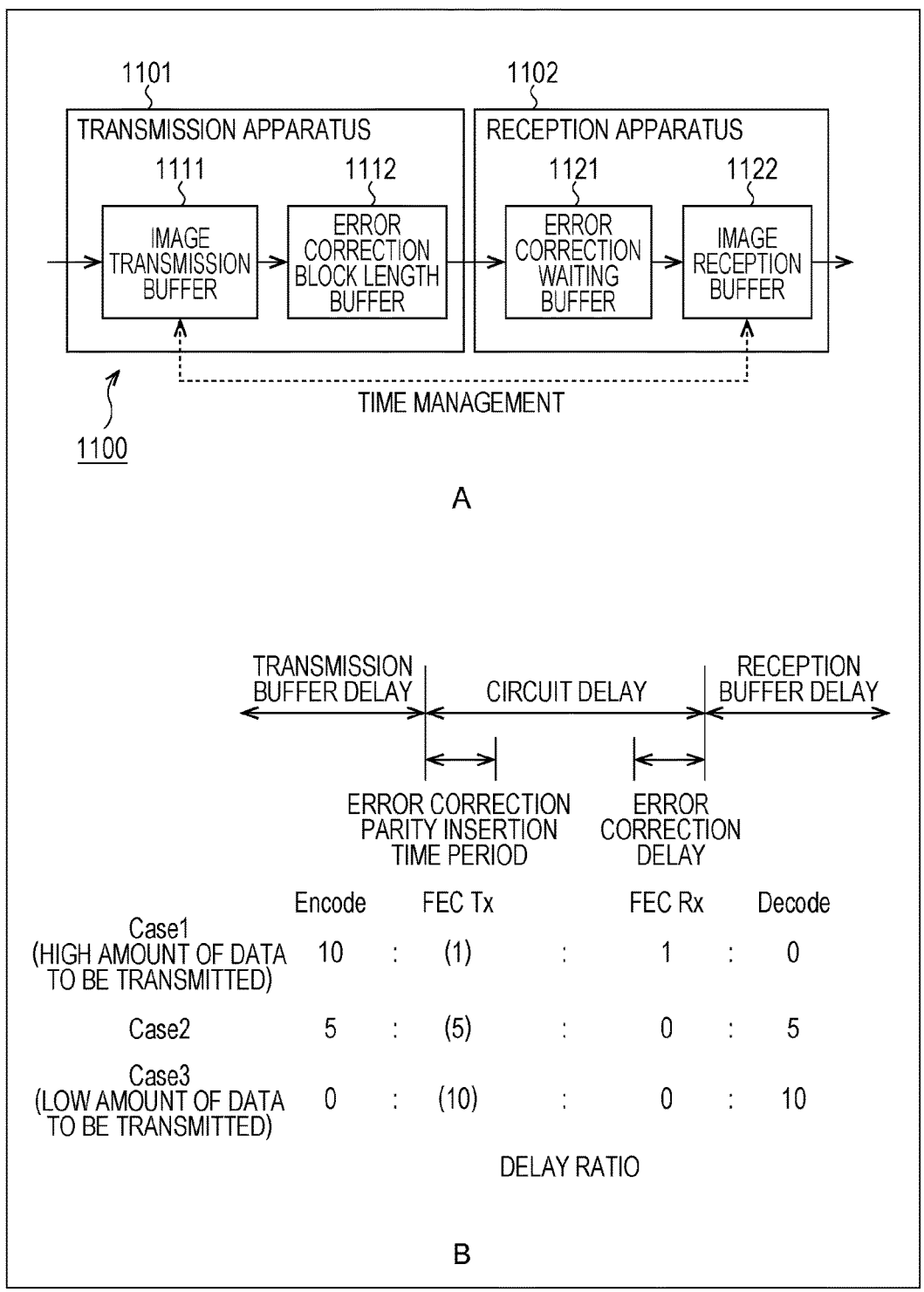
FIGS. 20A and 20B are figures illustrating a typical example of configuration of an image transmission system to which the present technique is applied, and illustrating an example of a delay ratio thereof.

FIGS. 20A and 20B are a typical example of configuration of an image transmission system to which the present technique is applied, and is a figure illustrating an example of the delay ratio thereof.

An image transmission system 1100 as shown in FIG. 20A is an image processing system to which the present technique is applied, and includes a transmission apparatus 1101, and a reception apparatus 1102. The image transmission system 1100 is a system for transmitting encoded data, which are obtained by encoding image data, from the transmission apparatus 1101 to the reception apparatus 1102 via any given network including a generally-available circuit.

The transmission apparatus 1101 is an image processing apparatus to which the present technique is applied. The transmission apparatus 1101 transmits the received encoded data to the reception apparatus 1102. As shown in FIG. 20A, the transmission apparatus 1101 includes an image transmission buffer 1111 and an error correction block length generation unit 1112.

The image transmission buffer 1111 accumulates the encoded data which are input from a processing unit (not shown) in a previous stage which encodes image data, and provides the encoded data to the error correction block length generation unit 1112 with predetermined timing. The time when the encoded data are accumulated is a transmission buffer waiting time (transmission buffer delay).

The error correction block length generation unit 1112 adds parities to the provided encoded data, and transmits the encoded data to the reception apparatus 1102. The processing time of this error correction block length generation unit 1112 is the error correction parity insertion time period.

The reception apparatus 1102 is the image processing apparatus to which the present technique is applied. The reception apparatus 1102 receives the encoded data which have been transmitted from the transmission apparatus 1101. As shown in FIG. 20A, the reception apparatus 1102 includes an error correction waiting buffer 1121 and an image reception buffer 1122.

The error correction waiting buffer 1121 holds the received encoded data until the error correction waiting buffer 1121 receives the encoded data for the unit for the error correction processing, which is a predetermined packet (block) and the parity therefor. When sufficient data are obtained, the error correction waiting buffer 1121 performs the error correction processing, and provides the encoded data, which have been corrected, to the image reception buffer 1122. The time for which the encoded data are held is the error correction delay.

The image reception buffer 1122 holds the provided encoded data until a predetermined point in time when the decoding processing is started, and when the predetermined point in time arrives, the image reception buffer 1122 provides the encoded data, which are held therein, to a processing unit (not shown) in a later stage which performs the decoding processing. The time for which the encoded data are held is the reception buffer waiting time (reception buffer delay).

In the image transmission system 1100 explained above, an FEC processing amount where the reception buffer waiting time (Decode) and the FEC reception delay time (FEC Rx) are the same will be considered. In FIGS. 20A and 20B, the delay time of the entire system is configured such that the summation of the transmission buffer waiting time (Encode) and the reception buffer waiting time (Decode) becomes 10.

Therefore, the reception buffer waiting time (Decode) can be estimated from the transmission buffer waiting time (Encode). More specifically, the transmission apparatus 1101 can estimate the reception buffer waiting time (Decode) of the reception apparatus 1102.

When the FEC reception delay time (FEC Rx) is set within the range of the reception buffer waiting time (Decode), the FEC reception delay time (FEC Rx) can be included in the reception buffer waiting time (Decode) instead of providing the FEC reception delay time (FEC Rx) in addition to the reception buffer waiting time (Decode) which causes additional waiting. More specifically, the error correction waiting buffer 1121 makes use of the waiting time required by the image reception buffer 1122 to perform the FEC processing, so that the FEC reception delay time (FEC Rx) can be included in the reception buffer waiting time (Decode), which can reduce the amount of delay of the entire system.

Further, this FEC reception delay time (FEC Rx) is determined by the block length which is set by the error correction block length generation unit 1112. More specifically, the transmission apparatus 1101 can set the FEC reception delay time (FEC Rx).

Accordingly, the error correction block length generation unit 1112 of the transmission apparatus 1101 determines the block length of the FEC block on the basis of the transmission buffer waiting time (Encode) of the image transmission buffer 1111, thus controlling the FEC reception delay time (FEC Rx) so that it is not more than the reception buffer waiting time (Decode).

Figure 23:
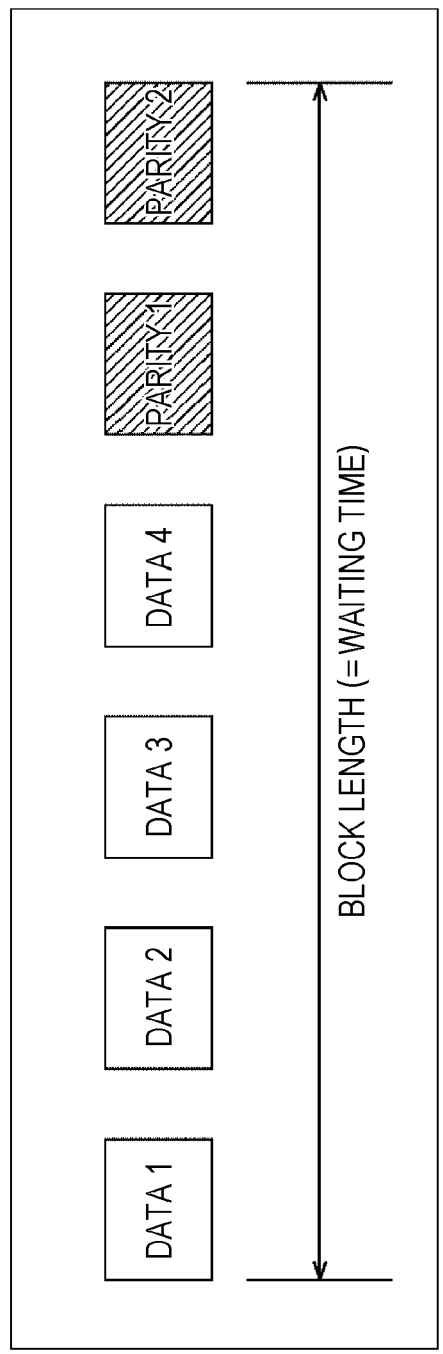
FIG. 23 is a figure illustrating an example of an FEC block.

For example, in the Case1 as shown in FIG. 20B, the ratio of the transmission buffer waiting time (Encode) is 10, and therefore, the ratio of the reception buffer waiting time (Decode) is zero. Therefore, the error correction block length generation unit 1112 sets the block length so that the FEC reception delay time (FEC Rx) is as short as possible. In the drawing, (2) of the Case1 is the delay time due to the FEC, but the time in the parentheses does not cause delay in reality. As shown in FIG. 23, the transmission side inserts only the parity, and therefore, this does not cause any actual delay, and the decoding starts upon the FEC is kept waiting for the ratio "2" at the reception side, and therefore, the reception buffer waiting time is delayed by "2".

In this case, however, the FEC reception processing cannot be finished within the FEC reception delay time (FEC Rx). However, the case where the ratio of the transmission buffer waiting time (Encode) is 10 is the state in which the amount of encoded data is beyond the bandwidth of the transmission path, which causes waiting at the transmission side. More specifically, this means that the amount of transmission data is too much, and the transmission processing delay for the block coding (which is the reception processing delay) is expected to be extremely small. Therefore, in this case, even when the FEC reception delay time (FEC Rx) is added, the summation of the transmission buffer waiting time (Encode) and the reception buffer waiting time (Decode) slightly increases, and this hardly affects the delay amount of the entire system.

In the Case2 in FIG. 20B, the ratio of the reception buffer waiting time (Decode) is five. Therefore, the error correction block length generation unit 1112 sets the block length so that the FEC reception delay time (FEC Rx) is equal to or less than five.

Further, in the Case3 in FIG. 20B, the ratio of the reception buffer waiting time (Decode) is 10. Therefore, the error correction block length generation unit 1112 sets the block length so that the FEC reception delay time (FEC Rx) is equal to or less than 10.

As described above, the FEC reception delay time (FEC Rx) and the reception buffer waiting time (Decode) are configured commonly, and therefore the image transmission system 1100 can reduce the delay time of the entire system.

In addition, such control can be performed by the transmission apparatus 1101 by itself. In other words, it is not necessary to exchange information with the reception apparatus 1102 in order to achieve this control. Moreover, no special control is required by the reception apparatus 1102. More specifically, the transmission apparatus 1101 can easily reduce the delay time of the entire system.

It should be noted that although the transmission buffer waiting time (Encode) varies according to the type of the image, the FEC block length (FEC reception delay time (FEC Rx)) may be determined on the basis of the longest transmission buffer waiting time (Encode) among the range of the variations (more specifically, this is the case where the reception buffer waiting time (Decode) is the shortest).

In the image transmission system 1100 as above, when the transmission apparatus 1101 is caused to execute the management of the synchronization timing in the same manner as the transmission apparatus 101 of the image transmission system. 100 explained above, the video synchronization in the image data transmission can be controlled more easily and the delay time can be suppressed more easily. The same is applicable to the reception apparatus 1102. More specifically, when the reception apparatus 1102 is caused to execute the management of the synchronization timing in the same manner as the reception apparatus 102 of the image transmission system 100 explained above, the video synchronization in the image data transmission can be controlled more easily and the delay time can be suppressed more easily.

<3. Third Embodiment>
[3-1 Image Processing System]

The present technique explained above is not limited to the system having the configuration as shown in FIGS. 20A and 20B, and can also be applied to any given system that performs image data transmission which requires timeliness. Therefore, the configuration and the purpose of the system are not particularly limited.

For example, the present technique may also be applied to a camera system for live sports broadcast and live event broadcast. In such camera system, image data captured and taken by multiple cameras (image-capturing devices) are transmitted according to the control of the camera control unit (CCU).

Figure 21:
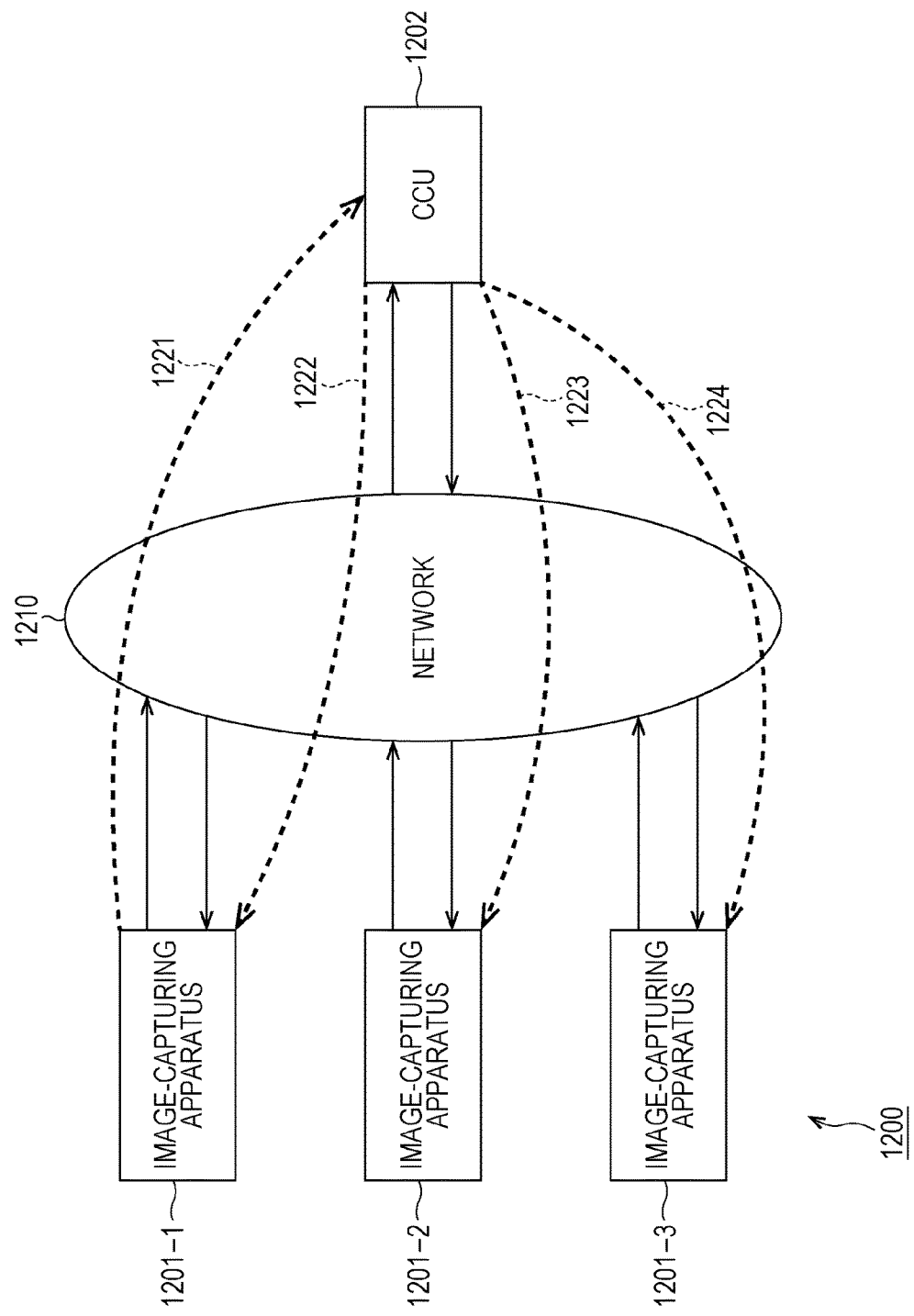
FIG. 21 is a figure illustrating a typical example of configuration of the image processing system to which the present technique is applied.

FIG. 21 is a figure illustrating a typical example of configuration of an image processing system to which the present technique is applied. An image processing system 1200 as shown in FIG. 21 is a camera system to which the present technique is applied. The image processing system 1200 includes an image-capturing device 1201-1 to an image-capturing device 1201-3, and a CCU 1202. According to the control of the CCU 1202, the image-capturing device 1201-1 to the image-capturing device 1201-3 can communicate with the CCU 1202 via a network 1210 which is a generally-available circuit, and for example, the image-capturing device 1201-1 to the image-capturing device 1201-3 can exchange encoded data of images and sounds, and exchange control data.

When it is not necessary to explain the image-capturing device 1201-1 to image-capturing device 1201-3 in such a manner that the image-capturing device 1201-1 to image-capturing device 1201-3 are distinguished from each other, the image-capturing device 1201-1 to image-capturing device 1201-3 will be simply referred to as an image-capturing device 1201. In FIG. 21, three image-capturing devices 1201 are provided. However, the image processing system 1200 may have any number of image-capturing devices 1201.

For example, encoded data of images and sounds obtained by the image-capturing device 1201-1 according to the control of the CCU 1202 are transmitted via the network 1210 to the CCU 1202. The encoded data are, for example, decoded by the CCU 1202, and are, for example, transmitted as image data and sound data to an information processing apparatus in a later stage, not shown, such as an editing apparatus and a relay apparatus.

The image-capturing device 1201 has a monitor (display unit), a speaker, and the like with which a user (who is a photographer) of the image-capturing device 1201 checks captured images and broadcast images, and can decode the encoded data transmitted from the CCU 1202, display images on the monitor, and output sound from the speaker.

Accordingly, for example, the CCU 1202 can return the encoded data which has been transmitted from the image-capturing device 1201-1 (arrow 1221) back to the image-capturing device 1201-1 (arrow 1222), and can transmit the encoded data to other image-capturing devices 1201 such as the image-capturing device 1201-2 and the image-capturing device 1201-3 (arrow 1223, and arrow 1224).

In such data transmission, timeliness is required so as not to corrupt motion picture display and sound output. Since the delay time of the entire data transmission can be reduced by applying the present technique explained in the first embodiment, the corruption of the motion picture display and the sound output can be suppressed.

[3-2 Image-Capturing Device]

Figure 22:
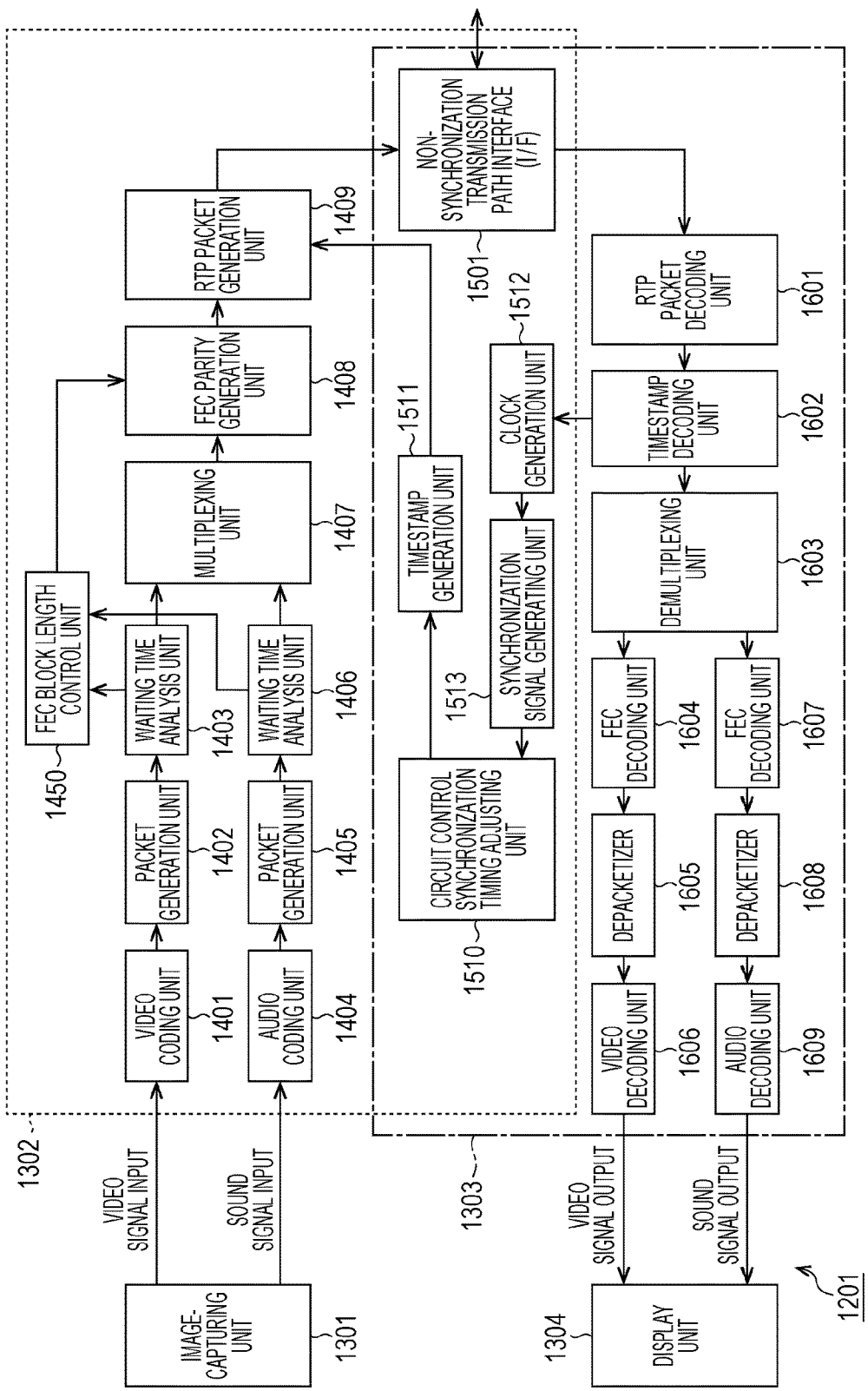
FIG. 22 is a block diagram illustrating a typical example of configuration of an image-capturing device.

FIG. 22 is a block diagram illustrating a typical example of configuration of the image-capturing device 1201 of FIG. 21. As shown in FIG. 22, the image-capturing device 1201 includes an image-capturing unit 1301, a transmission unit 1302, a reception unit 1303, and a display unit 1304.

The image-capturing unit 1301 captures an image of a subject, and generates image data and sound data. The image-capturing unit 1301 provides the image data and the sound data thus generated to the transmission unit 1302.

The transmission unit 1302 obtains and encodes the image data (video signal input) and the sound data (sound signal input) provided from the image-capturing unit 1301. The transmission unit 1302 transmits the generated encoded data to the CCU 1302 and the like.

The reception unit 1303 receives the encoded data of images and sounds transmitted from the CCU 1202 and the like, decodes the received encoded data, extracts image data and sound data, and provides the image data and the sound data to the display unit 1304.

The display unit 1304 has a monitor for displaying an image and a speaker for outputting sound. The display unit 1304 displays, on a monitor, the image of the image data (video signal output) provided from the reception unit 1303. The display unit 1304 outputs, from the speaker, the sound of the sound data (sound signal output) provided from the reception unit 1303.

As shown in FIG. 22, the transmission unit 1302 includes a video coding unit 1401, a packet generation unit 1402, awaiting time analysis unit 1403, an audio coding unit 1404, a packet generation unit 1405, and a waiting time analysis unit 1406. The transmission unit 1302 includes a multiplexing unit 1407, an FEC parity generation unit 1408, an RTP packet generation unit 1409, and an FEC block length control unit 1450. Further, the transmission unit 1302 includes a non-synchronization transmission path interface (I/F) 1501, a circuit control synchronization timing adjusting unit 1510, and a timestamp generation unit 1511.

It should be noted that a clock generation unit 1512 and a synchronization signal generating unit 1513 are not included in the transmission unit 1302. On the other hand, the non-synchronization transmission path interface (I/F) 1501 and the circuit control synchronization timing adjusting unit 1510 share the reception unit 1303.

The video coding unit 1401 encodes the video signal which is output from the image-capturing unit 1301, and provides the video signal to the packet generation unit 1402. The packet generation unit 1402 adds an image header to the provided encoded data to make it into a packet.

The packet generation unit 1402 adds a timestamp (video control layer synchronization timestamp) synchronized with a medium to the packet of the encoded data. The packet generation unit 1402 provides the packet of the encoded data to the waiting time analysis unit 1403.

The waiting time analysis unit 1403 determines how long the packet of the video data is stored in the transmission buffer of the video coding unit 1401, on the basis of the video control layer synchronization timestamp attached to the packet. Then, the waiting time analysis unit 1403 estimates the reception buffer waiting time (Decode) on the basis of the determination result. The waiting time analysis unit 1403 provides the estimated reception buffer waiting time (Decode) to the FEC block length control unit 1450, and provides the other data to the multiplexing unit 1407.

The audio coding unit 1404 encodes the audio signal which is output from the image-capturing unit 1301, and provides the audio signal to the packet generation unit 1405. The packet generation unit 1405 adds a sound header to the provided encoded data to make it into a packet.

The packet generation unit 1405 also adds a timestamp (video control layer synchronization timestamp) synchronized with the medium to the packet of the encoded data. The packet generation unit 1405 provides the packet of the encoded data to the waiting time analysis unit 1406.

The waiting time analysis unit 1406 determines how long the packet of the sound data is stored in the transmission buffer of the audio coding unit 1404, on the basis of the video control layer synchronization timestamp attached to the packet. Then, the waiting time analysis unit 1406 estimates the reception buffer waiting time (Decode) on the basis of the determination result. The waiting time analysis unit 1406 provides the estimated reception buffer waiting time (Decode) to the FEC block length control unit 1450, and provides the other data to the multiplexing unit 1407.

The multiplexing unit 1407 multiplexes the packet of the video data and the packet of the sound data to make them into a single stream.

The FEC block length control unit 1450 sets the FEC reception delay time (FEC Rx) so that it is shorter than the reception buffer waiting time (Decode) provided by the waiting time analysis unit 1403 and the waiting time analysis unit 1406. Then, the FEC block length control unit 1450 sets the FEC block length so as to achieve such FEC reception delay time (FEC Rx). The FEC block length control unit 1450 provides the FEC parity generation unit 1408 with information indicating the FEC block length which has been set.

When the FEC parity generation unit 1408 obtains the encoded data made into the packets provided from the multiplexing unit 1407 for the FEC block length which has been set by the FEC block length control unit 1450, the FEC parity generation unit 1408 inserts parities. With the FEC block, the data can be corrected only after the parity has been received, and therefore, the FEC decoding unit waits for the block length determined in advance (until the parity data have been received), and then performs calculation.

FIG. 23 illustrates a conceptual diagram of FEC data transmission. When the FEC parity generation unit 1408 transmits data for the block length which is set by the FEC block length control unit 1450, the FEC parity generation unit 1408 inserts parities. In the example of FIG. 23, two parities are generated for four pieces of data corresponding to the application data. The FEC decoding unit starts receiving the data 1 first, and then, the FEC decoding unit performs the FEC decoding processing only after the FEC decoding unit has received all the data and the parities including the parity 2, and therefore, it is necessary to wait for a time required to receive the block length.

When the FEC parity generation unit 1408 inserts the parity, the FEC parity generation unit 1408 provides the data to the RTP packet generation unit 1409.

The RTP packet generation unit 1409 generates an RTP packet. The timestamp generation unit 1511 generates a circuit control layer synchronization timestamp in accordance with the control of the circuit control synchronization timing adjusting unit 1510. The RTP packet generation unit 1409 adds the circuit control layer synchronization timestamp to the RTP packet. The RTP packet generation unit 1409 provides the generated RTP packet to the non-synchronization transmission path interface (I/F) 1501.

The non-synchronization transmission path interface 1501 adds an UDP header and an IP header to the RTP packet, thus generating an IP packet. The non-synchronization transmission path interface 1501 outputs the generated IP packet to the outside of the image-capturing device 1201, and transmits the generated IP packet to the CCU 1202.

As shown in FIG. 22, the reception unit 1303 includes a non-synchronization transmission path interface (I/F) 1501, a circuit control synchronization timing adjusting unit 1510, a clock generation unit 1512, and a synchronization signal generating unit 1513. The reception unit 1303 includes an RTP packet decoding unit 1601, a timestamp decoding unit 1602, a demultiplexing unit 1603, an FEC decoding unit 1604, a depacketizer 1605, and a video decoding unit 1606. Further, the reception unit 1303 includes an FEC decoding unit 1607, a depacketizer 1608, and an audio decoding unit 1609.

It should be noted that the timestamp generation unit 1511 is not included in the reception unit 1303. The non-synchronization transmission path interface (I/F) 1501 and the circuit control synchronization timing adjusting unit 1510 are shared with the transmission unit 1302. It is to be understood that the transmission unit 1302 and the reception unit 1303 may not share these processing units, and each of the transmission unit 1302 and the reception unit 1303 may have the non-synchronization transmission path interface (I/F) 1501 and the circuit control synchronization timing adjusting unit 1510.

The return video data packet, the audio data packet, and the command data packet transmitted from the CCU 1202 are received via the non-synchronization transmission path interface (I/F) 1501, and the RTP packet decoding unit 1601 checks the IP header and the RTP header therein. Subsequently, the RTP header including the video data and the sound data is provided to the timestamp decoding unit 1602, and only the circuit control layer synchronization timestamp added after the RTP header is transmitted to the clock generation unit 1512.

The demultiplexing unit 1603 demultiplexes the image data and the sound data. The FEC decoding unit 1604 performs the FEC decoding processing on the packet of the image data. The FEC decoding unit 1604 uses the parities added by the FEC parity generation unit 1408 to restore incorrect packet or lost packet. The timestamp is used by the camera to generate a clock and a synchronization signal.

The depacketizer 1605 depacketizes the packet of image data which have been FEC-decoded. The video decoding unit 1606 decodes the encoded data of the image data obtained by depacketizing the packet, and provides the data to the display unit 1304 as a video signal output.

Likewise, the FEC decoding unit 1607 performs the FEC decoding processing on the packet of the sound data. The FEC decoding unit 1607 uses the parities added by the FEC parity generation unit 1408 to restore incorrect packet or lost packet. The timestamp is used by the camera to generate a clock and a synchronization signal.

The depacketizer 1608 depacketizes the packet of the sound data which have been FEC-decoded. The audio decoding unit 1609 decodes the encoded data of the sound data obtained by depacketizing the packet, and provides the data to the display unit 1304 as a sound signal output.

[3-3 Example of Configuration of Packet]

Figure 24:
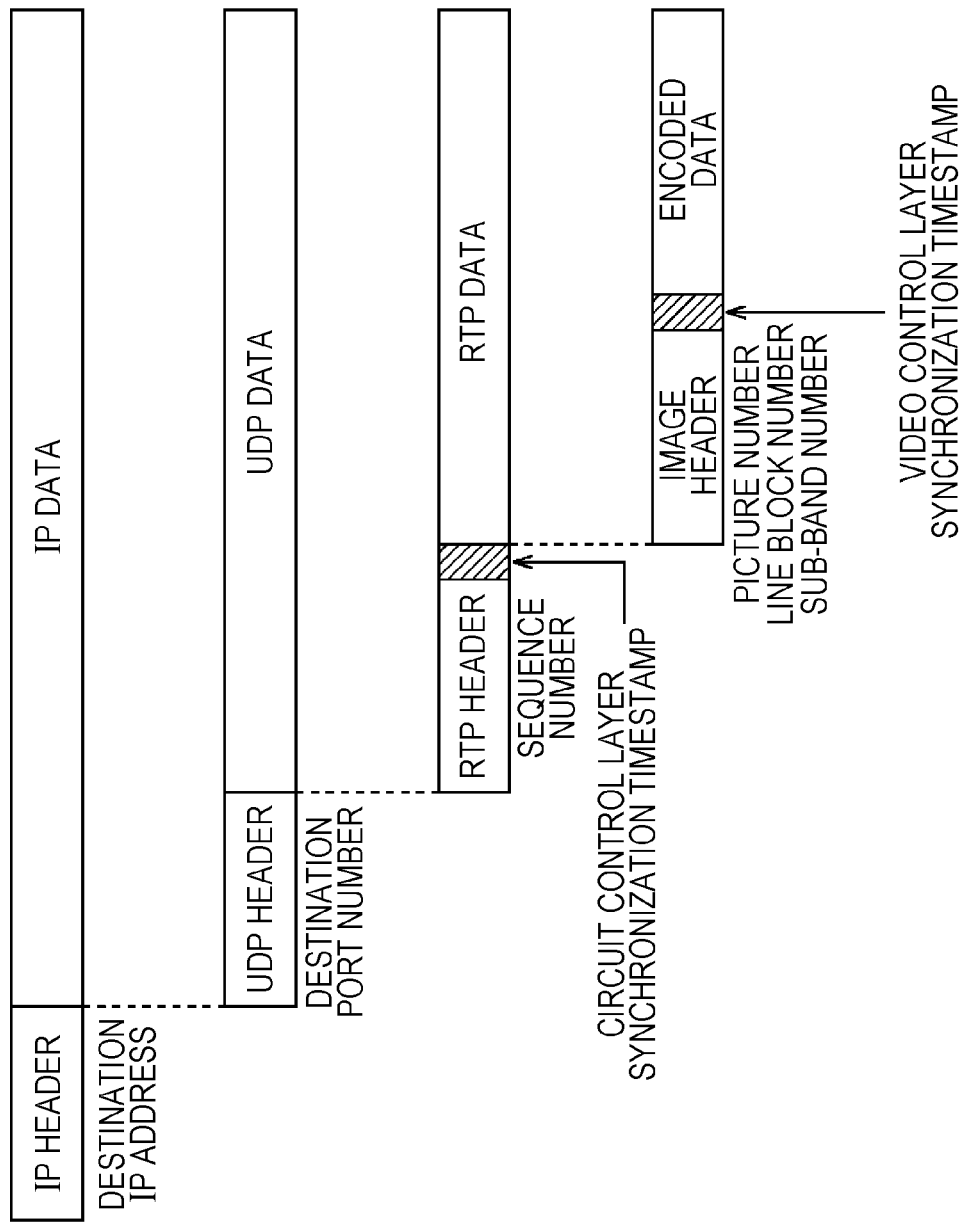
FIG. 24 is a figure for explaining an example of configuration of a packet.

FIG. 24 is a figure for explaining an example of configuration of a packet. FIG. 24 shows an internal configuration of a single IP packet in such a manner that it is divided into four levels of FIG. 24. In the uppermost level, the IP packet is constituted by an IP header and IP data. The IP header includes, for example, control information about control of a communication path based on the IP protocol such as a destination IP address.

Further, the IP data is constituted by UDP header and UDP data. The UDP is a protocol for a transport layer of the OSI reference model which is generally used for distribution of motion picture or sound data where real-time property is regarded as important. The UDP header includes, for example, a destination port number which is application identification information.

The UDP data are further constituted by an RTP header and RTP data. The RTP header includes, for example, control information for guaranteeing the real-time property of a data stream such as a sequence number. A circuit control layer synchronization timestamp is prepared as sub-information of the RTP header, so that the delay and the amount of jitter of the circuit environment can be found from the time information.

The RTP data are constituted by the header of the image data (hereinafter referred to as image header) and encoded data which is an image main body compressed based on line-based codec. A video control layer synchronization timestamp is prepared as sub-information of the image header, so that this provides information about the block length which is to be determined by the FEC block length control unit 1450 and information with which synchronization-achieved timing can be determined with a high degree of accuracy. The image header may include, for example, a picture number, a line block number (a line number when encoding is done in unit of a single line), sub-band number, and the like. It should be noted that the image header may be configured to be further divided into a picture header given for each picture and a line block header given for each line block.

It should be noted that the CCU 1202 also has the same configurations as the transmission unit 1302 and the reception unit 1303. For example, a packet transmitted by the transmission unit 1302 of the image-capturing device 1201 passes through the network 1210, and the packet is received by the reception unit 1303 of the CCU 1202. For example, a packet transmitted from the transmission unit 1302 of the CCU 1202 passes through the network 1210, and the packet is received by the reception unit 1303 of the image-capturing device 1201.

More specifically, for example, the transmission unit 1302 corresponds to the transmission apparatus 1101 according to the first embodiment, and the reception unit 1303 corresponds to the reception apparatus 1102 according to the first embodiment.

For example, in the transmission unit 1302, the video coding unit 1401 and the packet generation unit 1402 correspond to the image transmission buffer 1111, and the waiting time analysis unit 1403, the FEC block length control unit 1450, and the FEC parity generation unit 1408 correspond to the error correction block length generation unit 1112.

Further, for example, in the reception unit 1303, the FEC decoding unit 1604 corresponds to the error correction waiting buffer 1121, and the depacketizer 1605 and the video decoding unit 1606 correspond to the image reception buffer 1122.

More specifically, the FEC block length control unit 1450 sets the FEC block length so that the FEC reception delay time (FEC Rx) of the FEC decoding unit 1604 is less than the reception buffer waiting time (Decode) of the video decoding unit 1606. This setting enables the transmission unit 1302 to easily reduce the delay time that occurs in the transmission of the image data.

[3-4 Flow of Transmission Processing]

Figure 25:
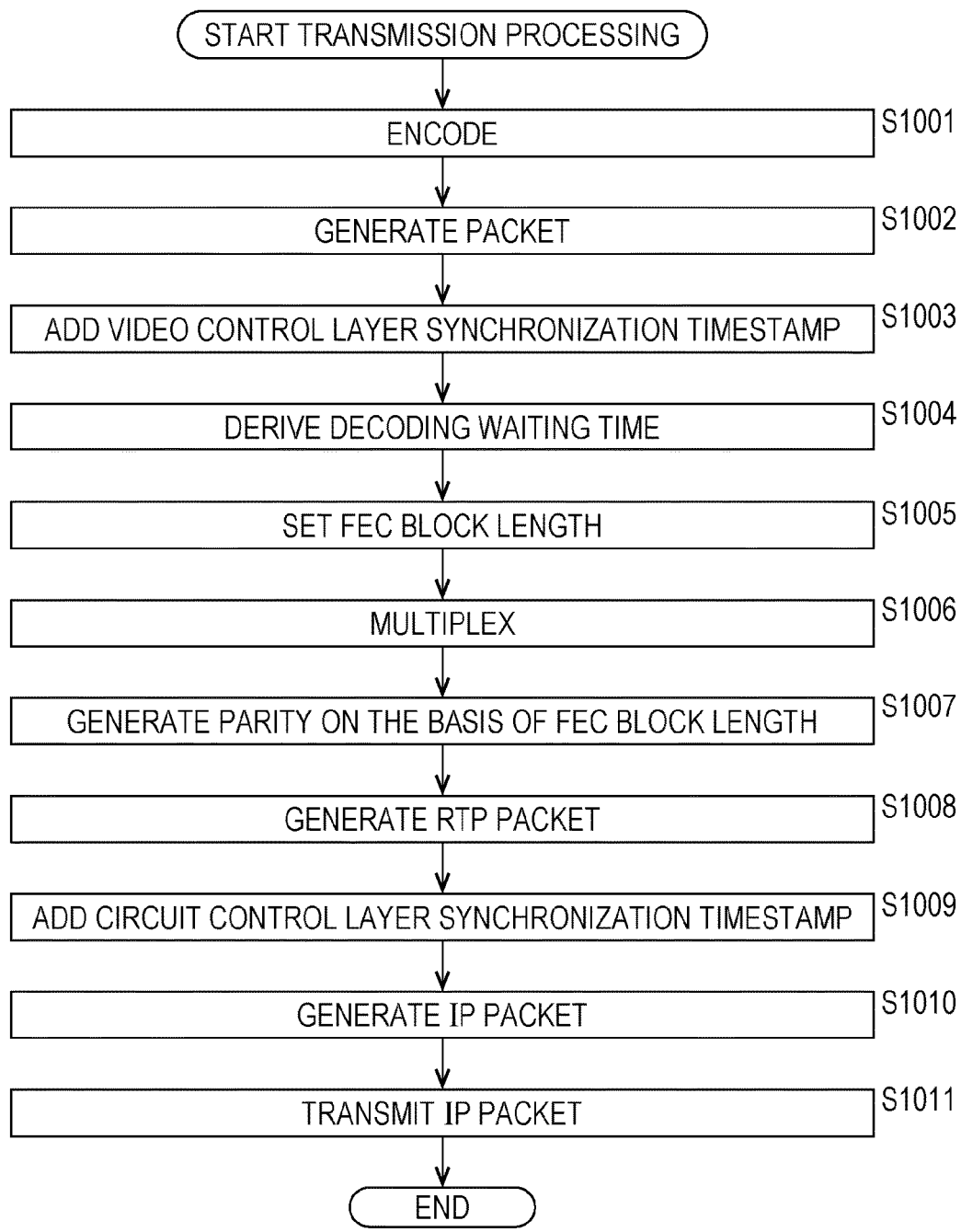
FIG. 25 is a flowchart for explaining an example of a flow of transmission processing.

An example of flow of transmission processing will be explained with reference to the flowchart of FIG. 25.

When the transmission processing is started, the video coding unit 1401 encodes a video signal in step S1001. In addition, the audio coding unit 1404 encodes the sound signal.

In step S1002, the packet generation unit 1402 packetizes the encoded data obtained by encoding the video signal. The packet generation unit 1405 packetizes the encoded data obtained by encoding the sound signal.

In step S1003, the packet generation unit 1402 adds the video control layer synchronization timestamp.

In step S1004, the waiting time analysis unit 1403 derives the waiting time for the packet of the video signal. The waiting time analysis unit 1406 also derives the waiting time for the packet of the sound signal.

In step S1005, the FEC block length control unit 1450 sets the FEC block length on the basis of the waiting time calculated in step S1004.

In step S1006, multiplexing unit 1407 multiplexes the packet of the video signal and the packet of the audio signal, and converts the packet of the video signal and the packet of the audio signal into a single stream.

In step S1007, the FEC parity generation unit 1408 generates parities on the basis of the FEC block length.

In step S1008, the RTP packet generation unit 1409 generates an RTP packet.

In step S1009, the RTP packet generation unit 1409 adds a circuit control layer synchronization timestamp.

In step S1010, the non-synchronization transmission path interface (I/F) 1501 of the transmission unit 1302 generates an IP packet.

In step S1011, the non-synchronization transmission path interface (I/F) 1501 of the transmission unit 1302 transmits the IP packet.

When the processing in step S1011 is finished, the transmission processing is finished.

By performing the transmission processing as described above, the transmission unit 1302 can suppress the delay time of the entire transmission of the image data.

[3-5 Flow of Reception Processing]

Figure 26:
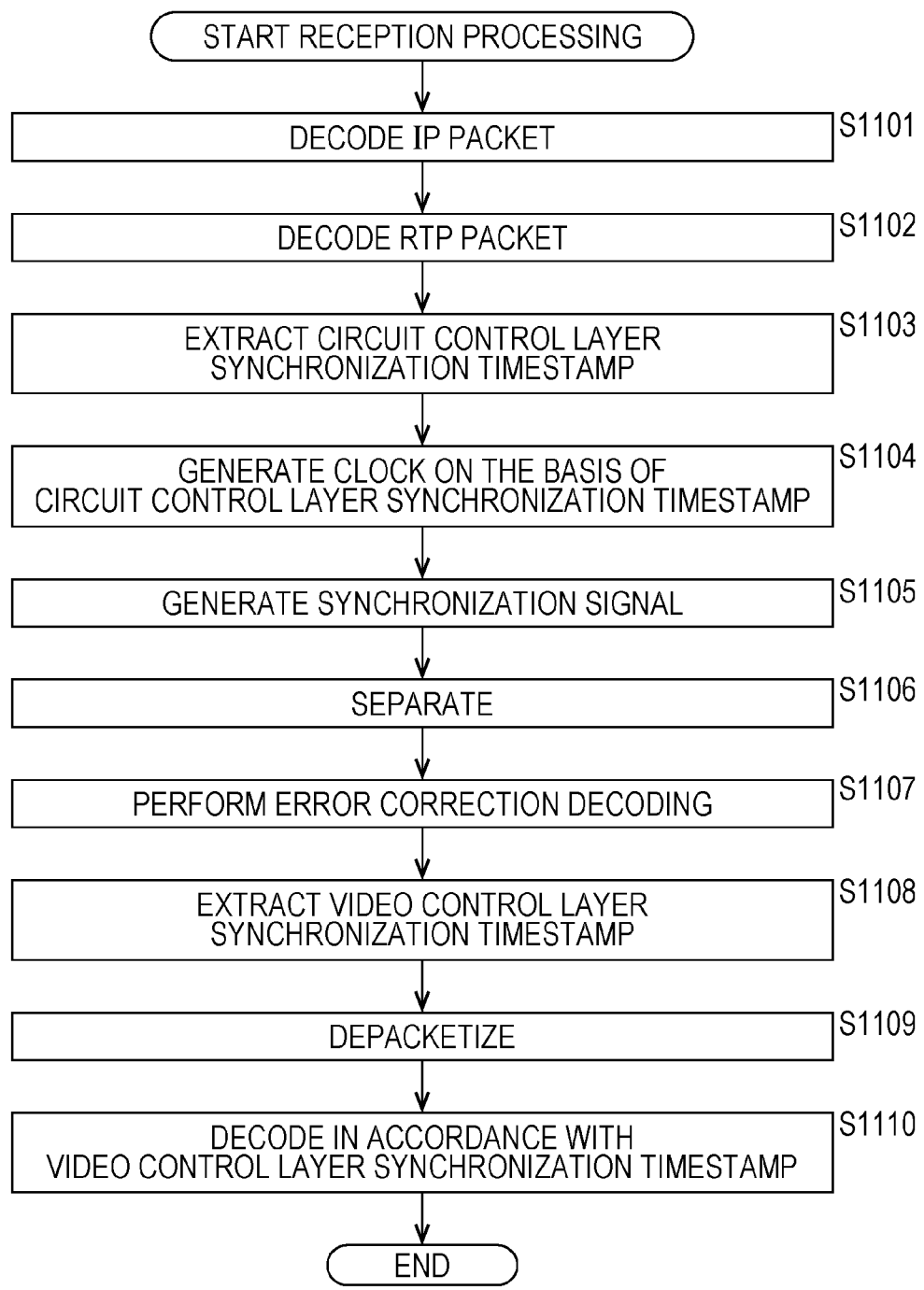
FIG. 26 is a flowchart for explaining an example of a flow of reception processing.

Subsequently, an example of flow of reception processing will be explained with reference to the flowchart of FIG. 26.

When the reception processing is started, the non-synchronization transmission path interface (I/F) 1501 of the reception unit 1303 decodes the IP packet and extracts the RTP packet in step S1101.

In step S1102, the RTP packet decoding unit 1601 decodes the RTP packet.

In step S1103, the timestamp decoding unit 1602 extracts the circuit control layer synchronization timestamp.

In step S1104, the clock generation unit 1512 generates a clock on the basis of the circuit control layer synchronization timestamp extracted.

In step S1105, the synchronization signal generating unit 1513 generates the synchronization signal on the basis of the generated clock.

In step S1106, the demultiplexing unit 1603 demultiplexes the packet of the video signal and the packet of the sound signal which are made into the single stream.

In step S1107, the FEC decoding unit 1604 performs the error correction decoding on the packet of the video signal which is demultiplexed from the sound signal. On the other hand, the FEC decoding unit 1607 performs the error correction decoding on the packet of the sound signal demultiplexed from the video signal.

In step S1108, the depacketizer 1605 extracts the video control layer synchronization timestamp from the packet of the video signal.

In step S1109, the depacketizer 1605 depacketizes the packet of the video signal. The depacketizer 1608 depacketizes the packet of the sound signal.

In step S1110, the video decoding unit 1606 decodes the encoded data of the video signal in accordance with the video control layer synchronization timestamp. On the other hand, the audio decoding unit 1609 decodes the encoded data of the sound signal in accordance with the video control layer synchronization timestamp.

When the processing in step S1110 is finished, the reception processing is finished.

By performing the reception processing as described above, the reception unit 1303 can suppress the delay time of the entire transmission of the image data.

By performing the transmission processing and the reception processing as described above, the image-capturing device 1201 and the CCU 1202 can suppress corruption of the timeliness of the motion picture data transmission.

When the image-capturing device 1201 and the CCU 1202 of the camera system such as the image processing system 1200 as shown in FIG. 21 are caused to execute the management of the synchronization timing in the same manner as the transmission apparatus 101 and the reception apparatus 102 of the image transmission system 100 explained above, the video synchronization in the image data transmission can be controlled more easily and the delay time can be suppressed more easily. In the camera system such as the image processing system 1200, the communication environment such as the network configuration may change with a high degree of possibility depending on the situation. Therefore, when the present technique is applied, more flexible synchronization control can be realized, and the delay time can be suppressed more easily.

In the case of image processing system 1200, as shown in FIG. 21, for example, image data can be transmitted bidirectionally between the image-capturing device 1201 and the CCU 1202. More specifically, the image processing system 1200 includes a first video transmission sequence and a second video sequence in a direction opposite thereto. When the present technique is applied to such system, for example, the second video transmission sequence in the opposite direction may be operated using the synchronization timing made from the first video transmission sequence. As described above, the synchronization timing that is determined in any given video transmission sequence is used for another video transmission sequence, so that the synchronization of multiple video transmission sequences can be managed more easily.

<4. Fourth Embodiment>

[4-1 Encoding Unit]

It should be noted that the method for encoding image data may be any method. For example, it may be line-based codec in which a picture may be divided into multiple line blocks, and encoding is done for each of the line blocks.

Figure 27:
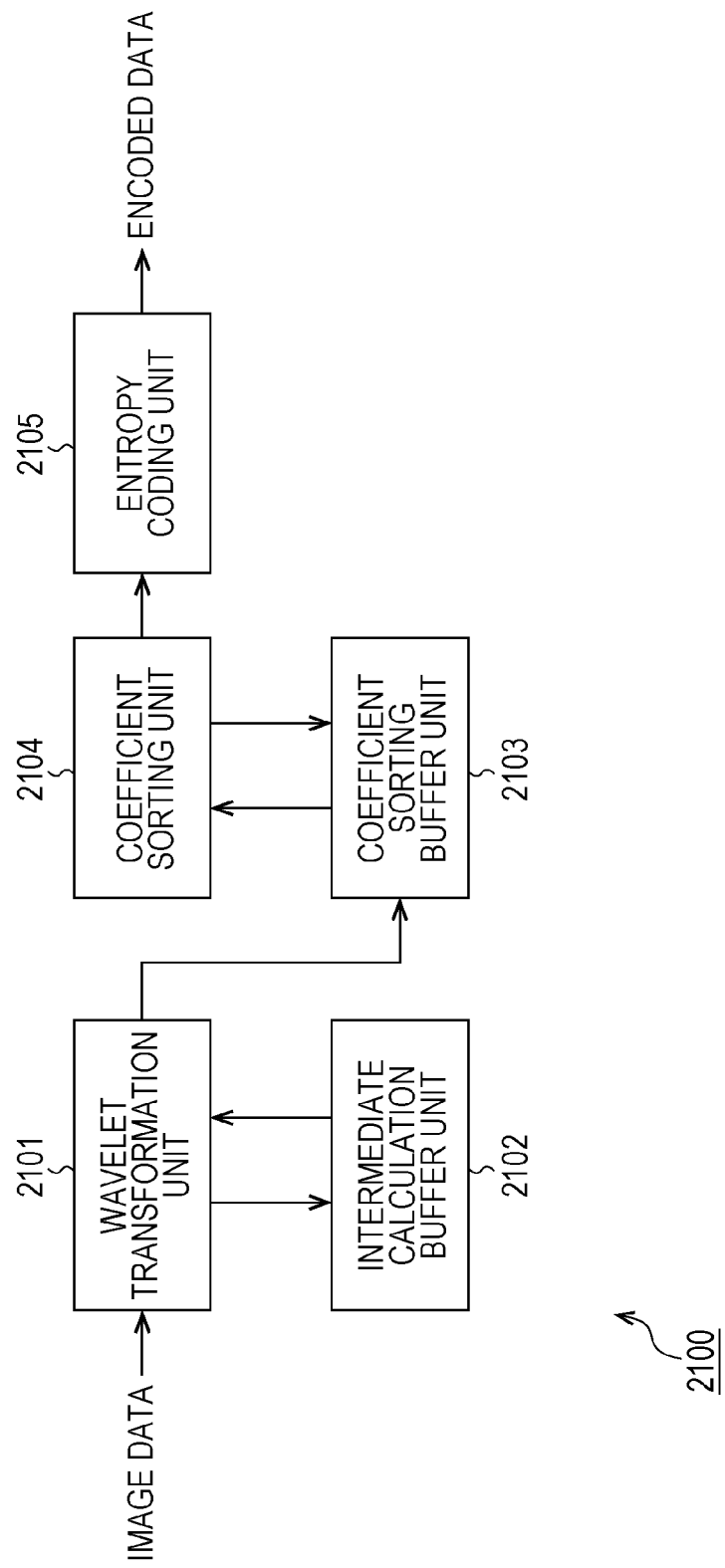
FIG. 27 is a block diagram illustrating a typical example of configuration of a coding unit.

FIG. 27 is a block diagram illustrating a typical example of configuration of a coding unit. As shown in FIG. 27, the coding unit 2100 includes the functions of a wavelet transformation unit 2101, an intermediate calculation buffer unit 2102, a coefficient sorting buffer unit 2103, a coefficient sorting unit 2104, and an entropy coding unit 2105.

The image data which are input into the coding unit 2100 are temporarily accumulated in the intermediate calculation buffer unit 2102 via the wavelet transformation unit 2101. The wavelet transformation unit 2101 applies the wavelet transformation on the image data accumulated in the intermediate calculation buffer unit 2102. More specifically, the wavelet transformation unit 2101 reads image data from the intermediate calculation buffer unit 2102, and applies filter processing using an analysis filter to generate coefficient data of a low-frequency component and a high-frequency component, and stores the generated coefficient data to the intermediate calculation buffer unit 2102.

The wavelet transformation unit 2101 includes a horizontal analysis filter and a vertical analysis filter, and the analysis filter processing is performed in both of the screen horizontal direction and the screen vertical direction of the image data group. The wavelet transformation unit 2101 reads the coefficient data of the low-frequency component stored in the intermediate calculation buffer unit 2102 again, and applies the filter processing based on the analysis filter to the read coefficient data, thus further generating data of coefficients of the high-frequency component and the low-frequency component. The generated coefficient data are stored in the intermediate calculation buffer unit 2102.

The wavelet transformation unit 2101 repeats this processing, and when the decomposition level attains a predetermined level, the wavelet transformation unit 2101 reads the coefficient data from the intermediate calculation buffer unit 2102, and writes the read coefficient data into the coefficient sorting buffer unit 2103.

The coefficient sorting unit 2104 reads the coefficient data, which are written to the coefficient sorting buffer unit 2103, according to a predetermined order, and provides the coefficient data to the entropy coding unit 2105. The entropy coding unit 2105 quantizes the provided coefficient data according to a predetermined method. For example, the entropy coding unit 2105 encodes the quantized coefficient data according to a predetermined entropy encoding method such as Huffman coding and arithmetic coding. The entropy coding unit 2105 outputs the generated encoded data to the outside of the coding unit 2100.

Figure 28:
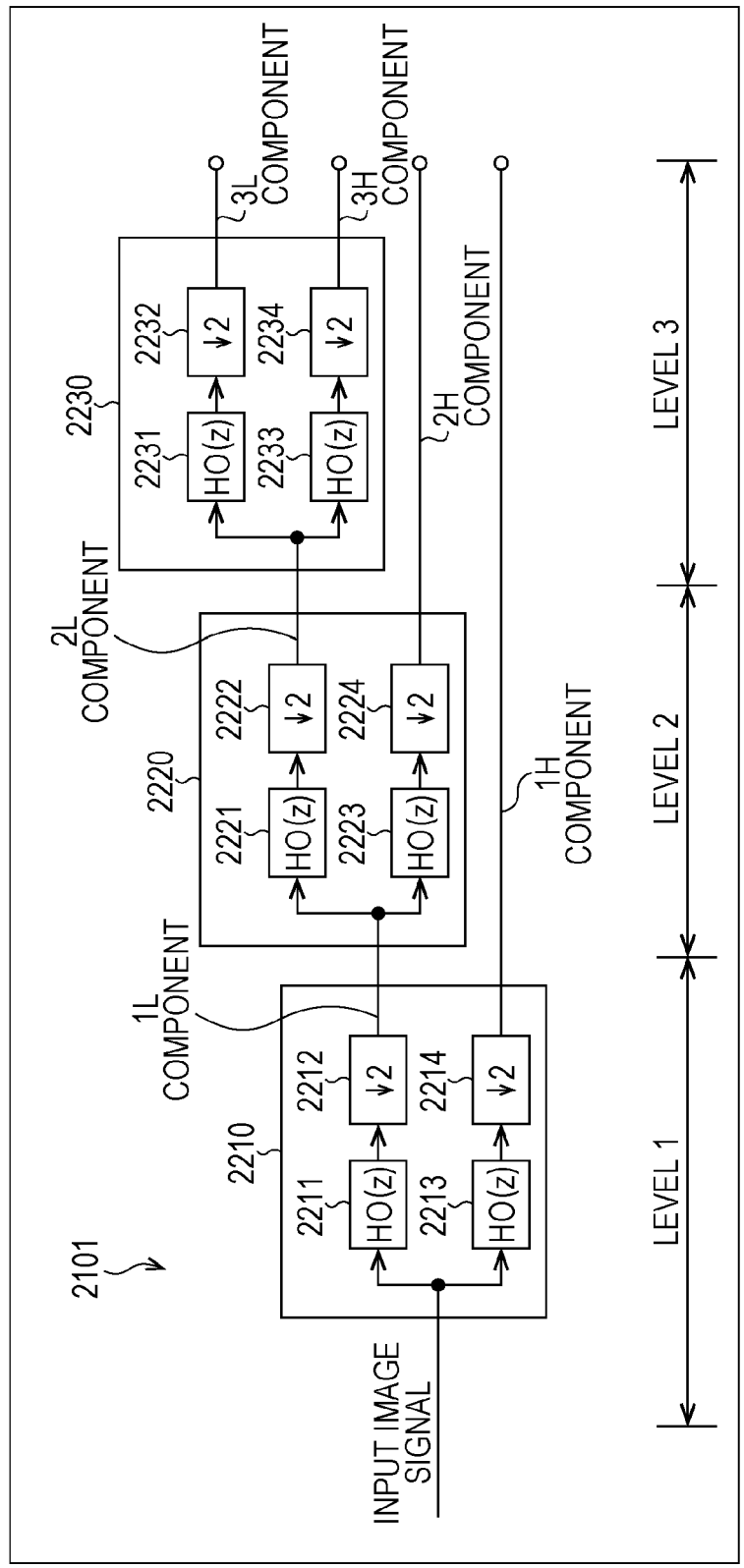
FIG. 28 is a block diagram illustrating a typical example of configuration of a wavelet transformation unit.

FIG. 28 is a block diagram illustrating a typical example of configuration of a wavelet transformation unit 2101. The wavelet transformation unit 2101 performs wavelet transformation in the horizontal direction every time scanning one line of the base band signal of the original image, and performs wavelet transformation in the vertical direction every time reading a certain number of lines.

The wavelet transformation unit 2101 as shown in FIG. 28 executes octave segmentation, which is the most commonly used wavelet transformation, over three hierarchical levels (three levels), thus generating hierarchical encoded image data.

As shown in FIG. 28, the wavelet transformation unit 2101 includes a circuit unit 2210 in level 1, a circuit unit 2220 in level 2, and a circuit unit 2230 in level 3.

The circuit unit 2210 in level 1 includes a low-pass filter 2211, a downsampler 2212, a high-pass filter 2213, and a downsampler 2214.

The circuit unit 2220 in level 2 includes a low-pass filter 2221, a downsampler 2222, a high-pass filter 2223, and a downsampler 2224.

The circuit unit 2230 in level 3 includes a low-pass filter 2231, a downsampler 2232, a high-pass filter 2233, and a downsampler 2234.

The input image signal is split into bands by the low-pass filter 2211 (transfer function H0 (z)) and the high-pass filter 2213 (transfer function H1 (z)) of the circuit unit 2210 in level 1. The low-frequency component (1L component) and the high-frequency component (1H component) obtained from band-splitting are interleaved by the corresponding downsampler 2212 and downsampler 2214, respectively, so that the resolutions become half.

The signal of the low-frequency component (1L component) interleaved by the downsampler 2212 is further split into bands by the low-pass filter 2221 (transfer function H0 (z)) and the high-pass filter 2223 (transfer function H1 (z)) of the circuit unit 2220 in level 2. The low-frequency component (2L component) and the high-frequency component (2H component) obtained from band-splitting are interleaved by the corresponding downsampler 2222 and downsampler 2224, respectively, so that the resolutions become half.

The signal of the low-frequency component (2L component) interleaved by the downsampler 2222 is further split into bands by the low-pass filter 2231 (transfer function H0 (z)) and the high-pass filter 2233 (transfer function H1 (z)) of the circuit unit 2230 in level 3. The low-frequency component (3L component) and the high-frequency component (3H component) obtained from band-splitting are interleaved by the corresponding downsampler 2232 and downsampler 2234, respectively, so that the resolutions become half.

As described above, band components are generated in order, which are made by band-dividing the low-frequency component in a hierarchical manner into the predetermined level. In the example of FIG. 28, the result obtained by band-dividing into level 3 is generated, which includes the high-frequency component (1H component) interleaved by the downsampler 2214, the high-frequency component (2H component) interleaved by the downsampler 2224, the high-frequency component (3H component) interleaved by the downsampler 2234, and the low-frequency component (3L component) interleaved by the downsampler 2232.

Figure 29:
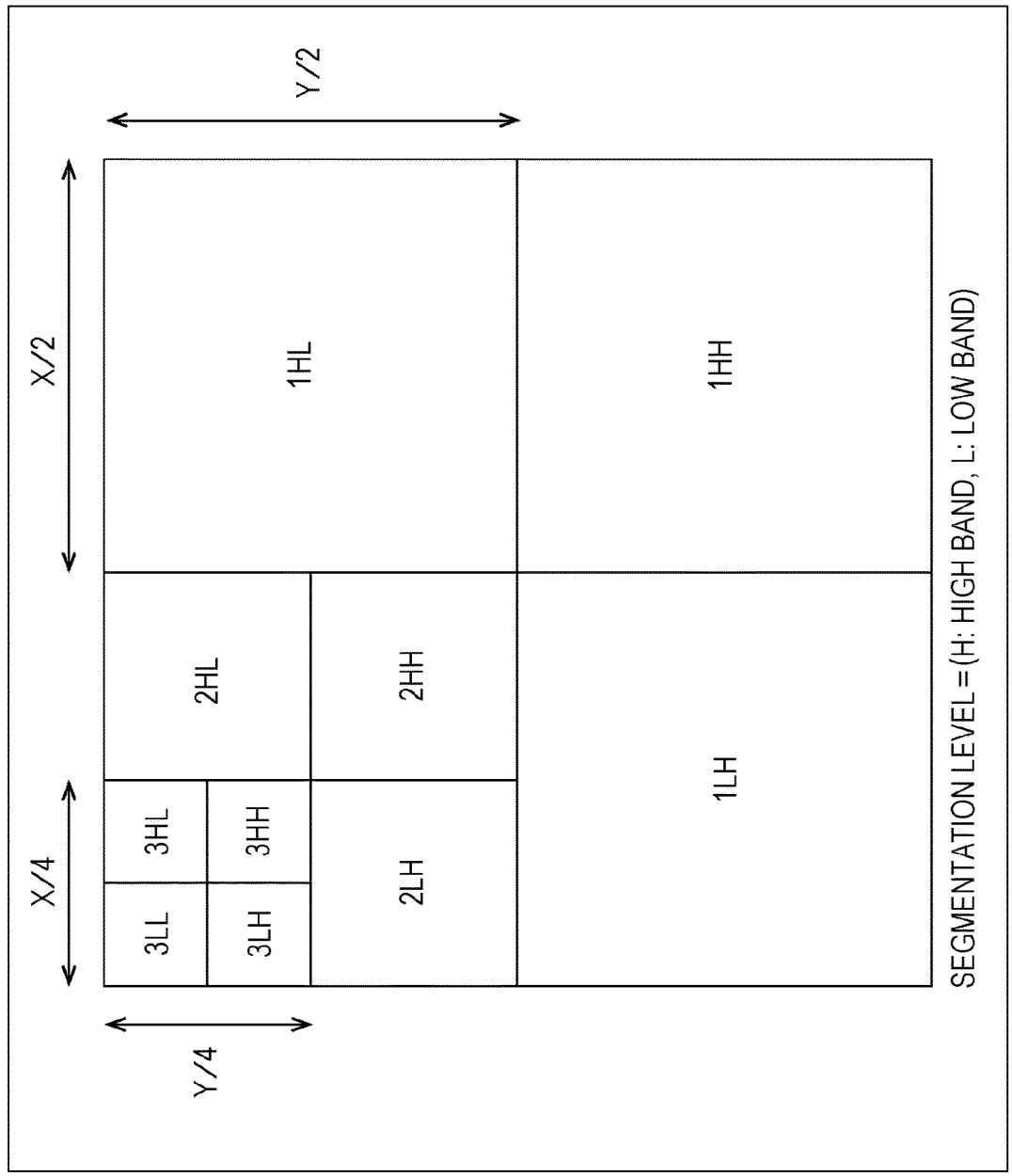
FIG. 29 is a figure illustrating a typical example of configuration of a sub band of a transformation coefficient.

FIG. 29 is a figure illustrating band components obtained as a result of band-dividing a two-dimensional image into level 3. In the example of FIG. 29, first, sub-images of four components 1LL, 1LH, 1HL, 1HH are obtained by band-dividing (horizontal/vertical direction) in level 1. In this case, LL means that both of the horizontal/vertical components are L, and LH means that the horizontal component is H and the vertical component is L. Subsequently, the component 1LL is band-divided again, so that sub-images 2LL, 2HL, 2LH, 2HH are obtained. Further, the component 2LL is band-divided again, so that sub-images 3LL, 3HL, 3LH, 3HH are obtained.

As a result of wavelet transformation repeatedly performed as described above, the sub-images form a hierarchical structure in the output signal. What is obtained by further expanding such wavelet transformation in a line-based manner is line-based wavelet transformation.

Figure 30:
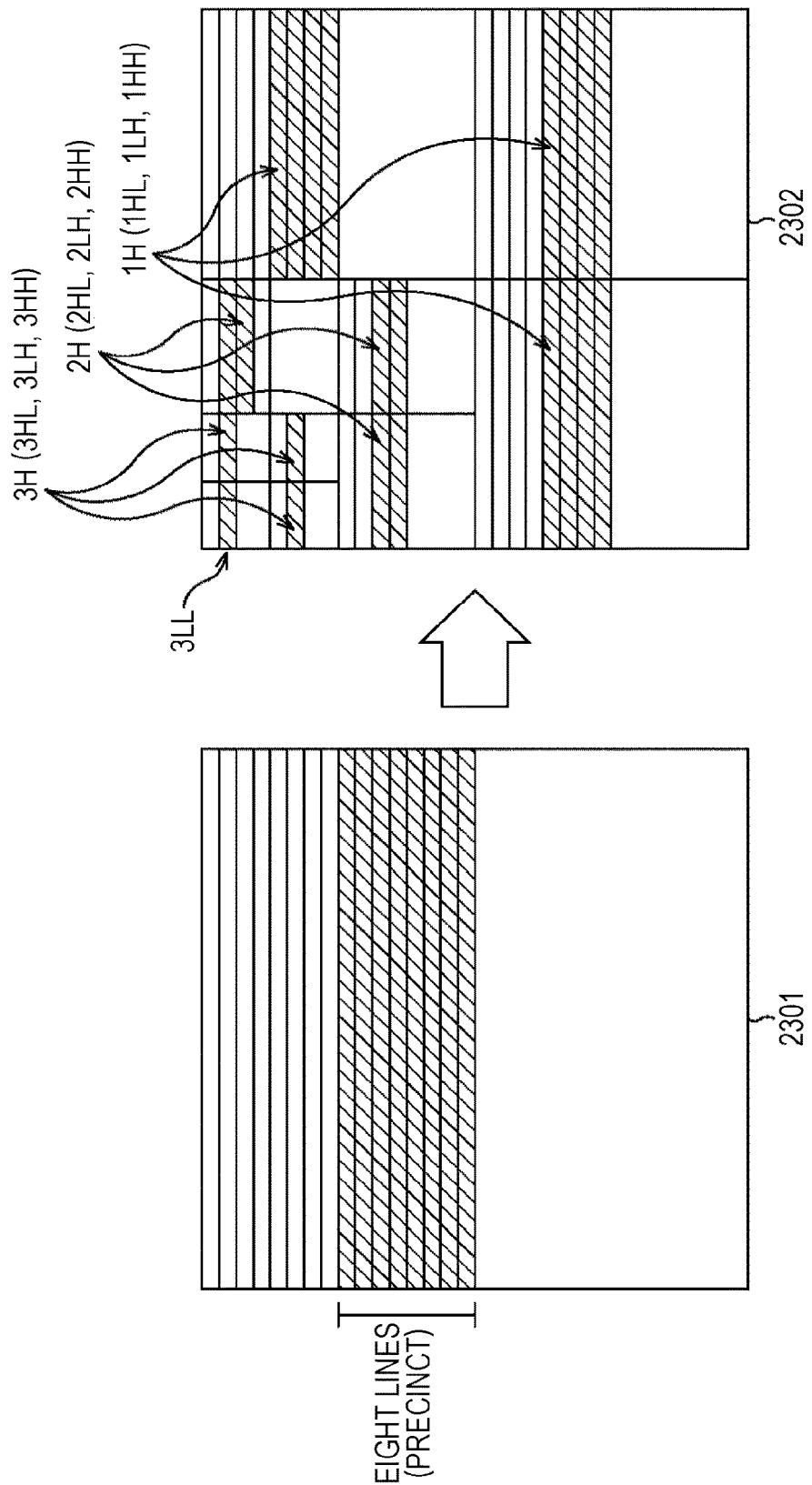
FIG. 30 is a figure illustrating an example of line blocks.

FIG. 30 is a schematic diagram illustrating transformation processing performed by line-based wavelet transformation in a conceptual manner. In this case, for example, the wavelet transformation in the vertical direction is done on every eight lines of the base band.

In this case, suppose that the wavelet transformation is done in three level of hierarchy, and for the eight lines, encoded data are generated in such a manner that one line is generated for a sub image of the lowest-frequency 3LL, and each line is generated for the sub-band 3H of the subsequent level (the sub-images 3HL, 3LH, 3HH). Further, encoded data are generated in such a manner that two lines are each generated for the sub-band 2H of the subsequent level (the sub-images 2HL, 2LH, 2HH), and further four lines are each generated for the highest-frequency 1H (the sub-images 1HL, 1LH, 1HH).

It should be noted that a set of lines in each sub-band will be referred to as a precinct. More specifically, the precinct in the line-based wavelet transformation is a form of a line block which is a set of lines serving as a coding unit of the line-based wavelet transformation. In this case, the coding unit has a general meaning indicating a set of lines serving as a unit of code processing, and is not limited to the line-based wavelet transformation explained above. More specifically, for example, the coding unit may be a unit of code processing in already-available hierarchical encoding such as JPEG 2000 and MPEG 4.

As shown in FIG. 30, a precinct which has eight lines in the base band signal 2301 as shown at the left side of FIG. 30 (shaded portion in the drawing) is configured as four lines of each of 1HL, 1LH, and 1HH (shaded portions in the drawing) in 1H of the signal 2302 which has been transformed by the line-based wavelet transformation, two lines of each of 2HL, 2LH, and 2HH (shaded portions in the drawing) in 2H, and one line of each of 3LL, 3HL, 3HL, and 3HH (shaded portions in the drawing) as shown at the right side of FIG. 30.

According to such line-based wavelet transformation processing, processing can be performed upon decomposing a single picture into finer granularity like the tiling of JPEG 2000, and this can reduce the delay during transmission and reception of image data. Further, unlike the tiling of JPEG 2000, the line-based wavelet transformation makes division based on wavelet coefficients instead of dividing a single base band signal, and therefore, in addition, the line-based wavelet transformation has such feature that the image quality degradation such as block noise does not occur at a tile border.

When the coding unit 2100 that performs such line-based codec is applied to, for example, the video coding unit 1401 as shown in FIG. 22, the image-capturing device 1201 can achieve data transmission with a still shorter delay.

It is to be understood that the encoding method of the video coding unit 1401 may be any method, and the encoding method of the video coding unit 1401 is not limited to the line-based wavelet transformation. For example, the encoding method of the video coding unit 1401 may be any encoding method such as already-available hierarchical encoding such as JPEG 2000 and MPEG 4.

[4-2 Decoding Unit]

Figure 31:
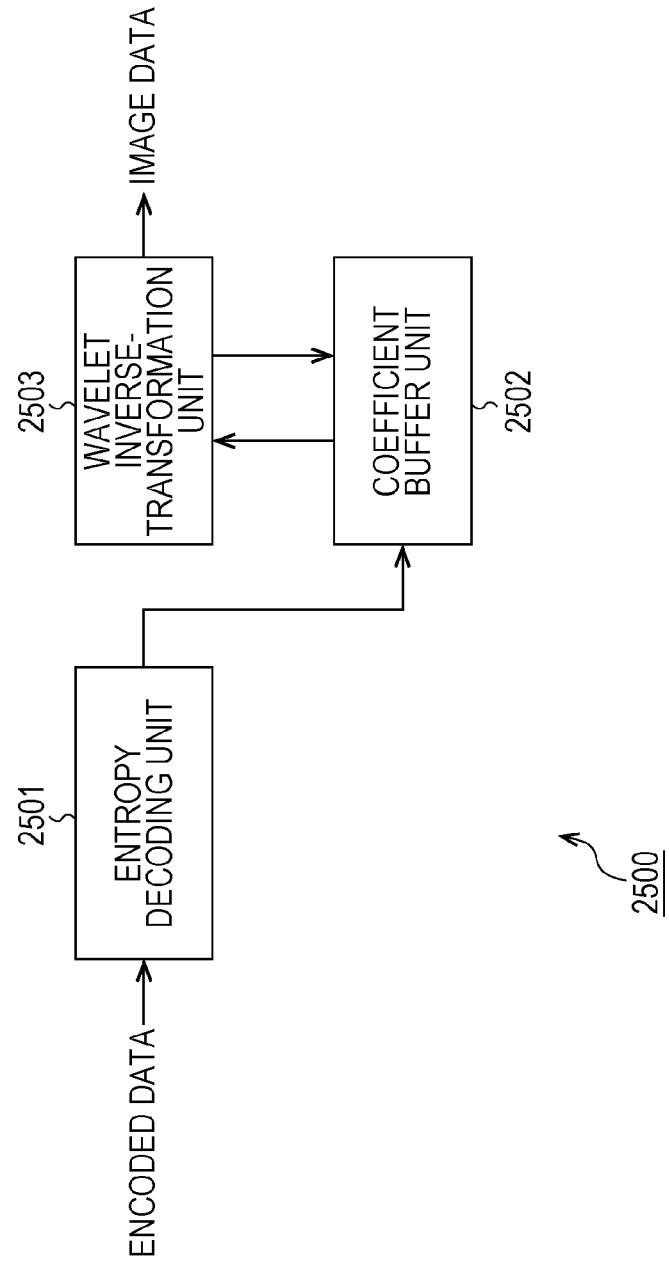
FIG. 31 is a block diagram illustrating a typical example of configuration of a decoding unit.

Subsequently, a decoding unit corresponding to the coding unit 2100 as shown in FIG. 27 will be explained. FIG. 31 is a block diagram illustrating an example of configuration of a decoding unit to which the present invention is applied. A decoding unit 2500 as shown in FIG. 31 decodes encoded data encoded by the coding unit 2100 to restore image data. As shown in FIG. 31, the decoding unit 2500 includes an entropy decoding unit 2501, a coefficient buffer unit 2502, and a wavelet inverse-transformation unit 2503.

The entropy decoding unit 2501 decodes the provided encoded data in accordance with a decoding method corresponding to the encoding method used by the entropy coding unit 2105, and obtains coefficient data. The coefficient data are stored in the coefficient buffer unit 2502. The wavelet inverse-transformation unit 2503 uses the coefficient data stored in the coefficient buffer unit 2502 to perform composition filter processing based on a composition filter (wavelet inverse-transformation) to store the result of the composition filter processing in the coefficient buffer unit 2502 again. The wavelet inverse-transformation unit 2503 repeats this processing in accordance with the decomposition level, and when the wavelet inverse-transformation unit 2503 obtains decoded image data (output image data), the wavelet inverse-transformation unit 2503 outputs the decoded image data (output image data) to the outside.

When the decoding unit 2500 performing the line-based codec explained above is applied to, for example, the video decoding unit 1606 as shown in FIG. 22, the image-capturing device 1201 can achieve data transmission with a still shorter delay.

It is to be understood that the encoding method of the video decoding unit 1606 may be any method, and the encoding method of the video decoding unit 1606 is not limited to this line-based wavelet transformation. For example, the encoding method of the video decoding unit 1606 may be any encoding method such as already-available hierarchical encoding such as JPEG 2000 and MPEG 4.

[4-3 Flow of Transmission Processing]

An example of flow of encoding processing will be explained with reference to a flowchart of FIG. 32.

When the encoding processing is started, the wavelet transformation unit 2101 uses the intermediate calculation buffer unit 2102 and the coefficient sorting buffer unit 2103 to perform the wavelet transformation while inputting lines in step S2001.

In step S2002, the wavelet transformation unit 2101 determines whether processing for one line block has been done or not. When the wavelet transformation unit 2101 determines that there is a not yet processed line in a line block, processing in step S2001 is performed back again.

The processing in step S2001 and step S2002 are repeatedly executed, and when all the lines in the line block are determined to have been processed in step S2002, processing in step S2003 is subsequently performed.

In step S2003, the coefficient sorting unit 2104 reads the coefficient data stored in the coefficient sorting buffer unit 2103 in a predetermined order, thus sorting the coefficient data.

In step S2104, the entropy coding unit 2105 performs entropy encoding on the coefficient data in the order in which the coefficient data are read in step S2003.

When the processing in step S2104 is finished, the encoding processing is finished.

When the encoding processing is done as described above, the coding unit 2100 can encode image data with a still shorter delay.

[4-4 Flow of Reception Processing]

Figure 33:
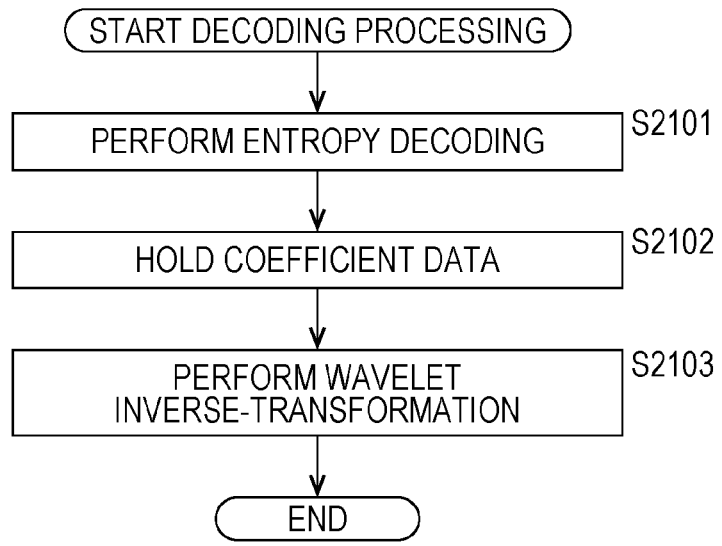
FIG. 33 is a flowchart for explaining an example of a flow of decoding processing.

An example of flow of decoding processing will be explained with reference to a flowchart of FIG. 33.

When the decoding processing is started, the entropy decoding unit 2501 performs entropy decoding of the provided encoded data in step S2101.

In step S2102, the coefficient buffer unit 2502 holds coefficient data obtained by decoding in step S2101.

In step S2103, the wavelet inverse-transformation unit 2503 reads the coefficient data accumulated in the coefficient buffer unit 2502 in step S2102 in response to a request given from the outside or with predetermined timing. The wavelet inverse-transformation unit 2503 performs wavelet inverse-transformation on the read coefficient data, thus generating image data.

When the processing in step S2103 is finished, and the decoding processing is finished.

When the decoding processing is performed as described above, the decoding unit 2500 can decode image data with a still shorter delay.

When the image transmission system is caused to execute the synchronization control as explained in the first embodiment, the synchronization time management becomes easy, and therefore, the control of the delay time also becomes easier. More specifically, the effects thereof increase when the present technique explained in the first embodiment is applied to the system that is required to have data transmission with a shorter delay as explained in the present embodiment.

[4-5 Others]

When the line-based wavelet transformation explained above is used commonly in each of the embodiment explained above as the line-based codec, communication packets can be generated in units of sub-bands of line blocks instead of in units of line blocks. In such case, for example, the reception memory unit may reserve a storage area corresponding to a line block number and a sub-band number obtained from an image header, and may store image data decomposed into frequency components in units of sub-bands of line blocks.

In this case, for example, when a sub-band (or a portion thereof) is lost due to transmission error during decoding in units of line blocks, dummy data may be inserted after the sub-band in the line block, and ordinary decoding may be resumed from the subsequent line block.

<5. Fifth Embodiment>

[Computer]

The above-described series of processing may be executed by hardware or executed by software. When the series of processing is executed by software, programs constituting the software are installed to a computer. In this case, examples of computers include a computer incorporated into dedicated hardware and a general-purpose computer capable of executing various kinds of functions by installing various kinds of programs.

Figure 34:
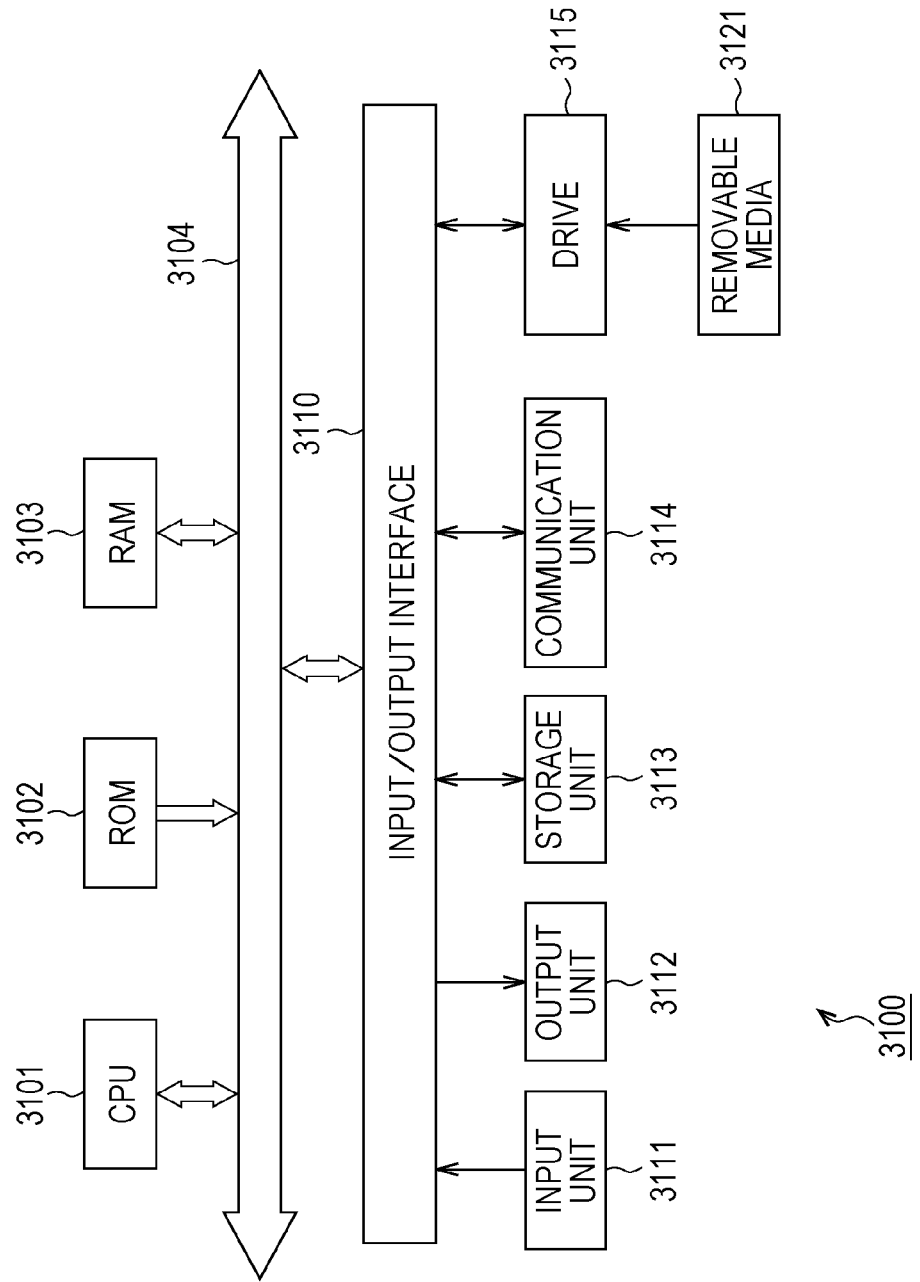
FIG. 34 is a block diagram illustrating a typical example of configuration of a computer.

FIG. 34 is a block diagram illustrating an example of configuration of hardware of a computer executing the above series of processing using a program.

The computer 3100 as shown in FIG. 34 is configured such that a CPU (Central Processing Unit) 3101, a ROM (Read Only Memory) 3102, and a RAM (Random. Access Memory) 3103 are connected with each other via a bus 3104.

The bus 3104 is also connected to an input/output interface 3110. The input/output interface 3110 is connected with an input unit 3111, an output unit 3112, a storage unit 3113, a communication unit 3114, and a drive 3115.

The input unit 3111 is constituted by, for example, a keyboard, a mouse, a microphone, a touch panel, an input terminal, and the like. The output unit 3112 is constituted by, for example, a display, a speaker, and an output terminal. The storage unit 3113 is constituted by, for example, a hard disk, a RAM disk, a nonvolatile memory. The communication unit 3114 is constituted by, for example, a network interface. The drive 3115 drives a removable medium 3121 such as a magnetic disk, an optical disk, a magneto-optical disk, or a semiconductor memory.

In the computer configured as described above, for example, the CPU 3101 loads a program stored in the storage unit 3113 to a RAM 3103 via the input/output interface 3110 and the bus 3104, and executes the program, thus performing the series of processing explained above. In addition, the RAM 3103 stores, as necessary, data which are required when the CPU 3101 executes various kinds of processing.

The programs executed by the computer (CPU 3101) may be applied as being recorded to the removable medium 3121 serving as, for example, a package medium. The programs can be provided via wired or wireless transmission media such as local area network, the Internet, digital satellite broadcast.

In the computer, the programs can be installed to the storage unit 3113 via the input/output interface 3110 by loading the removable medium 3121 to the drive 3115. The programs can be installed to the storage unit 3113 by receiving the programs with the communication unit 3114 via wired or wireless transmission media. Alternatively, the programs may be installed to the ROM 3102 or the storage unit 3113 in advance.

The program executed by the computer may be a program with which processing is performed in time sequence according to the order explained in this specification, or may be a program with which processing is performed in parallel or with necessary timing, e.g., upon call.

In this specification, steps describing the program recorded in the recording medium include processing performed in time sequence according to the described order. The steps may not be necessarily performed in time sequence, and the steps include processing executed in parallel or individually.

In this specification, the system means a set of multiple constituent elements (such as apparatuses, modules (components), and the like), and it does not matter whether all of the constituent elements are in the same housing or not. In view of this, apparatuses that are housed in different housings and are connected to each other via a network constitute a system, and a single apparatus having modules housed in a single housing is also a system.

A configuration explained as a device (or a processing unit) in the above explanation may be divided, and structured as multiple devices (or processing units). On the contrary, a configuration explained as multiple devices (or processing units) in the above explanation may be combined, and structured as a device (or a processing unit). Alternatively, it is to be understood that the configuration of each device (or each processing unit) may be added with any configuration other than the above. Further, when the configuration and operation of the entire system are substantially the same, apart of configuration of a certain device (or processing unit) may be included in the configuration of another device (or another processing unit).

Although preferred embodiments of the present disclosure have been described in detail with reference to the attached drawings, the technical scope of the present disclosure is not limited to such examples. It is clear that one skilled in the art of the present disclosure may conceive various modifications and corrections within the scope of the technical idea recited in claims and it is understood that they also naturally belong to the technical scope of the present disclosure.

For example, the present technique may be configured as a cloud computing in which a single function is processed in such a manner that it is distributed in a cooperating manner by multiple apparatuses via a network Each step explained in the above flowchart may be executed by a single apparatus, or may be executed by multiple apparatuses in a distributed manner.

Further, in a case where multiple pieces of processing are included in a single step, the multiple pieces of processing included in the step may be executed by a single apparatus, or may be executed by multiple apparatuses in a distributed manner.

For example, the present technique is preferable for an apparatus that outputs an image upon compressing, transmitting, receiving, and extracting a motion picture signal, a video signal, or a still picture. More specifically, the present technique can be applied to a mobile communication device, a TV conference system, a monitor camera recorder system, a medical remote diagnosis, a video compression transmission used in a broadcast station, distribution of live video, interactive communication between students and a teacher, a still picture/motion picture wireless transmission, an interactive game application, and the like.

It should be noted that the present technique can be configured as follows.

(1) An information processing apparatus including:
a synchronization cancellation unit configured to cancel synchronization between synchronization timing of a network to which image data are transmitted and synchronization timing of the image data, on the basis of a delay time of image data transmission;
an adjusting unit configured to adjust synchronization timing of the image data of which synchronization with the synchronization timing of the network is cancelled by the synchronization cancellation unit; and
a synchronization connection unit configured to synchronize the synchronization timing of the image data, which is adjusted by the adjusting unit, with the synchronization timing of the network.

(2) The information processing apparatus according to (1), wherein the adjusting unit advances the synchronization timing of the image data by a time equivalent to the delay time.

(3) The information processing apparatus according to (1) or (2), wherein the adjusting unit initializes the encoding processing of the image data in the state where the synchronization between the synchronization timing of the image data and the synchronization timing of the network is cancelled by the synchronization cancellation unit.

(4) The information processing apparatus according to any of (1) to (3), wherein the adjusting unit causes the encoding processing of the image data to be continued upon reducing a blank period of a frame of the image data so that the blank period is shorter than usual in the state where the synchronization between the synchronization timing of the image data and the synchronization timing of the network is cancelled by the synchronization cancellation unit.

(5) The information processing apparatus according to any of (1) to (4) further including a network synchronization acquisition unit configured to obtain the synchronization timing of the network with the other party in communication in the state where the synchronization between the synchronization timing of the image data and the synchronization timing of the network is cancelled by the synchronization cancellation unit.

(6) The information processing apparatus according to any of (1) to (5) further including a measuring unit configured to measure the delay time,
wherein the synchronization cancellation unit cancels the synchronization between the synchronization timing of the network to which the image data are transmitted and the synchronization timing of the image data, on the basis of the delay time measured by the measuring unit.

(7) The information processing apparatus according to (6), wherein the measuring unit determines a transmission source in accordance with a synchronization control topology and a network setting, and measures the delay period using image data transmitted from the transmission source.

(8) The information processing apparatus according to any of (1) to (7) further including a transmission unit configured to transmit the image data in accordance with the synchronization timing of the image data synchronized with the synchronization timing of the network by the synchronization connection unit.

(9) An information processing method for an information processing apparatus,
wherein the information processing apparatus cancels synchronization between synchronization timing of a network to which image data are transmitted and synchronization timing of the image data, on the basis of a delay time of image data transmission,
the information processing apparatus adjusts synchronization timing of the image data of which synchronization with the synchronization timing of the network is cancelled, and
the information processing apparatus synchronizes the synchronization timing of the image data, which is adjusted, with the synchronization timing of the network.

(10) A program for causing a computer to function as:
a synchronization cancellation unit configured to cancel synchronization between synchronization timing of a network to which image data are transmitted and synchronization timing of the image data, on the basis of a delay time of image data transmission,
an adjusting unit configured to adjust synchronization timing of the image data of which synchronization with the synchronization timing of the network is cancelled by the synchronization cancellation unit; and
a synchronization connection unit configured to synchronize the synchronization timing of the image data, which is adjusted by the adjusting unit, with the synchronization timing of the network.

(11) An information processing apparatus in a system including a first video transmission sequence having a video synchronization acquisition function and a second video transmission sequence, including:
a synchronization cancellation unit configured to cancel synchronization between synchronization timing of a network to which image data are transmitted and synchronization timing of the image data, on the basis of a delay time of image data transmission according to the first video transmission sequence;
an adjusting unit configured to adjust synchronization timing of the image data of which synchronization with the synchronization timing of the network is cancelled by the synchronization cancellation unit;
a synchronization connection unit configured to synchronize the synchronization timing of the image data, which is adjusted by the adjusting unit, with the synchronization timing of the network; and
a control unit configured to operate the second video transmission sequence different from the first video transmission sequence, using synchronization timing generated from the first video transmission sequence.

(12) The information processing apparatus according to (11), wherein the adjusting unit advances the synchronization timing of the image data by a time equivalent to the delay time.

(13) The information processing apparatus according to any of (11) or (12), wherein the adjusting unit initializes the encoding processing of the image data in the state where the synchronization between the synchronization timing of the image data and the synchronization timing of the network is cancelled by the synchronization cancellation unit.

(14) The information processing apparatus according to any of (11) to (13), wherein the adjusting unit causes the encoding processing of the image data to be continued upon reducing a blank period of a frame of the image data so that the blank period is shorter than usual in the state where the synchronization between the synchronization timing of the image data and the synchronization timing of the network is cancelled by the synchronization cancellation unit.

(15) The information processing apparatus according to any of (11) to (14) further including a network synchronization acquisition unit configured to obtain the synchronization timing of the network with the other party in communication in the state where the synchronization between the synchronization timing of the image data and the synchronization timing of the network is cancelled by the synchronization cancellation unit.

(16) The information processing apparatus according to any of (11) to (15) further including a measuring unit configured to measure the delay time,
wherein the synchronization cancellation unit cancels the synchronization between the synchronization timing of the network to which the image data are transmitted and the synchronization timing of the image data, on the basis of the delay time measured by the measuring unit.

(17) The information processing apparatus according to (16), wherein the measuring unit determines a transmission source for the first video transmission sequence in accordance with a synchronization control topology and a network setting, and measures the delay period using image data transmitted from the transmission source.

(18) The information processing apparatus according to any of (11) to (17) further including a transmission unit configured to transmit the image data in accordance with the synchronization timing of the image data synchronized with the synchronization timing of the network by the synchronization connection unit.

(19) An information processing method for an information processing apparatus in a system including a first video transmission sequence having a video synchronization acquisition function and a second video transmission sequence,
wherein the information processing apparatus cancels synchronization between synchronization timing of a network to which image data are transmitted and synchronization timing of the image data, on the basis of a delay time of image data transmission according to the first video transmission sequence,
the information processing apparatus adjusts synchronization timing of the image data of which synchronization with the synchronization timing of the network is cancelled,
the information processing apparatus synchronizes the synchronization timing of the image data, which is adjusted, with the synchronization timing of the network, and
the information processing apparatus operates the second video transmission sequence different from the first video transmission sequence, using synchronization timing generated from the first video transmission sequence.

(20) A program for a computer in a system including a first video transmission sequence having a video synchronization acquisition function and a second video transmission sequence,
wherein the program causes the computer to function as:
a synchronization cancellation unit configured to cancel synchronization between synchronization timing of a network to which image data are transmitted and synchronization timing of the image data, on the basis of a delay time of image data transmission according to the first video transmission sequence;
an adjusting unit configured to adjust synchronization timing of the image data of which synchronization with the synchronization timing of the network is cancelled by the synchronization cancellation unit;
a synchronization connection unit configured to synchronize the synchronization timing of the image data, which is adjusted by the adjusting unit, with the synchronization timing of the network; and
a control unit configured to operate the second video transmission sequence different from the first video transmission sequence, using synchronization timing generated from the first video transmission sequence.

REFERENCE SIGNS LIST

100 Image transmission system
101 Transmission apparatus
102 Reception apparatus
111 Image time management unit
112 Transmission time management unit
113 Network transmission time management unit
121 Image time management unit
122 Transmission time management unit
123 Network transmission time management unit
1100 Image transmission system
1101 Transmission apparatus
1102 Reception apparatus
1111 Image transmission buffer
1112 Error correction block length generation unit
1121 Error correction waiting buffer
1122 Image reception buffer
1200 Image processing system
1201 Image-capturing device
1202 CCU
1210 Network
1301 Image-capturing unit
1302 Transmission unit
1303 Reception unit
1304 Display unit
1401 Video coding unit
1402 Packet generation unit
1403 Waiting time analysis unit
1404 Audio coding unit
1405 Packet generation unit
1406 Waiting time analysis unit
1407 Multiplexing unit
1408 FEC parity generation unit
1409 RTP packet generation unit
1501 Non-synchronization transmission path I/F
1510 Circuit control synchronization timing adjusting unit
1511 Timestamp generation unit
1512 Clock generation unit
1513 Synchronization signal generating unit
1601 RTP packet decoding unit
1602 Timestamp decoding unit
1603 Demultiplexing unit
1604 FEC decoding unit
1605 Depacketizer
1606 Video decoding unit
1607 FEC decoding unit
1608 Depacketizer
1609 Audio decoding unit
2100 Coding unit
2101 Wavelet transformation unit
2102 Intermediate calculation buffer unit
2103 Coefficient sorting buffer unit
2104 Coefficient sorting unit
2105 Entropy coding unit
2500 Decoding unit
2501 Entropy decoding unit
2502 Coefficient buffer unit
2503 Wavelet inverse-transformation unit

The invention claimed is:

1. An information processing apparatus, comprising:
a processor configured to:
measure a delay of an image data transmission over a network based on an amount of image data transmitted by a transmission source of the image data;
transmit information of a delay offset amount to the transmission source based on the measurement of the delay,
wherein the delay offset amount comprises forward error correction (FEC) jitter;
cancel a synchronization between a first synchronization timing of the network to which the image data is transmitted and a second synchronization timing of the image data, wherein the synchronization is cancelled based on the delay of the image data transmission over the network;
adjust the second synchronization timing for which the synchronization with the first synchronization timing is cancelled;
synchronize the adjusted second synchronization timing of the image data with the first synchronization timing; and
encode the image data based on the cancellation of the synchronization between the second synchronization timing and the first synchronization timing,
wherein the encode of the image data is continued based on a blank period of a frame of the image data, and wherein the blank period is reduced such that the blank period is shorter than a threshold.

2. The information processing apparatus according to claim 1, wherein the processor is further configured to advance the second synchronization timing by a time equivalent to an amount of the delay.

3. The information processing apparatus according to claim 1, wherein the processor is further configured to initial the encode of the image data based on the cancellation of the synchronization between the second synchronization timing and the first synchronization timing.

4. The information processing apparatus according to claim 1, wherein the processor is further configured to obtain the first synchronization timing with a party in communication, based on the cancellation of the synchronization between the second synchronization timing and the first synchronization timing.

5. The information processing apparatus according to claim 1, wherein the processor is further configured to determine the transmission source based on a synchronization control topology and a network setting.

6. The information processing apparatus according to claim 1, wherein the processor is further configured to transmit the image data based on the adjusted second synchronization timing.

7. An information processing method, comprising:
measuring a delay of an image data transmission over a network based on an amount of image data transmitted by a transmission source of the image data;
transmitting information of a delay offset amount to the transmission source based on the measurement of the delay,
wherein the delay offset amount comprises forward error correction (FEC) jitter;

cancelling a synchronization between a first synchronization timing of the network to which the image data is transmitted and a second synchronization timing of the image data, wherein the synchronization is cancelled based on the delay of the image data transmission over the network;

adjusting the second synchronization timing for which the synchronization with the first synchronization timing is cancelled;

synchronizing the adjusted second synchronization timing of the image data with the first synchronization timing; and encoding the image data based on the cancellation of the synchronization between the second synchronization timing and the first synchronization timing, wherein the encoding is continued based on a blank period of a frame of the image data, and wherein the blank period is reduced such that the blank period is shorter than a threshold.

8. A non-transitory computer-readable medium having stored thereon computer-executable instructions that, when executed by a computer, causes the computer to execute operations, the operations comprising:

measuring a delay of an image data transmission over a network based on an amount of image data transmitted by a transmission source of the image data;

transmitting information of a delay offset amount to the transmission source based on the measurement of the delay, wherein the delay offset amount comprises forward error correction (FEC) jitter;

cancelling a synchronization between a first synchronization timing of the network to which image data is transmitted and a second synchronization timing of the image data, wherein the synchronization is cancelled based on the delay of the image data transmission over the network;

adjusting the second synchronization timing for which the synchronization with the first synchronization timing is cancelled;

synchronizing the adjusted second synchronization timing of the image data with the first synchronization timing; and encoding the image data based on the cancellation of the synchronization between the second synchronization timing and the first synchronization timing, wherein the encoding is continued based on a blank period of a frame of the image data, and wherein the blank period is reduced such that the blank period is shorter than a threshold.

9. An information processing apparatus, comprising:

a first video transmission sequence that has a video synchronization acquisition function, a second video transmission sequence, and a processor, wherein the processor is configured to:

measure a delay of an image data transmission over a network based on an amount of image data transmitted by a transmission source of the image data;

transmit information of a delay offset amount to the transmission source based on the measurement of the delay, wherein the delay offset amount comprises forward error correction (FEC) jitter;

cancel a synchronization between a first synchronization timing of the network to which the image data is transmitted and a second synchronization timing of the image data, wherein the synchronization is cancelled based on the delay of the image data transmission over the network, and wherein the delay is based on the first video transmission sequence;

adjust the second synchronization timing for which the synchronization with the first synchronization timing is cancelled;

synchronize the adjusted second synchronization timing of the image data with the first synchronization timing;

operate the second video transmission sequence different from the first video transmission sequence, by a third synchronization timing generated from the first video transmission sequence; and encode the image data based on the cancellation of the synchronization between the second synchronization timing and the first synchronization timing, wherein the encode of the image data is continued based on a blank period of a frame of the image data, and wherein the blank period is reduced such that the blank period is shorter than a threshold.

10. The information processing apparatus according to claim 9, wherein the processor is further configured to advance the second synchronization timing by a time equivalent to an amount of the delay.

11. The information processing apparatus according to claim 9, wherein the processor is further configured to initialize the encode of the image data based on the cancellation of the synchronization between the second synchronization timing and the first synchronization timing.

12. The information processing apparatus according to claim 9, wherein the processor is further configured to obtain the first synchronization timing with a party in communication, based on the cancellation of the synchronization between the second synchronization timing and the first synchronization timing.

13. The information processing apparatus according to claim 9, wherein the processor is further configured to determine the transmission source for the first video transmission sequence based on a synchronization control topology and a network setting.

14. The information processing apparatus according to claim 9, wherein the processor is further configured to transmit the image data based on the adjusted second synchronization timing.

15. An information processing method, comprising:

in an information processing apparatus, that includes a first video transmission sequence that has a video synchronization acquisition function, and a second video transmission sequence:

measuring a delay of an image data transmission over a network based on an amount of image data transmitted by a transmission source of the image data;

transmitting information of a delay offset amount to the transmission source based on the measurement of the delay, wherein the delay offset amount comprises forward error correction (FEC) jitter;

cancelling a synchronization between a first synchronization timing of the network to which the image data is transmitted and a second synchronization timing of the image data, wherein the synchronization is cancelled based on the delay of the image data transmission over the network, and wherein the delay is based on the first video transmission sequence;

adjusting the second synchronization timing for which the synchronization with the first synchronization timing is cancelled;
synchronizing the adjusted second synchronization timing of the image data with the first synchronization timing;
operating the second video transmission sequence different from the first video transmission sequence, based on a third synchronization timing generated from the first video transmission sequence; and
encoding the image data based on the cancellation of the synchronization between the second synchronization timing and the first synchronization timing,
wherein the encoding is continued based on a blank period of a frame of the image data, and wherein the blank period is reduced such that the blank period is shorter than a threshold.

16. A non-transitory computer-readable medium having stored thereon computer-executable instructions that, when executed by a computer, cause the computer to execute operations, the operations comprising:
in an information processing apparatus, that includes a first video transmission sequence that handles video synchronization acquisition, and a second video transmission sequence:
measuring a delay of an image data transmission over a network based on an amount of image data transmitted by a transmission source of the image data;
transmitting information of a delay offset amount to the transmission source based on the measurement of the delay,
wherein the delay offset amount comprises forward error correction (FEC) jitter;
cancelling a synchronization between a first synchronization timing of the network to which the image data is transmitted and a second synchronization timing of the image data,
wherein the synchronization is cancelled based on the delay of the image data transmission over the network, and
wherein the delay is based on the first video transmission sequence;
adjusting the second synchronization timing for which the synchronization with the first synchronization timing is cancelled;
synchronizing the adjusted second synchronization timing of the image data with the first synchronization timing;
operating the second video transmission sequence different from the first video transmission sequence, based on a third synchronization timing generated from the first video transmission sequence; and
encoding the image data based on the cancellation of the synchronization between the second synchronization timing and the first synchronization timing,
wherein the encoding is continued based on a blank period of a frame of the image data, and wherein the blank period is reduced such that the blank period is shorter than a threshold.

\* \* \* \* \*